US011017689B2

(12) United States Patent
Pandolfino

(10) Patent No.: US 11,017,689 B2
(45) Date of Patent: *May 25, 2021

(54) VERY LOW NICOTINE CIGARETTE BLENDED WITH VERY LOW THC CANNABIS

(71) Applicant: CABBACIS LLC, Clarence, NY (US)

(72) Inventor: Joseph Pandolfino, Clarence, NY (US)

(73) Assignee: CABBACIS LLC, Clarence, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/107,314

(22) Filed: Nov. 30, 2020

(65) Prior Publication Data

US 2021/0082307 A1 Mar. 18, 2021

Related U.S. Application Data

(63) Continuation of application No. 16/178,298, filed on Nov. 1, 2018, now Pat. No. 10,878,717, which is a continuation of application No. 16/047,948, filed on Jul. 27, 2018.

(51) Int. Cl.

| A24B 15/16 | (2020.01) |
| G09B 19/00 | (2006.01) |
| A24F 47/00 | (2020.01) |
| A24B 15/12 | (2006.01) |
| A24B 15/167 | (2020.01) |

(Continued)

(52) U.S. Cl.
CPC ............ *G09B 19/00* (2013.01); *A24B 15/12* (2013.01); *A24B 15/16* (2013.01); *A24B 15/167* (2016.11); *A24F 40/20* (2020.01); *A24F 47/008* (2013.01); *A24B 15/303* (2013.01)

(58) Field of Classification Search
None
See application file for complete search history.

(56) References Cited

U.S. PATENT DOCUMENTS

| 3,943,945 A | 3/1976 | Rosen |
| 4,037,609 A | 7/1977 | Newton et al. |
| 4,038,993 A | 8/1977 | Geiss et al. |

(Continued)

FOREIGN PATENT DOCUMENTS

| WO | 9428142 A1 | 12/1994 |
| WO | 9856923 A1 | 12/1998 |

(Continued)

OTHER PUBLICATIONS

International Search Report dated Feb. 5, 2021, in International Application No. PCT/US2020/050128.

(Continued)

*Primary Examiner* — Michael H. Wilson
*Assistant Examiner* — Katherine A Will
(74) *Attorney, Agent, or Firm* — Sughrue Mion, PLLC

(57) ABSTRACT

The present disclosure relates to tobacco products, including methodology, devices and compositions, for assisting a smoker to transition from conventional tobacco cigarettes to either e-cigarettes or a tobacco heating device. Provided herein are methodology for switching, along with kits, products and apparatuses. The disclosure also provides methodology for regulating tetrahydrocannabinolic acid synthase expression, for use in producing cigarettes, reconstituted *cannabis*, and other products having reduced Δ9-tetrahydrocannabinolic acid.

5 Claims, 7 Drawing Sheets

Specification includes a Sequence Listing.

(51) Int. Cl.
    *A24F 40/20*    (2020.01)
    *A24B 15/30*    (2006.01)

(56) References Cited

U.S. PATENT DOCUMENTS

| | | |
|---|---|---|
| 4,068,671 A | 1/1978 | Casey |
| 4,144,894 A | 3/1979 | Schmidt et al. |
| 4,150,677 A | 4/1979 | Osborne, Jr. et al. |
| 4,153,063 A | 5/1979 | Roselius et al. |
| 4,155,909 A | 5/1979 | Sanders et al. |
| 4,176,668 A | 12/1979 | Fiore et al. |
| 4,182,349 A | 1/1980 | Selke |
| 4,196,738 A | 4/1980 | Hollenton et al. |
| 4,215,706 A | 8/1980 | Larson et al. |
| 4,220,781 A | 9/1980 | Sanders et al. |
| 4,236,532 A | 12/1980 | Schweizer et al. |
| 4,258,728 A | 3/1981 | Cogbill, II |
| 4,270,552 A | 6/1981 | Jenkins et al. |
| 4,279,824 A | 7/1981 | McKinney |
| 4,308,877 A | 1/1982 | Mattina |
| 4,321,387 A | 3/1982 | Chavdarian et al. |
| 4,328,816 A | 5/1982 | Coghill, II |
| 4,332,945 A | 6/1982 | Edwards, III |
| 4,333,482 A | 6/1982 | Banyasz |
| 4,337,783 A | 7/1982 | Hooper et al. |
| 4,340,072 A | 7/1982 | Bolt et al. |
| 4,341,228 A | 7/1982 | Keritsis et al. |
| 4,421,126 A | 12/1983 | Gellatly |
| 4,442,292 A | 4/1984 | Edwards, III |
| 4,452,984 A | 6/1984 | Edwards, III |
| 4,515,542 A | 5/1985 | Peschetz |
| 4,542,755 A | 9/1985 | Selke et al. |
| 4,557,280 A | 12/1985 | Gravely et al. |
| 4,590,278 A | 5/1986 | Edwards, III |
| 4,595,024 A | 6/1986 | Greene et al. |
| 4,598,721 A | 7/1986 | Stiller et al. |
| 4,646,764 A | 3/1987 | Young et al. |
| 4,676,259 A | 6/1987 | Ellis et al. |
| 4,681,126 A | 7/1987 | Strubel et al. |
| 4,706,692 A | 11/1987 | Gellatly |
| 4,708,151 A | 11/1987 | Shelar |
| 4,714,082 A | 12/1987 | Banerjee et al. |
| 4,732,168 A | 3/1988 | Resce et al. |
| 4,756,318 A | 7/1988 | Clearman et al. |
| 4,765,347 A | 8/1988 | Sensabaugh, Jr. et al. |
| 4,771,795 A | 9/1988 | White et al. |
| 4,787,402 A | 11/1988 | Leonard |
| 4,793,365 A | 12/1988 | Sensabaugh, Jr. et al. |
| 4,819,665 A | 4/1989 | Roberts et al. |
| 4,821,749 A | 4/1989 | Toft et al. |
| 4,827,950 A | 5/1989 | Banerjee et al. |
| 4,830,028 A | 5/1989 | Lawson et al. |
| 4,854,331 A | 8/1989 | Banerjee et al. |
| 4,858,630 A | 8/1989 | Banerjee et al. |
| 4,895,175 A | 1/1990 | Baskevitch et al. |
| 4,898,188 A | 2/1990 | Niven, Jr. et al. |
| 4,903,714 A | 2/1990 | Barnes et al. |
| 4,941,483 A | 7/1990 | Ridings et al. |
| 4,947,874 A | 8/1990 | Brooks et al. |
| 4,966,171 A | 10/1990 | Serrano et al. |
| 4,967,771 A | 11/1990 | Fagg et al. |
| 4,967,774 A | 11/1990 | White |
| 4,989,619 A | 2/1991 | Clearman et al. |
| 4,991,606 A | 2/1991 | Serrano et al. |
| 5,015,741 A | 5/1991 | Osdene et al. |
| 5,018,540 A | 5/1991 | Grubbs et al. |
| 5,019,122 A | 5/1991 | Clearman et al. |
| 5,020,548 A | 6/1991 | Farrier et al. |
| 5,025,812 A | 6/1991 | Fagg et al. |
| 5,031,646 A | 7/1991 | Lippiello et al. |
| 5,033,483 A | 7/1991 | Clearman et al. |
| 5,050,621 A | 9/1991 | Creighton et al. |
| 5,065,775 A | 11/1991 | Fagg |
| 5,067,499 A | 11/1991 | Banerjee et al. |
| 5,076,292 A | 12/1991 | Sensabaugh, Jr. et al. |
| 5,099,861 A | 3/1992 | Clearman et al. |
| 5,101,839 A | 4/1992 | Jakob et al. |
| 5,105,831 A | 4/1992 | Banerjee et al. |
| 5,105,836 A | 4/1992 | Gentry et al. |
| 5,119,835 A | 6/1992 | Heemann et al. |
| 5,138,062 A | 8/1992 | Osdene et al. |
| 5,159,940 A | 11/1992 | Hayward et al. |
| 5,247,947 A | 9/1993 | Clearman et al. |
| 5,260,205 A | 11/1993 | Nakatani et al. |
| 5,285,798 A | 2/1994 | Banerjee et al. |
| 5,327,917 A | 7/1994 | Lekwauwa et al. |
| 5,339,838 A | 8/1994 | Young et al. |
| 5,345,951 A | 9/1994 | Serrano et al. |
| 5,369,023 A | 11/1994 | Nakatani et al. |
| 5,377,698 A | 1/1995 | Litzinger et al. |
| 5,479,948 A | 1/1996 | Counts et al. |
| 5,497,792 A | 3/1996 | Prasad et al. |
| 5,505,214 A | 4/1996 | Collins et al. |
| 5,533,530 A | 7/1996 | Young et al. |
| 5,584,306 A | 12/1996 | Beauman et al. |
| 5,598,868 A | 2/1997 | Jakob et al. |
| 5,665,262 A | 9/1997 | Hajaligol et al. |
| 5,666,976 A | 9/1997 | Adams et al. |
| 5,666,977 A | 9/1997 | Higgins et al. |
| 5,666,987 A | 9/1997 | Combs |
| 5,668,295 A | 9/1997 | Wahab et al. |
| 5,684,241 A | 11/1997 | Nakatani et al. |
| 5,708,258 A | 1/1998 | Counts et al. |
| 5,713,376 A | 2/1998 | Berger |
| 5,715,844 A | 2/1998 | Young et al. |
| 5,724,998 A | 3/1998 | Gellatly et al. |
| 5,730,158 A | 3/1998 | Collins et al. |
| 5,743,251 A | 4/1998 | Howell et al. |
| 5,750,964 A | 5/1998 | Counts et al. |
| 5,765,570 A | 6/1998 | Litzinger et al. |
| 5,880,164 A | 3/1999 | Keenan |
| 5,908,034 A | 6/1999 | Adedeji |
| 5,934,289 A | 8/1999 | Watkins et al. |
| 5,947,128 A | 9/1999 | Adedeji |
| 6,053,176 A | 4/2000 | Adams et al. |
| 6,113,940 A | 9/2000 | Brooke et al. |
| 6,153,119 A | 11/2000 | Sung |
| 6,216,706 B1 | 4/2001 | Kumar et al. |
| 6,328,992 B1 | 12/2001 | Brooke et al. |
| 6,403,126 B1 | 6/2002 | Webster et al. |
| 6,423,520 B1 | 7/2002 | Conkling et al. |
| 6,508,254 B1 | 1/2003 | Mua et al. |
| 6,563,009 B1 | 5/2003 | Kunos et al. |
| 6,571,803 B1 | 6/2003 | Bregeard |
| 6,595,216 B1 | 6/2003 | Wessinger |
| 6,586,661 B1 | 7/2003 | Conkling et al. |
| 6,694,985 B1 | 2/2004 | Kim |
| 6,761,176 B2 | 8/2004 | Sun |
| 6,772,769 B2 | 8/2004 | Sun |
| 6,807,969 B1 | 10/2004 | Wessinger et al. |
| 6,907,887 B2 | 6/2005 | Conkling |
| 6,911,541 B2 | 6/2005 | Conkling et al. |
| 6,930,122 B2 | 8/2005 | Blanchard et al. |
| 6,959,712 B2 | 11/2005 | Bereman et al. |
| 7,025,067 B2 | 4/2006 | Chatterjee |
| 7,145,012 B2 | 12/2006 | Carpino et al. |
| 7,192,771 B2 | 3/2007 | Conkling et al. |
| 7,293,564 B2 | 11/2007 | Perfetti et al. |
| 7,304,220 B2 | 12/2007 | Conkling et al. |
| 7,390,835 B2 | 6/2008 | Shah et al. |
| 7,398,783 B2 | 7/2008 | Biggs et al. |
| 7,402,686 B2 | 7/2008 | Duchek |
| 7,408,098 B2 | 8/2008 | Conkling et al. |
| 7,425,670 B2 | 9/2008 | Conkling et al. |
| 7,503,330 B2 | 3/2009 | Borschke et al. |
| 7,524,867 B2 | 4/2009 | Lange et al. |
| 7,538,071 B2 | 5/2009 | Berger |
| 7,605,308 B2 | 10/2009 | Conkling et al. |
| 7,611,858 B1 | 11/2009 | Svetlov et al. |
| 7,645,925 B2 | 1/2010 | Conkling et al. |
| 7,647,932 B2 | 1/2010 | Cantrell et al. |
| 7,665,470 B2 | 2/2010 | Mallmann et al. |
| 7,665,471 B2 | 2/2010 | Mallmann et al. |
| 7,665,472 B2 | 2/2010 | Mallmann et al. |

(56) References Cited

U.S. PATENT DOCUMENTS

| | | |
|---|---|---|
| 7,667,104 B2 | 2/2010 | Mallmann et al. |
| 7,667,105 B2 | 2/2010 | Mallmann et al. |
| 7,667,106 B2 | 2/2010 | Mallmann et al. |
| 7,687,481 B2 | 3/2010 | McElroy et al. |
| 7,726,320 B2 | 6/2010 | Robinson et al. |
| 7,753,056 B2 | 7/2010 | Borschke et al. |
| 7,795,503 B2 | 9/2010 | Apuya et al. |
| 7,795,509 B2 | 9/2010 | Conkling et al. |
| 7,816,143 B2 | 10/2010 | Day et al. |
| 7,832,397 B2 | 11/2010 | Lipowicz |
| 7,836,897 B2 | 11/2010 | Borschke et al. |
| 7,847,163 B2 | 12/2010 | Mallmann et al. |
| 7,847,164 B2 | 12/2010 | Mallmann et al. |
| 7,847,165 B2 | 12/2010 | Mallmann et al. |
| 7,856,988 B2 | 12/2010 | Yang et al. |
| 7,888,554 B2 | 2/2011 | Kasukabe et al. |
| 7,999,107 B2 | 8/2011 | Debenham et al. |
| 8,079,371 B2 | 12/2011 | Robinson et al. |
| 8,136,533 B2 | 3/2012 | Mua et al. |
| 8,205,622 B2 | 6/2012 | Pan |
| 8,222,292 B2 | 7/2012 | Goskonda et al. |
| 8,156,944 B2 | 8/2012 | Han |
| 8,251,060 B2 | 8/2012 | White et al. |
| 8,297,288 B2 | 10/2012 | Yang et al. |
| 8,322,350 B2 | 12/2012 | Lipowicz |
| 8,334,282 B2 | 12/2012 | McElroy et al. |
| 8,337,908 B2 | 12/2012 | Letzel et al. |
| 8,365,742 B2 | 2/2013 | Hon |
| 8,393,331 B2 | 3/2013 | Hon |
| 8,402,976 B2 | 3/2013 | Fernando et al. |
| 8,410,341 B2 | 4/2013 | Page et al. |
| 8,420,689 B2 | 4/2013 | Muthuppalaniappan et al. |
| 8,431,607 B2 | 4/2013 | Liu et al. |
| 8,445,034 B1 | 5/2013 | Coles, Jr. |
| 8,476,309 B2 | 7/2013 | Moore, II et al. |
| 8,490,628 B2 | 7/2013 | Hon |
| 8,511,318 B2 | 8/2013 | Hon |
| 8,518,653 B2 | 8/2013 | Takkinen et al. |
| 8,528,569 B1 | 9/2013 | Newton |
| 8,539,959 B1 | 9/2013 | Scatterday |
| 8,624,083 B2 | 1/2014 | Page et al. |
| 8,678,013 B2 | 3/2014 | Crooks et al. |
| 8,722,691 B2 | 5/2014 | He et al. |
| 8,733,346 B2 | 5/2014 | Rinker |
| 8,739,788 B2 | 6/2014 | Yomtov |
| 8,752,557 B2 | 6/2014 | Lipowicz |
| 8,759,101 B2 | 6/2014 | Timko et al. |
| 8,791,329 B2 | 7/2014 | Hashimoto et al. |
| 8,794,231 B2 | 8/2014 | Thorens et al. |
| 8,808,734 B2 | 8/2014 | Winnicki |
| 8,822,757 B2 | 9/2014 | Page et al. |
| 8,851,081 B2 | 10/2014 | Fernando et al. |
| 8,881,737 B2 | 11/2014 | Collett et al. |
| 8,884,100 B2 | 11/2014 | Page et al. |
| 8,887,737 B2 | 11/2014 | Howell et al. |
| 8,893,724 B2 | 11/2014 | Woodcock et al. |
| 8,895,078 B2 | 11/2014 | Mueller |
| 8,895,472 B2 | 11/2014 | Yang et al. |
| 8,899,238 B2 | 12/2014 | Robinson et al. |
| 8,906,429 B1 | 12/2014 | Kolsky |
| 8,910,630 B2 | 12/2014 | Todd |
| 8,980,633 B2 | 3/2015 | Timko et al. |
| 8,980,940 B2 | 3/2015 | Rossi et al. |
| 8,980,941 B2 | 3/2015 | Hospodor |
| 8,987,555 B2 | 3/2015 | Hashimoto et al. |
| 8,997,753 B2 | 4/2015 | Li et al. |
| 8,997,754 B2 | 4/2015 | Tucker et al. |
| 9,004,073 B2 | 4/2015 | Tucker et al. |
| 9,004,074 B2 | 4/2015 | Nauryzbaev et al. |
| 9,022,040 B2 | 5/2015 | Muiphy |
| 9,029,656 B2 | 5/2015 | Hashimoto et al. |
| 9,050,631 B2 | 6/2015 | Raichart |
| 9,055,617 B2 | 6/2015 | Thorens et al. |
| 9,066,910 B2 | 6/2015 | Rosenblatt et al. |
| 9,084,440 B2 | 7/2015 | Zuber et al. |
| 9,095,554 B2 | 8/2015 | Lewis et al. |
| 9,095,555 B2 | 8/2015 | Winnicki |
| 9,102,948 B2 | 8/2015 | Hashimoto et al. |
| 9,121,030 B2 | 9/2015 | Page et al. |
| 9,133,468 B2 | 9/2015 | Page et al. |
| 9,149,499 B1 | 10/2015 | Robinson |
| 9,150,872 B2 | 10/2015 | Page et al. |
| 9,157,089 B2 | 10/2015 | Page et al. |
| 9,157,090 B2 | 10/2015 | Page et al. |
| 9,168,278 B2 | 10/2015 | Guy et al. |
| 9,175,052 B2 | 11/2015 | Gerardi et al. |
| 9,175,302 B2 | 11/2015 | Page et al. |
| 9,199,960 B2 | 12/2015 | Ferri |
| 9,205,063 B2 | 12/2015 | Guy et al. |
| 9,220,294 B2 | 12/2015 | McCullough |
| 9,220,301 B2 | 12/2015 | Banerjee et al. |
| 9,220,302 B2 | 12/2015 | DePiano et al. |
| 9,259,449 B2 | 2/2016 | Raderman |
| 9,277,770 B2 | 3/2016 | DePiano et al. |
| 9,282,772 B2 | 3/2016 | Tucker et al. |
| 9,289,014 B2 | 3/2016 | Tucker et al. |
| 9,326,547 B2 | 5/2016 | Tucker et al. |
| 9,326,967 B2 | 5/2016 | Perry |
| 9,333,229 B2 | 5/2016 | Bjorncrantz |
| 9,345,771 B2 | 5/2016 | Goskonda et al. |
| 9,351,953 B2 | 5/2016 | Stodola |
| 9,370,164 B2 | 6/2016 | Lewis et al. |
| 9,376,367 B2 | 6/2016 | Herkenroth et al. |
| 9,380,810 B2 | 7/2016 | Rose et al. |
| 9,408,986 B2 | 8/2016 | McCullough |
| 9,420,829 B2 | 8/2016 | Thorens et al. |
| 9,422,346 B2 | 8/2016 | Noguchi et al. |
| 9,422,532 B2 | 8/2016 | Page et al. |
| 9,422,533 B2 | 8/2016 | Page et al. |
| 9,423,152 B2 | 8/2016 | Ampolini et al. |
| 9,439,452 B2 | 9/2016 | Albino et al. |
| 9,439,454 B2 | 9/2016 | Fernando et al. |
| 9,456,635 B2 | 10/2016 | Tucker et al. |
| 9,462,754 B2 | 10/2016 | Scott et al. |
| 9,474,306 B2 | 10/2016 | Tucker et al. |
| 9,462,832 B2 | 11/2016 | Lord |
| 9,497,999 B2 | 11/2016 | Lord |
| 9,498,000 B2 | 11/2016 | Kuczaj |
| 9,499,332 B2 | 11/2016 | Fernando et al. |
| 9,504,723 B2 | 11/2016 | Kolsky |
| PP27,475 P2 | 12/2016 | Kubby |
| 9,510,623 B2 | 12/2016 | Tucker et al. |
| 9,516,899 B2 | 12/2016 | Plojoux et al. |
| 9,517,228 B2 | 12/2016 | McElroy et al. |
| 9,532,597 B2 | 1/2017 | Tucker et al. |
| 9,538,733 B2 | 1/2017 | Jones |
| 9,546,362 B2 | 1/2017 | Page et al. |
| 9,546,960 B2 | 1/2017 | Pierce, III et al. |
| 9,551,003 B2 | 1/2017 | Hashimoto et al. |
| 9,554,595 B2 | 1/2017 | Buchberger |
| 9,554,598 B2 | 1/2017 | Egoyants et al. |
| 9,555,198 B2 | 1/2017 | Yang et al. |
| 9,560,883 B2 | 2/2017 | Hawes |
| 9,565,865 B2 | 2/2017 | Bhairam |
| 9,580,722 B2 | 2/2017 | Qu et al. |
| 9,587,212 B2 | 3/2017 | Winnicki et al. |
| 9,597,466 B2 | 3/2017 | Henry, Jr. et al. |
| 9,603,388 B2 | 3/2017 | Fernando et al. |
| 9,609,894 B2 | 4/2017 | Abramov et al. |
| 9,611,460 B2 | 4/2017 | Page et al. |
| 9,629,886 B2 | 4/2017 | Franklin et al. |
| 9,632,069 B2 | 4/2017 | Jackson, Jr. et al. |
| 9,642,317 B2 | 5/2017 | Lewis et al. |
| 9,642,884 B1 | 5/2017 | Skuratovich et al. |
| 9,669,002 B2 | 6/2017 | Guy et al. |
| 9,670,133 B2 | 6/2017 | Koch et al. |
| 9,670,216 B2 | 6/2017 | Chen et al. |
| 9,674,894 B2 | 6/2017 | Schneider et al. |
| 9,677,083 B2 | 6/2017 | Timko et al. |
| 9,694,040 B2 | 7/2017 | Scialdone |
| 9,701,978 B2 | 7/2017 | Timko et al. |
| 9,717,277 B2 | 8/2017 | Mironov |
| 9,717,683 B1 | 8/2017 | Eck et al. |
| 9,719,103 B2 | 8/2017 | Hashimoto et al. |

(56) References Cited

U.S. PATENT DOCUMENTS

| | | |
|---|---|---|
| 9,723,876 B2 | 8/2017 | Cadieux et al. |
| 9,730,911 B2 | 8/2017 | Verzura et al. |
| 9,732,350 B2 | 8/2017 | Page et al. |
| 9,744,200 B1 | 8/2017 | Tucker et al. |
| 9,752,156 B2 | 9/2017 | Page et al. |
| 9,765,308 B2 | 9/2017 | Page et al. |
| 9,775,380 B2 | 10/2017 | Fernando et al. |
| 9,781,952 B2 | 10/2017 | Rinker et al. |
| 9,788,571 B2 | 10/2017 | Conner et al. |
| 9,808,494 B2 | 11/2017 | Barringer |
| 9,814,258 B2 | 11/2017 | Pandolfino |
| 9,814,263 B2 | 11/2017 | Cochand et al. |
| 9,814,775 B2 | 11/2017 | Rossi et al. |
| 9,815,810 B1 | 11/2017 | Ogilvie et al. |
| 9,817,007 B2 | 11/2017 | Perez |
| 9,820,512 B2 | 11/2017 | Mironov et al. |
| 9,822,384 B2 | 11/2017 | Poulos et al. |
| 9,823,259 B1 | 11/2017 | Nichols |
| 9,834,780 B2 | 12/2017 | Hashimoto et al. |
| 9,844,234 B2 | 12/2017 | Thorens et al. |
| 9,848,644 B2 | 12/2017 | Plunkett et al. |
| 9,848,655 B2 | 12/2017 | Fernando et al. |
| 9,848,656 B2 | 12/2017 | Tucker et al. |
| 9,854,836 B2 | 1/2018 | Lipowicz |
| 9,854,839 B2 | 1/2018 | Tucker et al. |
| 9,854,844 B2 | 1/2018 | Plojoux et al. |
| 9,856,487 B2 | 1/2018 | Hashimoto et al. |
| 9,867,859 B2 | 1/2018 | Raderman |
| 9,877,508 B2 | 1/2018 | Kane |
| 9,877,511 B2 | 1/2018 | Li et al. |
| 9,877,516 B2 | 1/2018 | Tucker et al. |
| 9,879,272 B2 | 1/2018 | Page et al. |
| 9,879,292 B2 | 1/2018 | Winnicki et al. |
| 9,883,700 B2 | 2/2018 | Holzherr et al. |
| 9,888,703 B2 | 2/2018 | Bhairam |
| 9,888,719 B2 | 2/2018 | Cadieux et al. |
| 9,901,112 B2 | 2/2018 | Mei et al. |
| 9,901,607 B2 | 2/2018 | Silen |
| 9,913,868 B1 | 3/2018 | Alfiere |
| 9,918,496 B2 | 3/2018 | Kane et al. |
| 9,918,497 B2 | 3/2018 | Lord |
| 9,930,910 B2 | 4/2018 | Gindrat |
| 9,937,218 B2 | 4/2018 | Towle |
| 9,937,219 B2 | 4/2018 | Raderman |
| 9,943,108 B2 | 4/2018 | Lord |
| 9,949,507 B2 | 4/2018 | Flick |
| 9,955,724 B2 | 5/2018 | Lord |
| 9,955,735 B2 | 5/2018 | Lin et al. |
| 9,956,173 B1 | 5/2018 | Nordahl |
| 9,956,174 B1 | 5/2018 | Nordahl |
| 9,956,498 B1 | 5/2018 | Tucker |
| 9,961,939 B2 | 5/2018 | Reevell |
| 9,961,941 B2 | 5/2018 | Tucker et al. |
| 9,968,134 B2 | 5/2018 | Liu |
| 9,974,329 B2 | 5/2018 | Buehler et al. |
| 9,974,335 B2 | 5/2018 | Lord |
| 9,974,340 B2 | 5/2018 | Liu |
| 9,974,743 B2 | 5/2018 | Rose et al. |
| 9,974,821 B2 | 5/2018 | Kennedy |
| 9,976,153 B2 | 5/2018 | Page et al. |
| 9,980,511 B2 | 5/2018 | Liu |
| 9,980,519 B2 | 5/2018 | Xiang |
| 9,980,521 B2 | 5/2018 | Buehler et al. |
| 9,980,523 B2 | 5/2018 | Abramov et al. |
| 9,986,760 B2 | 6/2018 | Macko et al. |
| 9,986,761 B2 | 6/2018 | Thorens et al. |
| 9,986,763 B2 | 6/2018 | Liu |
| 9,986,765 B2 | 6/2018 | Batista |
| 9,986,766 B2 | 6/2018 | Batista |
| 9,986,767 B2 | 6/2018 | Batista et al. |
| 9,987,248 B1 | 6/2018 | Lowe et al. |
| 9,987,253 B2 | 6/2018 | McElroy et al. |
| 9,987,567 B1 | 6/2018 | Ko |
| 9,988,640 B2 | 6/2018 | Page et al. |
| 9,988,763 B2 | 6/2018 | Ramaratnam et al. |
| 9,993,023 B2 | 6/2018 | Tucker et al. |
| 9,994,860 B2 | 6/2018 | Hashimoto et al. |
| 9,999,245 B1 | 6/2018 | Zhu |
| 9,999,247 B2 | 6/2018 | Ruscio et al. |
| 9,999,250 B2 | 6/2018 | Minskoff et al. |
| 9,999,253 B2 | 6/2018 | Li et al. |
| 9,999,256 B2 | 6/2018 | Abramov et al. |
| 10,003,372 B2 | 6/2018 | Stanimirovic et al. |
| 10,004,261 B2 | 6/2018 | Li et al. |
| 10,004,268 B2 | 6/2018 | Liu |
| 10,004,275 B2 | 6/2018 | Li et al. |
| 10,010,110 B2 | 7/2018 | Metrangolo et al. |
| 10,010,112 B2 | 7/2018 | Silvestrini et al. |
| 10,010,113 B2 | 7/2018 | Zuber et al. |
| 10,011,804 B2 | 7/2018 | Mancosky |
| 10,015,986 B2 | 7/2018 | Cadieux et al. |
| 10,021,838 B1 | 7/2018 | Gustafik |
| 10,021,915 B2 | 7/2018 | Cadieux et al. |
| 10,028,531 B2 | 7/2018 | Clements et al. |
| 10,028,533 B2 | 7/2018 | Fursa et al. |
| 10,028,535 B2 | 7/2018 | Mironov |
| 10,028,537 B1 | 7/2018 | Hawes et al. |
| 10,028,618 B1 | 7/2018 | Benson |
| 10,028,904 B2 | 7/2018 | Smith et al. |
| 10,030,249 B2 | 7/2018 | Page et al. |
| 10,036,574 B2 | 7/2018 | Brereton et al. |
| 10,039,321 B2 | 8/2018 | Verleur et al. |
| 10,039,322 B2 | 8/2018 | Schiff et al. |
| 10,041,084 B2 | 8/2018 | Page et al. |
| 2002/0108151 A1 | 8/2002 | Conkling et al. |
| 2002/0197688 A1 | 12/2002 | Pandolfino |
| 2003/0018997 A1 | 1/2003 | Conkling et al. |
| 2003/0131857 A1 | 7/2003 | Kim et al. |
| 2003/0140366 A1 | 7/2003 | Conkling et al. |
| 2003/0200975 A1 | 10/2003 | Rosen et al. |
| 2004/0094170 A1 | 5/2004 | Zho et al. |
| 2004/0103454 A1 | 5/2004 | Conkling et al. |
| 2004/0144397 A1 | 7/2004 | Conkling |
| 2004/0168211 A1 | 8/2004 | Conkling et al. |
| 2005/0000531 A1 | 1/2005 | Shi |
| 2005/0072047 A1 | 4/2005 | Conkling et al. |
| 2005/0161056 A1 | 7/2005 | Conkling |
| 2005/0263165 A1 | 12/2005 | Oh et al. |
| 2005/0263166 A1 | 12/2005 | Oh et al. |
| 2006/0032501 A1 | 2/2006 | Hale et al. |
| 2006/0057723 A1 | 3/2006 | Conkling et al. |
| 2006/0060211 A1 | 3/2006 | Conkling |
| 2006/0191035 A1 | 8/2006 | Conkling et al. |
| 2006/0191036 A1 | 8/2006 | Conkling et al. |
| 2006/0191039 A1 | 8/2006 | Conkling et al. |
| 2006/0191547 A1 | 8/2006 | Conkling |
| 2006/0191549 A1 | 8/2006 | Conkling |
| 2006/0195936 A1 | 8/2006 | Conkling et al. |
| 2006/0200872 A1 | 9/2006 | Conkling et al. |
| 2006/0236434 A1 | 10/2006 | Conkling et al. |
| 2006/0242730 A1 | 10/2006 | Conkling et al. |
| 2006/0243290 A1 | 11/2006 | Reich et al. |
| 2007/0011774 A1 | 1/2007 | Conkling et al. |
| 2007/0016975 A1 | 1/2007 | Conkling et al. |
| 2007/0034220 A1 | 2/2007 | Pandolfino |
| 2008/0120737 A1 | 5/2008 | Hashimoto et al. |
| 2008/0230077 A1 | 9/2008 | Martilik |
| 2008/0292735 A1 | 11/2008 | Hashimoto et al. |
| 2009/0055964 A1 | 2/2009 | Gelesko et al. |
| 2009/0114235 A1 | 5/2009 | Mallmann et al. |
| 2009/0117212 A1 | 5/2009 | Mallmann et al. |
| 2009/0119788 A1 | 5/2009 | Mallmann et al. |
| 2009/0119789 A1 | 5/2009 | Mallmann et al. |
| 2009/0119790 A1 | 5/2009 | Mallmann et al. |
| 2009/0119791 A1 | 5/2009 | Mallmann et al. |
| 2009/0119806 A1 | 5/2009 | Mallmann et al. |
| 2009/0210958 A1 | 8/2009 | Page et al. |
| 2009/0230117 A1 | 9/2009 | Fernando et al. |
| 2010/0132063 A1 | 5/2010 | Mallmann et al. |
| 2010/0132064 A1 | 5/2010 | Mallmann et al. |
| 2010/0138949 A1 | 6/2010 | Mallmann et al. |
| 2011/0126322 A1 | 5/2011 | Fernandez et al. |
| 2011/0147486 A1 | 6/2011 | Greim et al. |
| 2011/0155153 A1 | 6/2011 | Thorens et al. |

(56) References Cited

U.S. PATENT DOCUMENTS

| | | |
|---|---|---|
| 2013/0048001 A1 | 2/2013 | Williams |
| 2013/0309749 A1 | 11/2013 | Page et al. |
| 2013/0318661 A1 | 11/2013 | Page et al. |
| 2014/0020693 A1 | 1/2014 | Cochand et al. |
| 2014/0020698 A1 | 1/2014 | Fiebelkorn |
| 2014/0053831 A1 | 2/2014 | Leamon et al. |
| 2014/0076337 A1 | 3/2014 | Woodman et al. |
| 2014/0166028 A1 | 6/2014 | Fuisz et al. |
| 2014/0202476 A1 | 7/2014 | Egoyants et al. |
| 2014/0262856 A1 | 9/2014 | Damiani et al. |
| 2014/0271733 A1 | 9/2014 | Kobal et al. |
| 2014/0283165 A1 | 9/2014 | Kudithipudi et al. |
| 2014/0298535 A1 | 10/2014 | Page et al. |
| 2014/0299141 A1 | 10/2014 | Flick |
| 2014/0301721 A1 | 10/2014 | Ruscio et al. |
| 2014/0305448 A1 | 10/2014 | Plojoux et al. |
| 2014/0305449 A1 | 10/2014 | Plojoux et al. |
| 2014/0321837 A1 | 10/2014 | Flick |
| 2014/0338680 A1 | 11/2014 | Abramov et al. |
| 2014/0353856 A1 | 12/2014 | Dubief |
| 2014/0356607 A1 | 12/2014 | Woodcock |
| 2014/0360515 A1 | 12/2014 | Vasiliev et al. |
| 2014/0366899 A1 | 12/2014 | Plojoux et al. |
| 2014/0366900 A1 | 12/2014 | Plojoux et al. |
| 2015/0020832 A1 | 1/2015 | Greim et al. |
| 2015/0027474 A1 | 1/2015 | Zuber et al. |
| 2015/0040925 A1 | 2/2015 | Saleem et al. |
| 2015/0082484 A1 | 3/2015 | Howe et al. |
| 2015/0107610 A1 | 4/2015 | Metrangolo et al. |
| 2015/0107611 A1 | 4/2015 | Metrangolo et al. |
| 2015/0163859 A1 | 6/2015 | Schneider et al. |
| 2015/0173319 A1 | 6/2015 | Frederick et al. |
| 2015/0181934 A1 | 7/2015 | Lyubomirskiy et al. |
| 2015/0181935 A1 | 7/2015 | Lyubomirskiy et al. |
| 2015/0181936 A1 | 7/2015 | Lyubomirskiy et al. |
| 2015/0181937 A1 | 7/2015 | Dubief et al. |
| 2015/0182707 A1 | 7/2015 | Maharajh |
| 2015/0203859 A1 | 7/2015 | Page et al. |
| 2015/0208727 A1 | 7/2015 | Kuczaj |
| 2015/0216237 A1 | 8/2015 | Wensley et al. |
| 2015/0218575 A1 | 8/2015 | Hashimoto et al. |
| 2015/0223520 A1 | 8/2015 | Phillips et al. |
| 2015/0264979 A1 | 9/2015 | Thorens et al. |
| 2015/0272219 A1 | 10/2015 | Hatrick et al. |
| 2015/0322451 A1 | 11/2015 | Kidithipudi et al. |
| 2015/0359264 A1 | 12/2015 | Fernando et al. |
| 2016/0002649 A1 | 1/2016 | Kidithipudi et al. |
| 2016/0032299 A1 | 2/2016 | Hashimoto et al. |
| 2016/0044963 A1 | 2/2016 | Saleem |
| 2016/0050968 A1 | 2/2016 | Williams |
| 2016/0060645 A1 | 3/2016 | Page et al. |
| 2016/0060646 A1 | 3/2016 | Page et al. |
| 2016/0073675 A1 | 3/2016 | Page et al. |
| 2016/0081395 A1 | 3/2016 | Thorens et al. |
| 2016/0032298 A1 | 4/2016 | Hashimoto et al. |
| 2016/0130601 A1 | 5/2016 | Page et al. |
| 2016/0174610 A1 | 6/2016 | Kuczaj |
| 2016/0213063 A1 | 7/2016 | Ajithkumar et al. |
| 2016/0227839 A1 | 8/2016 | Zuber et al. |
| 2016/0255879 A1 | 9/2016 | Paprocki et al. |
| 2016/0270435 A1 | 9/2016 | Benjak et al. |
| 2016/0286862 A1 | 10/2016 | Silvetrini |
| 2016/0295915 A1 | 10/2016 | Jochnowitz et al. |
| 2016/0295921 A1 | 10/2016 | Mironov et al. |
| 2016/0302488 A1 | 10/2016 | Fernando et al. |
| 2016/0345634 A1 | 12/2016 | Fernando et al. |
| 2016/0362702 A1 | 12/2016 | de Bont et al. |
| 2016/0366926 A1 | 12/2016 | Uren |
| 2016/0374387 A1 | 12/2016 | Adams et al. |
| 2017/0009249 A1 | 1/2017 | Goossens et al. |
| 2017/0033568 A1 | 2/2017 | Holzherr |
| 2017/0044564 A1 | 2/2017 | Page et al. |
| 2017/0055566 A1 | 3/2017 | Albino et al. |
| 2017/0055574 A1 | 3/2017 | Kaufman et al. |
| 2017/0055580 A1 | 3/2017 | Blandino et al. |
| 2017/0055583 A1 | 3/2017 | Blandino et al. |
| 2017/0055584 A1 | 3/2017 | Blandino et al. |
| 2017/0079322 A1 | 3/2017 | Li et al. |
| 2017/0095002 A1 | 4/2017 | Silvestrini |
| 2017/0137835 A1 | 5/2017 | Qu et al. |
| 2017/0143039 A1 | 5/2017 | Buehler et al. |
| 2017/0143041 A1 | 5/2017 | Batista et al. |
| 2017/0145432 A1 | 5/2017 | Hashimoto et al. |
| 2017/0164657 A1 | 6/2017 | Batista |
| 2017/0164659 A1 | 6/2017 | Schneider et al. |
| 2017/0166913 A1 | 6/2017 | Hashimoto et al. |
| 2017/0172208 A1 | 6/2017 | Mironov |
| 2017/0181472 A1 | 6/2017 | Nuno et al. |
| 2017/0196262 A1 | 7/2017 | Brereton et al. |
| 2017/0224019 A1 | 8/2017 | Arkadiusz |
| 2017/0224024 A1 | 8/2017 | Jochnowitz et al. |
| 2017/0231267 A1 | 8/2017 | Shi et al. |
| 2017/0231285 A1 | 8/2017 | Holzherr et al. |
| 2017/0273358 A1 | 9/2017 | Batista |
| 2017/0306341 A1 | 10/2017 | Timko et al. |
| 2017/0321223 A1 | 11/2017 | Page et al. |
| 2017/0347715 A1 | 12/2017 | Mironov et al. |
| 2017/0354184 A1 | 12/2017 | Mironov et al. |
| 2017/0360093 A1 | 12/2017 | Fernando |
| 2017/0360095 A1 | 12/2017 | Batista |
| 2017/0360096 A1 | 12/2017 | Silvestrini |
| 2017/0367409 A1 | 12/2017 | Thorens et al. |
| 2018/0007971 A1 | 1/2018 | Plojoux et al. |
| 2018/0014573 A1 | 1/2018 | Silvestrini et al. |
| 2018/0042304 A1 | 2/2018 | Hogwood et al. |
| 2018/0042305 A1 | 2/2018 | Hogwood et al. |
| 2018/0043113 A1 | 2/2018 | Hogwood et al. |
| 2018/0049471 A1 | 2/2018 | Holoubek et al. |
| 2018/0049477 A1 | 2/2018 | Suzuki et al. |
| 2018/0077965 A1 | 3/2018 | Lipowicz |
| 2018/0104425 A1 | 4/2018 | Hogwood et al. |
| 2018/0110262 A1 | 4/2018 | Batista et al. |
| 2018/0125026 A1 | 5/2018 | de Godoy et al. |
| 2018/0132532 A1 | 5/2018 | Batista |
| 2018/0160734 A1 | 6/2018 | Batista et al. |
| 2018/0168223 A1 | 6/2018 | Zinovik et al. |
| 2018/0185604 A1 | 7/2018 | Hassenpflug et al. |
| 2018/0207376 A1 | 7/2018 | Buehler et al. |
| 2018/0213843 A1 | 8/2018 | Mironov |
| 2018/0258439 A1 | 9/2018 | Boudko et al. |
| 2019/0001087 A1 | 1/2019 | Davidson et al. |
| 2019/0022158 A1 | 1/2019 | Greenbaum et al. |
| 2019/0158938 A1 | 5/2019 | Bowen et al. |
| 2020/0051455 A1 | 2/2020 | Pandolfino |

FOREIGN PATENT DOCUMENTS

| | | |
|---|---|---|
| WO | 0067558 A1 | 11/2000 |
| WO | 0218607 A2 | 3/2002 |
| WO | 02100199 A2 | 12/2002 |
| WO | 2005/018307 A1 | 3/2005 |
| WO | 2007075027 A1 | 7/2007 |
| WO | 2008008844 A2 | 1/2008 |
| WO | 2008020333 A2 | 2/2008 |
| WO | 2009061421 A1 | 5/2009 |
| WO | 2009061422 A1 | 5/2009 |
| WO | 2009061437 A1 | 5/2009 |
| WO | 2009063312 A2 | 5/2009 |
| WO | 2014134354 A1 | 9/2014 |
| WO | 2015/009500 A1 | 1/2015 |
| WO | 2015038981 | 3/2015 |
| WO | 2015085299 A1 | 6/2015 |
| WO | 2015157359 A1 | 10/2015 |
| WO | 2015196275 A1 | 12/2015 |
| WO | 2016004193 A1 | 1/2016 |
| WO | 2016179356 A1 | 11/2016 |
| WO | 2016210303 A1 | 12/2016 |
| WO | 2017096254 A1 | 6/2017 |
| WO | 2017097840 A1 | 6/2017 |
| WO | 2017194764 A1 | 11/2017 |
| WO | 2017198838 A1 | 11/2017 |
| WO | 2017212284 A1 | 12/2017 |
| WO | 2018019786 A1 | 2/2018 |
| WO | 2018019855 A1 | 2/2018 |

(56) References Cited

FOREIGN PATENT DOCUMENTS

| | | |
|---|---|---|
| WO | 2018045140 A1 | 3/2018 |
| WO | 2018057385 A2 | 3/2018 |
| WO | 2018069673 A1 | 4/2018 |
| WO | 2018069675 A1 | 4/2018 |
| WO | 2018069676 A1 | 4/2018 |
| WO | 2018073376 A1 | 4/2018 |
| WO | 2018083037 A1 | 5/2018 |
| WO | 2018087165 A1 | 5/2018 |
| WO | 2018100366 A2 | 6/2018 |
| WO | 2018122978 A1 | 7/2018 |
| WO | 2018127417 A1 | 7/2018 |
| WO | 2018130391 A1 | 7/2018 |
| WO | 2018134159 A1 | 7/2018 |
| WO | 2018138072 A1 | 8/2018 |
| WO | 2018138749 A1 | 8/2018 |
| WO | 2018138750 A1 | 8/2018 |
| WO | 2018138751 A1 | 8/2018 |
| WO | 2019/159170 A1 | 8/2019 |

OTHER PUBLICATIONS

Written Opinion of the International Searching Authority dated Feb. 5, 2021, in International Application No. PCT/US2020/050128.

Todd, et al., "A functional genomics screen identifies diverse transcription factors that regulate alkaloid biosynthesis in *Nicotiana benthamiana*", The Plant Journal, vol. 62, 2010, pp. 589-600 (12 pages total).

United States Plant Variety Protection Certificate No. 200100039, Vector 21-41 Tobacco (26 pages total).

Von Weymarn, et al., "Quantitation of the minor tobacco alkaloids nornicotine, anatabine, and anabasine in smokers' urine by high throughput liquid chromatography mass spectrometry", Chem Res Toxicol, Mar. 21, 2016; vol. 29, No. 3 (20 pages total).

Walker, et al., "The combined effect of very low nicotine content cigarettes, used as an adjunct to usual Quitline care (nicotine replacement therapy and behavioural support), on smoking cessation: a randomized controlled trial", Addiction, 2012, vol. 107, No. 10 (11 pages total).

Bingwu, Wang, "Factors in Nicotine Biosynthesis in Tobacco", (Under the direction of Rongda Qu), 2011, Thesis (131 pages total).

Xie, et al., "Biotechnology: A Tool for Reduced-Risk Tobacco Products—The Nicotine Experience From Test Tube to Cigarette Pack", Recent Advances in Tobacco Science, 2004, pp. 17-37, vol. 30 (21 pages total).

Aizpurua-Olaizola, et al., "Identification and quantification of cannabinoids in *Cannabis sativa* L. plants by high performance liquid chromatography-mass spectrometry", Anal Bioanal Chem, 2014, pp. 7549-7560, vol. 406 (12 pages total).

Aycock, et al., "Registration of LAMD 609 Tobacco Germplasm", Crop Science, May-Jun. 1998, p. 904, vol. 38, No. GP-52, PI 599689 (1 page total).

Ayers, et al., "A General Procedure for the Enantioselective Synthesis of the Minor Tobacco Alkaloids Nornicotine, Anabasine, and Anatabine", The AAPS Journal, 2005; vol. 7, No. 3, article 75, (http://www.aapsi.org) (7 pages total).

Becker, et al., "A randomized trial of nicotine replacement therapy in combination with reduced-nicotine cigarettes for smoking cessation", Nicotine & Tobacco Research, Jul. 2008, pp. 1139-1148, vol. 10, No. 7 (10 pages total).

Melody M. Bomgardner, "CRISPR: A new toolbox for better crops", Chemical & Engineering News, 2017, pp. 30-34, vol. 95, No. 24 (12 pages total).

Bortesi, et al., "The CRISPR/Cas9 system for plant genome editing and beyond", Biotechnology Advances, 2015, pp. 41-52, vol. 33, No. 10 (12 pages total).

Burns, et al., "Mandated lowering of toxicants in cigarette smoke: a description of the World Health Organization TobReg proposal", Tobacco Control, 2008, pp. 132-141, vol. 17 (11 pages total).

Carvalho, et al., "Designing microorganisms for heterologous biosynthesis of cannabinoids", FEMS Yeast Research, 2017, pp. 1-11, vol. 17, No. 4 (11 pages total).

James F. Chaplin, "Registration of LAFC 53 Tobacco Germplasm", Crop Science, Mar.-Apr. 1975, p. 282, vol. 15, No. GP 13 (1 page total).

Chintapakorn, et al., "Antisense-mediated down-regulation of putrescine N-methyltransferase activity in transgenic *Nicotiana tabacum* L. can lead to elevated levels of anatabine at the expense of nicotine", Plant Molecular Biology, 2003, pp. 87-105, vol. 53 (19 pages total).

Dalton, et al., "Effects of down-regulating ornithine decarboxylase upon putrescine-associated metabolism and growth in *Nicotiana tabacum* L.", Journal of Experimental Botany, 2016, pp. 3367-3381, vol. 67, No. 11 (15 pages total).

Deboer, et al., "RNAi-mediated down-regulation of ornithine decarboxylase (ODC) leads to reduced nicotine and increased anatabine levels in transgenic *Nicotiana tabacum* L.", Phytochemistry, 2011, pp. 344-355, vol. 72 (12 pages total).

Donny, et al., "Randomized Trial of Reduced-Nicotine Standards for Cigarettes", New England Journal of Medicine; 2015, pp. 1340-1349, vol. 373 (10 pages total).

Farsalinos, et al., "Nicotine Delivery to the Aerosol of a Heat-Not-Burn Tobacco Product: Comparison With a Tobacco Cigarette and E-Cigarettes", Nicotine & Tobacco Research, 2017, pp. 1-6, doi: 10.1093/ntr/ntx138 (6 pages total).

Fellermeier, et al., "Prenylation of olivetolate by a hemp transferase yields cannabigerolic acid, the precursor of tetrahydrocannabinol", FEBS Letters; 1998, pp. 283-285 vol. 427 (3 pages total).

Gagne, et al., "Identification of olivetolic acid cyclase from *Cannabis sativa* reveals a unique catalytic route to plant polyketides", Proc Natl Acad Sci USA; Jul. 31, 2012, pp. 12811-12816, vol. 109, No. 31 (6 pages total).

Gaj, et al., "ZFN, TALEN and CRISPR/Cas-based methods for genome engineering", Trends in Biotechnology, 2013, pp. 1-20, vol. 31, No. 7 (20 pages total).

Hatsukami, et al., "Reduced nicotine content cigarettes: effects on toxicant exposure, dependence and cessation", Addiction, 2010, pp. 343-355, vol. 105 (13 pages total).

Hall, et al., "Differential Effects of Non-Nicotine Tobacco Constituent Compounds on Nicotine Self-Administration in Rats", Pharmacol Biochem Behav., May 2014; pp. 1-16, vol. 120 (16 pages tota).

Heatherton, et al., "The Fagerström Test for Nicotine Dependence: a revision of the Fagerström Tolerance Questionnaire", British Journal of Addiction, 1991, pp. 1119-1127, vol. 86 (10 pages total).

Hibi, et al., "Gene Expression in Tobacco Low-Nicotine Mutants", The Plant Cell, May 1994, pp. 723-735, vol. 6 (14 pages total).

Ron C. Hogg PhD, "Contribution of Monoamine Oxidase Inhibition to Tobacco Dependence: A Review of the Evidence", Nicotine & Tobacco Research, 2016; pp. 509-523 vol. 18, No. 5 (15 pages total).

"Tobacco Heating System (IQOS)", Briefing Document, Dec. 2017, Prepared by Philip Morris Products S.A. for the Jan. 24-25, 2018 Tobacco Products Scientific Advisory Committee Meeting of the Center for Tobacco Products of the U.S. Food & Drug Administration (89 pages total).

Lanteri, et al., "Inhibition of Monoamine Oxidases Desensitizes 5-HT$_{1A}$ Autoreceptors and Allows Nicotine to Induce a Neurochemical and Behavioral Sensitization", J. Neurosci., Jan. 28, 2009, pp. 987-997, vol. 29, No. 4 (11 pages total).

Legg, et al., "Inheritance of percent total alkaloids in *Nicotiana tabacum* L. Populations derived from crosses of low alkaloid lines with burley and flue-cured varieties", Journal of Heredity, 1969, pp. 213-217, vol. 60, No. 4.

Legg, et al., "Registration of LA Burley 21 Tobacco Germplasm", Crop Science, Mar.-Apr. 1970, p. 212, vol. 10, No. GP 8 (1 page total).

Lewis, et al., "Transgenic and Mutation-Based Suppression of a *Berberine Bridge Enzyme-Like* (*BBL*) Gene Family Reduces Alkaloid Content in Field-Grown Tobacco", PLOS One, Feb. 17, 2015, vol. 10, No. 2, DOI:10.1371 (17 pages total).

(56) References Cited

OTHER PUBLICATIONS

Ramsey S. Lewis, "Potential Mandated Lowering of Nicotine Levels in Cigarettes: A Plant Perspective", The Society for Research on Nicotine and Tobacco, 2018, doi: 10.1093/ntr/nty022 (15 pages total).

Lisko, et al., "Application of GC-MS/MS for the Analysis of Tobacco Alkaloids in Cigarette Filler and Various Tobacco Species", Anal Chem., Mar. 19, 2013; vol. 85, No. 6 (15 pages total).

Harry O. Lopez, "Developing Non-GMO Tobacco Cultivars with Lower Alkaloid Content Using a Reverse Genetics Strategy", Thesis, 2011 (120 pages total).

Morton, et al., "Cigarette smoke chemistry market maps under Massachusetts Department of Public Health smoking conditions", Regulatory Toxicology and Pharmacology, 2008, pp. 1-30, vol. 51, No. 1, doi: 10.1016/j.yrtph.2008.03.001 (30 pages total).

Mudge, et al., "Leaner and greener analysis of cannabinoids", Analytical and Bioanalytical Chemistry, 2017, pp. 3153-3163, vol. 409, No. 12 (11 pages total).

Nekrasov, et al., "Targeted mutagenesis in the model plant *Nicotiana benthamiana* using Cas9 RNA-guided endonuclease", Aug. 2013, pp. 691-693, vol. 31, No. 8 (3 pages total).

Stratton, et al.,"Public health consequences of e-cigarettes", National Academies of Sciences, Engineering, and Medicine, The National Academies Press, 2018, Washington, DC, doi: https://doi.org/10.17226/24952 (613 pages total).

National Institute on Drug Abuse (NIDA) Drug Supply Program, Notice No. NOT-DA-14-004, Notice of Availability of Nicotine Research Cigarettes (4 pages total).

Patel, et al., "Qualitative and quantitative measurement of cannabinoids in cannabis using modified HPLC/DAD method", Journal Pharmaceutical and Biomedical Analysis, 2017, pp. 15-23, vol. 146 (9 pages total).

Reed, et al., "The A and B loci of *Nicotiana tabacum* have non-equivalent effects on the mRNA levels of four alkaloid biosynthetic genes", Plant Science, 2004, pp. 1123-1130, vol. 167, No. 5 (8 pages total).

Baliga et al., "Project 1904: Tobacco Physiology and Biochemistry," Philip Morris Research; Accession No. 87-049; Mar. 27, 1987 (47 pages total).

"Alkaloid Reduced Tobacco (ART) Program," Philip Morris USA; Doc Code: P0622, Sep. 1, 1994, (33 pages total).

Rezaishiraz, et al., "Treating smokers before the quit date: Can nicotine patches and denicotinized cigarettes reduce cravings?", Nicotine & Tobacco Research, Nov. 2007, pp. 1139-1146, vol. 9, No. 11 (8 pages total).

"Table II—1985 Special R&D Tobaccos—Low Nicotine Tobacco 1985 Crop Chemical Analysis," R.J. Reynolds Tobacco Company; 1985 (1 page total).

Sirikantaramas, et al., "The Gene Controlling Marijuana Psychoactivity, Molecular Cloning and Heterologous Expression of $\Delta^1$-Tetrahydrocannabinolic Acid Synthase From *Cannabis sativa* L.", The Journal of Biological Chemistry, 2004, pp. 39767-39774, vol. 279, No. 38 (9 pages total).

Sisson, et al., "Alkaloid Composition of the *Nicotiana* Species", Beiträge zur Tabakforschung International, Jun.-Jul. 1990, pp. 327-339, vol. 14, No. 6 (13 pages total).

Stout, et al., "The hexanoyl-CoA precursor for cannabinoid biosynthesis is formed by an acyl-activating enzyme in *Cannabis sativa* trichomes", The Plant Journal, 2012, p. 1-13, vol. 71 (13 pages total).

Taura, et al., "Cannabidiolic-acid synthase, the chemotype-determining enzyme in the fiber-type *Cannabis sativa*", FEBS Letters; 2007, pp. 2929-2934, vol. 581 (6 pages total).

Taura, et al., "Characterization of olivetol synthase, a polyketide synthase putatively involved in cannabinoid biosynthetic pathway", FEBS Letters; 2009, p. 2061-2066, vol. 583 (6 pages total).

"Tobacco Production, Chemistry and Technology", 1999, Davis DL and Nielson, MT (Editors), Blackwell Publishing (12 pages total).

Hatsukami, et al., "Effect of Immediate vs Gradual Reduction in Nicotine Content of Cigarettes on Biomarkers of Smoke Exposure a Randomized Clinical Trial", JAMA, Sep. 4, 2018, p. 880-891, vol. 320, No. 9 (12 pages total).

Donny, E. C., Denlinger, R. L., Tidey, J. W., Koopmeiners, J. S., Benowitz, N. L., Vandrey, R. G., . . . Hatsukami, D. K. (Oct. 1, 2015). Randomized Trial of Reduced-Nicotine Standards for Cigarettes. New England Journal of Medicine, 373(14), 1340-1349. doi:10.1056/nejmsa1502403.

International Search Report and Written Opinion dated Dec. 3, 2019 in copending Application No. PCT/US2019/043611.

Wikipedia Article; "Tobacco specific Nitrosamines"; https://en.wikipedia.org/w/index.php?title=Tobacco-specific_nitrosamines&oldid=829617793; Mar. 9, 2018 (Mar. 9, 2018).

"Reducing the nicotine content to make cigarettes less addictive", Benowitz NL, Henningfield JW. Tob Control 2013; 22:i14-i17 (Yea : 2013).

| CODE | BRAND STYLE | FILLER WEIGHT (mg) | NICOTINE CONTENT OF FILLER (mg/g) | NICOTINE CONTENT PER CIGARETTE (mg) |
|---|---|---|---|---|
| 101 | MARLBORO KS HP | 710 | 19.60 | 13.92 |
| 102 | MARLBORO LT KS HP | 660 | 19.75 | 13.04 |
| 103 | MARLBORO ULT KS HP | 620 | 20.33 | 12.60 |
| 104 | MARLBORO BLEND 27 KS HP | 660 | 18.23 | 12.03 |
| 105 | BASIC KS HP | 720 | 18.10 | 13.03 |
| 106 | PARLIAMENT LT 100 HP | 800 | 20.23 | 16.18 |
| 107 | VIRGINIA SLIMS ULT 100 HP | 660 | 19.43 | 12.82 |
| 108 | MERIT LT KS HP | 680 | 19.95 | 13.57 |
| 109 | SALEM MENTHOL KS HP | 720 | 20.00 | 14.40 |
| 110 | CAMEL LT KS HP | 660 | 20.20 | 13.33 |
| 111 | NEWPORT LT MENTHOL KS HP | 620 | 21.40 | 13.27 |
| 112 | CAMEL ULT KS HP | 610 | 19.08 | 11.64 |
| 113 | WINSTON ULT KS SP | 630 | 20.30 | 12.79 |
| 114 | WINSTON KS HP | 670 | 19.90 | 13.33 |
| 115 | KOOL LT MENTHOL KS SP | 620 | 22.20 | 13.76 |
| 116 | GPC LT KS HP | 590 | 16.85 | 9.94 |
| 117 | DORAL ULT KS SP | 670 | 18.13 | 12.14 |
| 118 | MARLBORO LT MENTHOL KS HP | 650 | 19.20 | 12.48 |
| 119 | PARLIAMENT LT KS SP | 700 | 19.90 | 13.93 |
| 120 | MERIT ULTIMA KS HP | 480 | 24.27 | 11.65 |
| 121 | KOOL MENTHOL KS HP | 690 | 20.73 | 14.31 |
| 122 | NEWPORT MENTHOL KS SP | 740 | 21.57 | 15.96 |
| 123 | NOW 100 SP | 590 | 24.80 | 14.63 |
| | AVERAGE: | 658.70 | 20.18 | 13.25 |

*FIG. 2*

SUMMARY OF MINOR ALKALOID CONCENTRATIONS (n=7)
IN THE 50 TOP-SELLING CIGARETTE BRANDS

| ALKALOID | RANGE mg/g | MEAN mg/g | MEDIAN mg/g |
|---|---|---|---|
| ANATABINE | 0.927 - 1.390 | 1.10 | 1.09 |
| ANABASINE | 0.127 - 0.185 | 0.147 | 0.146 |
| NORNICOTINE | 0.659 - 0.986 | 0.763 | 0.746 |
| MYOSMINE | 0.00864 - 0.0173 | 0.014 | 0.0138 |
| ISONICOTEINE | 0.0234 - 0.0455 | 0.0341 | 0.0337 |

*FIG. 5*

VERY LOW NICOTINE CIGARETTE BLENDED WITH VERY LOW THC CANNABIS

CROSS-REFERENCE TO RELATED APPLICATIONS

This application is a continuation application of U.S. patent application Ser. No. 16/178,298, filed on Nov. 1, 2018, which is a continuation application of U.S. patent application Ser. No. 16/047,948, filed on Jul. 27, 2018, in the U.S. Patent and Trademark Office, the disclosure of which is herein incorporated by reference in its entirety.

BACKGROUND

1. Field

The present disclosure relates to tobacco products, including related methodology, devices and compositions.

2. Description of the Related Art

Due to the fact that the tobacco is burned, cigarettes are the most hazardous tobacco product on the health-risk continuum of tobacco and nicotine products, and medicinal nicotine such as the nicotine patch is the least hazardous. Tobacco smoke is a complex mixture of more than 5,000 smoke constituents which are bound to particles or are free in the gas phase. The temperature of the burning cone at the tip of a cigarette while a smoker puffs can reach more than 800° C. The vast majority of the more than one billion worldwide tobacco users smoke combustible cigarettes.

There are essentially two public policy strategies to reduce the harm caused by smoking. The first strategy is implementation of policies that encourage smoking cessation. Although cessation yields the greatest health benefits, quitting smoking is difficult and a large percentage of smokers has no desire to quit. Therefore, in conjunction with policies encouraging smoking cessation, the second strategy to reduce the harm caused by smoking is implementing tobacco harm reduction strategies. These include policies that encourage smokers to switch from cigarettes to less hazardous tobacco products. The goal is to migrate as many smokers of combustible cigarettes as possible to less risky tobacco or nicotine products toward the opposite end of the health-risk continuum. For example, Sweden has among the lowest incidence of smoking in Europe. The use of snus in Sweden has been growing in recent decades while smoking incidence has declined partially due to anti-smoking policies such as very high cigarette taxes. Switching smokers to snus has not been as successful in other countries. Unless used as an adjunct to cigarettes, it is difficult for smokers to exclusively switch to a smokeless tobacco product that is not inhaled such as snus. Although complete tobacco cessation is the gold standard for reducing the health risks of an individual smoker and smoking-related harm at the population level, many public health officials are in favor of tobacco harm reduction policies in conjunction with smoking cessation efforts.

Electronic cigarettes (e-cigarettes) were introduced into the Chinese market in 2004 and are generally considered to be less harmful than combustible cigarettes. E-cigarettes aerosolize a nicotine-containing liquid (e-liquid). Although e-cigarettes have gained popularity, e-cigarettes are a small fraction of worldwide cigarette sales. Even though the tobacco industry has invested enormous resources in marketing e-cigarettes, and some in the tobacco control community have publicly supported e-cigarettes, the adoption rate of e-cigarettes by smokers of conventional cigarettes has been disappointing and is much lower than originally anticipated by tobacco industry analysts. This low adoption rate is mainly due to the fact that e-cigarettes are less satisfying to smokers as compared to conventional cigarettes. Two primary reasons for reduced satisfaction are that nicotine in the vapor of e-cigarettes is not typically absorbed as well by the lungs and e-cigarettes do not include tobacco leaf, reconstituted tobacco or whole extractions of tobacco leaf. The only significant tobacco fraction in the vapor from e-cigarettes is nicotine. Thus, e-cigarettes are generally less satisfying to habitual conventional cigarette smokers than they are to non-smokers. For example, young adults who have never or hardly smoked conventional cigarettes find e-cigarettes more satisfying than do conventional cigarette smokers. E-cigarettes that seem to be the closest to conventional cigarettes in terms of satisfaction are e-cigarettes which include e-liquids containing a nicotine salt and an organic acid.

Tobacco smoke contains other active compounds besides nicotine. For example, and most importantly, monoamine oxidase (MAO) inhibitors. The combination of nicotine and MAO inhibitors in tobacco smoke results in conventional cigarettes being more satisfying to smokers than e-cigarettes or medicinal nicotine products. See, Lanteri et al. 2009, *J. Neurosci.*, January 28; 29(4):987-997 and Hogg 2016, *Nicotine Tob Res*. May; 18(5):509-23. Moreover, nicotine, MAO inhibitors and other tobacco compounds are carried on ultra-fine carbon-based particles (<100 nm in diameter) which are easily absorbed by the lungs thereby efficiency delivering these compounds to the smoker. The virtual instantaneous effects of inhaling tobacco smoke, including the combination of nicotine and MAO inhibitors, make it difficult for smokers to exclusively switch to e-cigarettes, smokeless tobacco products or medicinal nicotine products.

After recognizing the limited potential of e-cigarettes and in an effort to reduce the harm caused by smoking, the tobacco industry has intensely developed heat-not-burn tobacco devices over the last few years. As the name suggests, the tobacco in heat-not-burn tobacco devices is not burned but heated up to approximately 350° C. producing an aerosol for inhalation, which is in contrast to e-cigarettes that aerosolize a nicotine-containing liquid (e-liquid). Heat-not-burn tobacco devices deliver nicotine and other tobacco compounds similar to that of conventional cigarettes and have flavors and aromas that are more familiar to smokers than e-cigarettes. Examples of heat-not-burn tobacco products, also known as tobacco heating devices, tobacco heating products, and tobacco heating systems, include British American Tobacco's Glo®, Philip Morris Product's IQOS® and Japan Tobacco International's Ploom®. Smokers of conventional cigarettes generally rate tobacco heating devices higher than e-cigarettes.

There are dramatically less toxicants in the aerosol produced from tobacco heating devices compared to smoke produced from combustible cigarettes. For example, the aerosol in British American Tobacco's Glo produces around 90 percent less toxicants than smoke from a standard 3R4F reference cigarette (approximately 9 mg 'tar') in terms of the 9 types of harmful components which the World Health Organization recommends to reduce (4-(N-nitrosomethyl-amino)-1-(3-pyridyl)-1-butanone (NNK), N'-nitrosonornicotine (NNN), Acetaldehyde, Acrolein, Benzene, Benzo[a]pyrene, 1,3-Butadiene, Carbon monoxide and Formaldehyde). See, Burns et al. 2008, *Tobacco Control*, 17:132-141. The aerosol produced by e-cigarettes generally has even less toxicants than the aerosol produced by tobacco heating devices since e-liquids typically contain nicotine, water, flavors, humectants and generally do not contain other tobacco fractions. Due to the significant reduction of most toxicants, if a smoker switches to an e-cigarette or a tobacco heating device, the smoker's exposure to toxicants is reduced, and it is likely that the risk of tobacco-related disease will also be reduced. Accordingly, a key in reducing harm at the population level is for a significant number of smokers to switch to e-cigarettes or tobacco heating devices. This can be achieved more rapidly by increasing the adoption rate of e-cigarettes and tobacco heating devices by current cigarette smokers.

SUMMARY

Embodiments of the present disclosure provide tobacco products, including related methodology, devices, and compositions for transitioning a smoker of cigarettes to an aerosol device.

According to an aspect of an embodiment, there is provided a method of transitioning a smoker of conventional cigarettes to an aerosol device, the method including: providing the smoker a transition kit including a supply of very low nicotine cigarettes, an aerosol device, and information and recommendations for using said cigarettes and aerosol device during a transitional period, wherein the supply of very low nicotine cigarettes equals at least 20 percent of the number of conventional cigarettes the smoker smokes per day multiplied by the number of days in the transitional period; wherein the very low nicotine cigarettes contain about equal to or less than 2.0 mg of nicotine per cigarette; wherein the transitional period is less than 85 days; and wherein the information and recommendations include the following: instructions for the smoker to stop smoking conventional cigarettes at a first time point, commencing the transitional period, and after the first time point to smoke the very low nicotine cigarettes from the supply of very low nicotine cigarettes without restriction during the transitional period; recommendations or instructions that upon the smoker experiencing an overwhelming craving for a conventional cigarette, to use the aerosol device without restriction at a second time point; recommendations or instructions that after the second time point until the end of the transitional period, the smoker may also smoke the very low nicotine cigarettes without restriction; and recommendations or instructions for the smoker to stop smoking the very low nicotine cigarettes at the end of the transitional period and to continue to smoke the aerosol device.

In the method, the aerosol device may include a tobacco heating device and a supply of tobacco sticks, wherein the supply of tobacco sticks approximately equals the number of conventional cigarettes the smoker smokes per day multiplied by the number of days in the transitional period, and wherein each tobacco stick contains at least 2.0 mg of nicotine per tobacco stick.

In the method, the aerosol device may include e-cigarettes, wherein the e-cigarettes include a rechargeable device and a supply of e-liquid cartridges, wherein the supply of e-liquid cartridges approximately equals the product of the number of conventional cigarettes the smoker smokes per day and the number of days in the transitional period, divided by 20, and wherein each e-liquid cartridge contains at least 0.10 ml of nicotine by volume.

In the method, the aerosol device may include tobacco heating rods, wherein the supply of tobacco heating rods approximately equals the number of conventional cigarettes the smoker smokes per day multiplied by the number of days in the transitional period, and wherein each tobacco heating rod contains at least 2.0 mg of nicotine.

In the method, the information and recommendations are provided to the smoker by way of a smartphone, smartwatch or cellular telephone.

According to an aspect of an embodiment, there is provided a method of transitioning a smoker from dual use of conventional cigarettes and an aerosol device to either using an aerosol device exclusively or modifying said dual use by reducing the number of cigarettes smoked and increasing use an aerosol device, the method including: providing the smoker a transition kit including a supply of very low nicotine cigarettes, an aerosol device, and information and recommendations for using the very low nicotine cigarettes and an aerosol device during a transitional period, wherein the supply of very low nicotine cigarettes equals at least 20 percent of the number of conventional cigarettes the smoker smokes per day multiplied by the number of days in the transitional period; wherein the very low nicotine cigarettes contain about equal to or less than 2.0 mg of nicotine per cigarette; wherein the transitional period is less than 85 days; wherein the information and recommendations include the following: instructions for the smoker to stop smoking conventional cigarettes at a first time point, commencing the transitional period, and after the first time point to smoke the very low nicotine cigarettes from the supply of very low nicotine cigarettes without restriction during the transitional period; recommendations or instructions to also use the aerosol device without restriction after the first time point; and recommendations or instructions for the smoker to stop smoking the very low nicotine cigarettes at the end of the transitional period and to continue use the aerosol device.

In the method, the aerosol device may include a tobacco heating device and a supply of tobacco sticks, wherein the supply of tobacco sticks approximately equals the number of conventional cigarettes the smoker smokes per day multiplied by the number of days in the transitional period, and wherein each tobacco stick contains at least 2.0 mg of nicotine per tobacco stick.

In the method, the aerosol device may include e-cigarettes, wherein the e-cigarettes include a rechargeable device and a supply of e-liquid cartridges, wherein the supply of e-liquid cartridges approximately equals the product of the number of conventional cigarettes the smoker smokes per day and the number of days in the transitional period, divided by 20, and wherein each e-liquid cartridge contains at least 0.10 ml of nicotine by volume.

In the method, the aerosol device may include tobacco heating rods, wherein the supply of tobacco heating rods approximately equals the number of conventional cigarettes the smoker smokes per day multiplied by the number of days in the transitional period, and wherein each tobacco heating rod contains at least 2.0 mg of nicotine.

In the method, the information and recommendations are provided to the smoker by way of a smartphone, smartwatch or cellular telephone.

According to an aspect of an embodiment, there is provided a very low nicotine cigarette comprising equal to or less than 2.0 mg nicotine per cigarette, and more than 0.25 mg anatabine per cigarette.

The very low nicotine cigarette may include at least 0.10 mg anabasine per cigarette.

According to an aspect of an embodiment, there is provided a very low nicotine cigarette comprising equal to or less than 2.0 mg nicotine per cigarette and more than 0.10 mg anabasine per cigarette.

According to an aspect of an embodiment, there is provided kit for transitioning a smoker of conventional cigarettes from smoking said cigarettes to using an aerosol device during a transitional period of less than 85 days, said kit comprising one or more compartments containing very low nicotine cigarettes, an aerosol device, and information and recommendations, wherein the number of very low nicotine cigarettes is based on a level of consumption of conventional cigarettes by the smoker and a method of transitioning the smoker from smoking said cigarettes to using said aerosol device employed according to the information and recommendations, wherein each of the very low nicotine cigarettes contains equal to or less than 2.0 mg of nicotine per cigarette, and wherein the information and recommendations include instructions on how the smoker uses the very low nicotine cigarettes and the aerosol device to transition the smoker from cigarettes to an aerosol device.

In the kit, the aerosol device may include a tobacco heating device and a supply of tobacco sticks, wherein the supply of tobacco sticks approximately equals the number of conventional cigarettes the smoker smokes per day multiplied by the number of days in the transitional period, and wherein the tobacco sticks contain at least 2.0 mg of nicotine per tobacco stick.

In the kit, the aerosol device may include e-cigarettes and the e-cigarettes include a rechargeable device and e-liquid cartridges, wherein the supply of e-liquid cartridges approximately equals the product of the number of conventional cigarettes the smoker smokes per day and the number of days in the transitional period, divided by 20, and wherein each e-liquid cartridge contains at least 0.10 ml of nicotine by volume.

In the kit, each of the very low nicotine cigarettes comprises at least 1.0 mg of cannabinoids.

In the kit, each of the very low nicotine cigarettes comprises at least 2.0 mg of reconstituted *cannabis*.

According to an aspect of an embodiment, there is provided a cigarette comprising low nicotine tobacco and very low THCA/THC *cannabis* buds, wherein the nicotine content of the cigarette is equal to or less than 2.0 mg, and wherein the collective THCA and THC content of the cigarette is equal to or less than 1.25 mg/g.

In the cigarette, the very low THCA/THC *cannabis* buds are from a *cannabis* plant in which Δ9-tetrahydrocannabinolic acid has been reduced, as compared to a control *cannabis* plant, by down-regulating the expression of tetrahydrocannabinolic acid synthase (SEQ ID NO: 21).

According to an aspect of an embodiment, there is provided reconstituted *cannabis* made from a *cannabis* plant in which Δ9-tetrahydrocannabinolic acid has been reduced, as compared to a control *cannabis* plant, by down-regulating the expression of tetrahydrocannabinolic acid synthase (SEQ ID NO: 21) in *cannabis* plants.

According to an aspect of an embodiment, there is provided a very low cigarette of reconstituted *cannabis* made from a *cannabis* plant in which Δ9-tetrahydrocannabinolic acid has been reduced, as compared to a control *cannabis* plant, by down-regulating the expression of tetrahydrocannabinolic acid synthase (SEQ ID NO: 21) in *cannabis* plants.

According to an aspect of an embodiment, there is provided an apparatus including a communications module; a storage unit storing computer-readable instructions; and at least one processor coupled to the communications module and the storage unit, the at least one processor being configured to execute the computer-readable instructions to: receive, via the communications unit, a first signal from a device of a first smoker, the first signal comprising first demographic data characterizing the first smoker and usage data characterizing tobacco use by the first smoker; in response to receiving the first signal, obtain profile data associated with respective one or more second smokers, the profile data comprising (i) second demographic data characterizing the respective second smokers and (ii) program data identifying a product and method utilized by the respective second smokers to transition from conventional cigarettes to an aerosol device; based on an application of a probabilistic algorithm to the first demographic data, the usage data, and the profile data, compute a value indicative of a likelihood that the first smoker transitions from the conventional cigarettes to the an aerosol device using each of a plurality of candidate products and methods for administration to the first smoker capable of transitioning the first smoker from the conventional cigarettes to the tobacco an aerosol device from among the program data identifying a product and method utilized by the respective second smokers to transition from conventional cigarettes to an aerosol device; select one of the candidate products and methods for administration to the first smoker based on the computed values; and transmit, via the communications unit, a second signal that identifies the selected product and method for administration to the first smoker to the device of the first smoker for the device of the first smoker to present, in a user interface, information characterizing an administration of the selected product and service for administration to the first smoker for transitioning the first smoker from the conventional cigarettes to an aerosol device.

In the apparatus, the storage unit stores a database maintaining the profile data; and the at least one processor is further configured to obtain, from the database, a portion of the profile data associated with the one or more second smokers in response to receiving the first signal.

In the apparatus, the at least one processor is further configured to identify the candidate products and methods for administration to the first smoker based on the portion of the profile data.

In the apparatus, the probabilistic algorithm comprises at least one of a statistical process or a machine learning algorithm.

In the apparatus, the first demographic data comprises age or sex; and the second demographic data comprises age or sex.

In the apparatus, the usage data comprises number of years smoking or number of cigarettes per day.

In the apparatus, the at least one processor is further configured to select the one of the candidate products based on a comparison of the first and second demographic data.

In the apparatus, the at least one processor is further configured to: select the one of the candidate products and method for administration to the first smoker based on a maximum value among the for each of the plurality of candidate products and methods for administration to the first smoker capable of transitioning the first smoker from the conventional cigarettes to an aerosol device.

According to an aspect of an embodiment, there is provided a system for transitioning a smoker from cigarette smoking to an aerosol device, the system including: a memory storing a database of smoker profiles respectively in association with method and product variables of transition regimens for transitioning smokers from cigarette smoking to an aerosol device, each smoker profile comprising demographic and tobacco use characteristics of the respective smokers; and a processor configured to execute a program for a method of providing a recommended transition regimen for transitioning a smoker from cigarette smoking to an aerosol device, the method comprising: receiving demographic data of the smoker and tobacco usage data of the smoker; determining demographic characteristics and tobacco use characteristics of the smoker, based on the demographic data of the smoker and the tobacco usage data of the smoker; determining one or more smoker profiles in the database having demographic and tobacco use characteristics of the respective smokers similar to the demographic characteristics and tobacco use characteristics of the smoker; determining method and product variables of a transition regimen for transitioning the smoker from cigarette smoking to an aerosol device based on the product variables of transition regimens for transitioning the smokers from cigarette smoking to an aerosol device; and providing, to the smoker, the transition regimen for transitioning the smoker from cigarette smoking to an aerosol device.

In the system, the respective smokers comprise smokers successfully transitioning from cigarette smoking to the tobacco an aerosol device, smokers currently transitioning from cigarette smoking to an aerosol device, and smokers unsuccessfully transitioning from cigarette smoking to an aerosol device, and wherein the determining method and product variables of a transition regimen for transitioning the smoker from cigarette smoking to an aerosol device comprises: determining, by predictive learning, method and product variables of a transition regimen for transitioning the smoker from cigarette smoking to an aerosol device based on weighing the method and product variables of transition regimens for transitioning the smokers from cigarette smoking to the tobacco an aerosol device according to probabilities that the method and product variables of transition regimens for transitioning the smokers from cigarette smoking to an aerosol device will transition the smoker from cigarette smoking to an aerosol device.

In the system, each of the demographic of the respective smoker and the demographic data of the smoker comprises at least one of age, race, gender, ethnicity, national origin, education level, occupation, and marital status.

In the system, each of the tobacco use characteristics of the smoker and the tobacco use characteristic of the respective smoker comprises at least one of number of years smoking, number of packs per day, Fagerstrom dependence score, pack-year rating, total smoke dependence score, average number of cigarettes smoked per day over the last month, usual cigarette brand, current or previous use of nicotine products including e-cigarettes, current or previous use of a tobacco heating product, current or previous use of any other tobacco products, number of previous cigarette quit attempts if any, and level of interest in switching to e-cigarettes or a tobacco heating product compared to level of interest in quitting tobacco altogether.

In the system, the method and product variables of the transition regimen the smoker from cigarette smoking to an aerosol device are selected from among the method and product variables of transition regimens for transitioning smokers from cigarette smoking to an aerosol device of the one or more smoker profiles in the database having demographic and tobacco use characteristics of the respective smokers similar to the demographic characteristics and tobacco use characteristics of the smoker.

In the system, the transition regimen for transitioning the smoker from cigarette smoking to an aerosol device comprises a length of a transitional period, a type of an aerosol device, a type of very low nicotine cigarettes, and recommendations and instructions for using the type of an aerosol device and the type of the very low nicotine cigarettes during the transitional period.

BRIEF DESCRIPTION OF THE DRAWINGS

The above and/or other aspects of the present disclosure will be more apparent by describing certain embodiments of the present disclosure with reference to the accompanying drawings, in which:

FIG. 2 is a table of cigarette brand styles showing the weight of the filler, nicotine content of the filler, and per-cigarette nicotine content;

FIG. 5 is a table of the levels of minor tobacco alkaloids, including anatabine and anabasine, in the filler of the fifty top-selling cigarette brand styles.

BRIEF DESCRIPTION OF THE SEQUENCES

Figure 1:
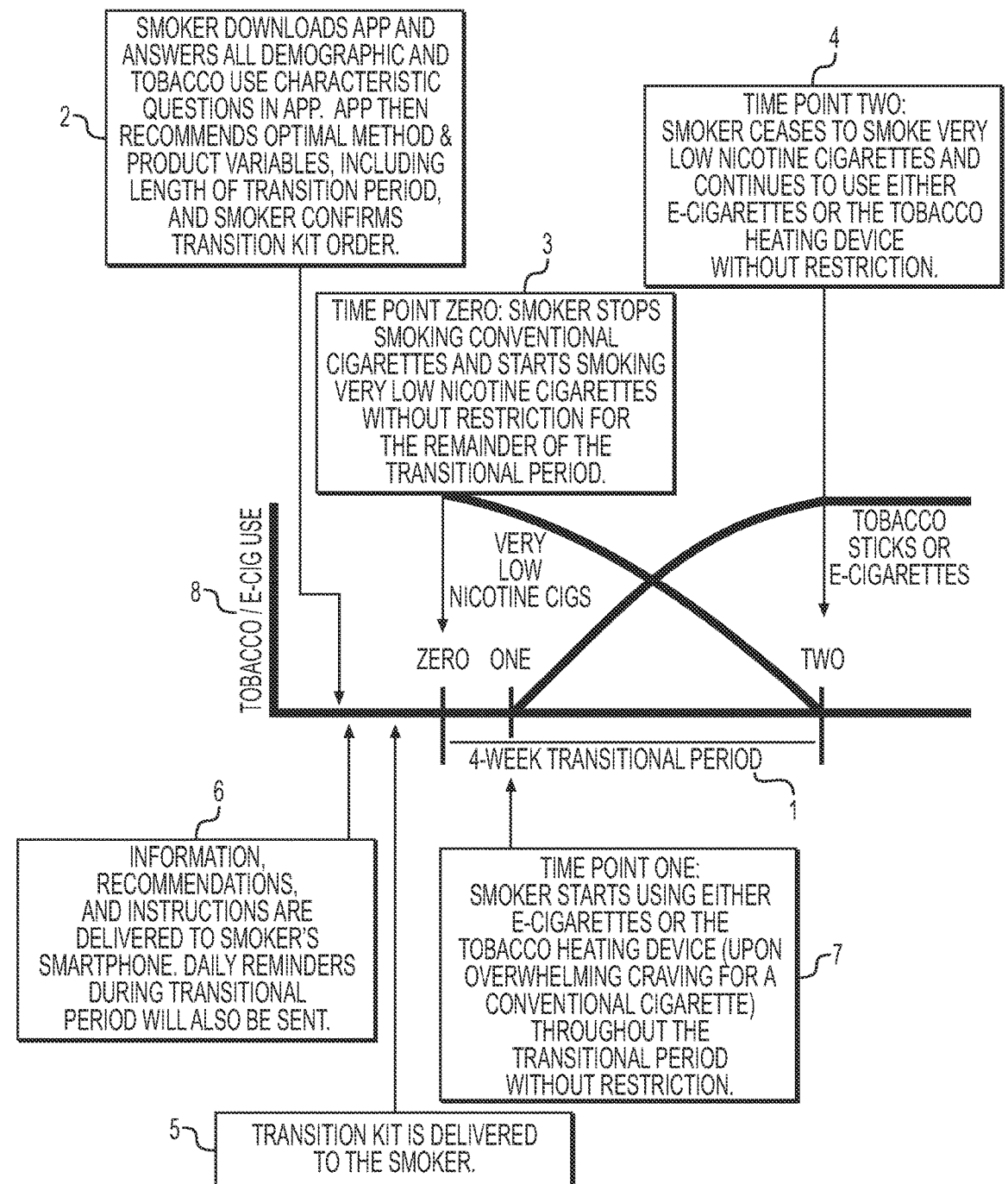
FIG. 1 is a diagram illustrating a method of transitioning cigarette smokers to e-cigarettes or a tobacco heating device.

SEQ ID NO: 1 is a nucleic acid sequence of quinolate phosphoribosyl transferase (QPT). The protein encoded by this nucleic acid sequence is SEQ ID NO: 2.

SEQ ID NO: 3 (Accession No. AF280402.1) is a nucleic acid sequence of putrescine N-methyltransferase (PMT1). The protein encoded by this nucleic acid sequence is SEQ ID NO: 4.

SEQ ID NO: 5 (Accession No. AF126809.1) is a nucleic acid sequence of putrescine N-methyltransferase (PMT2). The protein encoded by this nucleic acid sequence is SEQ ID NO: 6.

SEQ ID NO: 7 (Accession No. AB289456.1) is a nucleic acid sequence of N-methylputrescine oxidase (MPO). The protein encoded by this nucleic acid sequence is SEQ ID NO: 8.

SEQ ID NO: 9 (Accession No. AF127242) is a nucleic acid sequence of Ornithine Decarboxylase (ODC). The protein encoded by this nucleic acid sequence is SEQ ID NO: 10.

SEQ ID NO: 11 is a nucleic acid sequence of NBB1(BBL gene family). The protein encoded by this nucleic acid sequence is SEQ ID NO: 12.

SEQ ID NO: 13 is a nucleic acid sequence of Acyl activating enzyme. The protein encoded by this nucleic acid sequence is SEQ ID NO: 14.

SEQ ID NO: 15 (Accession No. AB164375) is a nucleic acid sequence of Olivetol synthase. The protein encoded by this nucleic acid sequence is SEQ ID NO: 16.

SEQ ID NO: 17 (Accession No. AFN42527.1) is a nucleic acid sequence of Olivetolic acid cyclase. The protein encoded by this nucleic acid sequence is SEQ ID NO: 18.

SEQ ID NO: 19 is a nucleic acid sequence of Aromatic prenyltransferase. The protein encoded by this nucleic acid sequence is SEQ ID NO: 20.

SEQ ID NO: 21 is a nucleic acid sequence of tetrahydrocannabinolic acid synthase precursor (Accession No. AB057805.1). The protein encoded by this nucleic acid sequence is SEQ ID NO: 22.

SEQ ID NO: 23 is a nucleic acid sequence of cannabidiolic acid synthase (Accession No. AB292682). The protein encoded by this nucleic acid sequence is SEQ ID NO: 24.

SEQ ID NO: 25 is a nucleic acid sequence of Cannabichromenic acid synthase. The protein encoded by this nucleic acid sequence is SEQ ID NO: 26.

DETAILED DESCRIPTION OF THE EMBODIMENTS

E-cigarettes and tobacco heating devices have great potential for tobacco harm reduction; however, important issues need to be rectified. First, after smokers have tried e-cigarettes or tobacco heating devices, the rate of smokers exclusively adopting these aerosol devices is low and needs to increase. Secondly, of the population of people who regularly use e-cigarettes or a tobacco heating device, a large percentage of this population still smoke their usual brand of conventional cigarettes. This is referred to as "dual use" and as used herein means that conventional cigarettes are still smoked regularly, either daily or less than daily, in conjunction with e-cigarettes or in conjunction with a tobacco heating device. For example, in Philip Morris' THS-PBA-07 study in the United States (n=969), Japan (n=638), South Korea (n=843), Italy (n=535), Germany (n=377) and Switzerland (n=416), dual use of cigarettes and IQOS® during the last week of the study ranged from 96% in Switzerland to 84% in South Korea. In other words, only 4% and 16% of subjects in Switzerland and South Korea, respectively, fell into the "exclusive HeatStick® use" category, which is defined in the study as ≥95% HeatStick use. These percentages are lower if exclusive use was defined as 99% to 100% HeatStick use. HeatStick is a type of tobacco stick for IQOS® produced and trademarked by Philip Morris Products S.A.

For e-cigarettes or tobacco heating devices to significantly reduce the harm caused by conventional cigarettes among smokers not interested in quitting tobacco use, it is imperative to exclusively switch as many smokers as possible from cigarettes to e-cigarettes or tobacco heating devices and to do so as quickly as possible. This entails getting as many smokers as possible to try e-cigarettes or a tobacco heating device as quickly as possible and to increase the adoption rate of these products. Among current dual users of conventional cigarettes and tobacco heating products, smoking conventional cigarettes must be eliminated or at least reduced by as much as possible. Among current dual users of conventional cigarettes and e-cigarettes, smoking conventional cigarettes must be eliminated or at least reduced by as much as possible. Recent market data suggests that the rate of smokers switching to tobacco heating products has leveled off in Japan and other markets. The adoption rate at which conventional cigarette smokers, upon trying e-cigarettes or tobacco heating products, switch to these products needs to increase, and among dual users, cigarette use needs to be entirely replaced with, or at least reduced by, the use of e-cigarettes or tobacco heating products.

Accordingly, there is an important need for methods and products to facilitate conventional cigarette smokers who have never tried e-cigarettes or a tobacco heating device to switch to using one of these types of products and for dual users of conventional cigarettes and e-cigarettes to exclusively switch to e-cigarettes, and for dual users of conventional cigarettes and a tobacco heating device to exclusively switch to a tobacco heating device. Embodiments of the present disclosure relate to new methods and products to facilitate smokers switching to e-cigarettes or a tobacco heating device. To facilitate cigarette smokers switching, the conditioning principles of psychology are utilized during a transitional period wherein the pleasurable effects of smoke from combustible cigarettes are extinguished while the smoker is rewarded with aerosol from e-cigarettes or a tobacco heating device.

Smokers of conventional cigarettes immediately experience what is known as 'throat impact' caused by the significant presence of nicotine in tobacco smoke. This is the sensation that is immediately felt at the back of the throat by smokers upon inhaling smoke from conventional cigarettes. The nicotine in the smoke reaches the brain in approximately ten seconds from the time the smoke is inhaled. This nicotine hit from smoking causes mild euphoria. Other effects, which are generally perceived as positive by smokers, include improvements in concentration and short-term memory, increased heart rate, and appetite suppression. The cycle of craving a cigarette, smoking a cigarette, obtaining enjoyable rewards during and after smoking the cigarette, and then starting the cycle all over again is repeated over and over again by smokers.

The principles of extinction dictate that when behavior (response), which has been previously reinforced, no longer produces reinforcing consequences, the behavior eventually stops occurring. The behavior of lighting and smoking conventional nicotine-content combustible cigarettes is reinforced by throat impact immediately followed by mild euphoria and the other aforementioned effects. Smoking very low nicotine cigarettes do not result in, to any significant extent, throat impact or other effects of conventional cigarettes. In research studies, smoking very low nicotine cigarettes reduces daily cigarette use and smoke exposure and results in reduced craving for conventional cigarettes. See, e.g., Donny et al. 2015, *N Engl J Med;* 373:1340-9. Since very low nicotine cigarettes look, smell and smoke like conventional cigarettes, they are useful for facilitating smokers switching from conventional cigarettes to e-cigarettes or a tobacco heating device.

Positive reinforcement (reinforcement) occurs when a behavior (response) is rewarding or the behavior is followed by another stimulus that is rewarding, thus increasing the frequency of that behavior. During the transitional period of the methods disclosed herein, while smoking very low nicotine cigarettes are extinguishing the pleasurable and reinforcing effects of conventional cigarettes, using e-cigarettes or a tobacco heating device reinforces the pleasurable effects of tobacco, thereby facilitating smokers transitioning from conventional cigarettes to either of these less harmful products. For example, as shown in FIG. 1, the smoker stops smoking conventional cigarettes to start an exemplary 4-week transitional period 1 of Method A (as further explained below) and starts smoking very low nicotine cigarettes. Upon an overwhelming craving for a conventional cigarette, the smoker starts using e-cigarettes or a tobacco heating device and may also continue to smoke the very low nicotine cigarettes until the end of the transitional period, when at such time the smoker stops smoking very low nicotine cigarettes and continues using e-cigarettes or the tobacco heating device. Unlike e-cigarettes which are popular, approximately 99.95 percent of current worldwide smokers has never smoked a very low nicotine cigarette, and approximately 97 percent of current worldwide smokers has never used a tobacco heating device. Very low nicotine cigarettes, including the improved types disclosed herein, are ideal for smokers to use in conjunction with the methods disclosed herein to transition smokers to either e-cigarettes or tobacco heating products. In the United States, a very low nicotine cigarette strictly for research studies is available and distributed by the National Institute on Drug Abuse (NIDA) of the National Institutes of Health (NIH) under the Nicotine Research Cigarettes Drug Supply Program.

Each and every reference cited in this application, including patents, publications of patent applications, non-patent literature, and any other reference are incorporated herein by reference in their entirety. Each of the terms "about" or "approximately" is used herein to mean roughly, around, nearly, or in the region of. When the term "about" or "approximately" is used in conjunction with a numerical value or range, it modifies that value or range by reasonably extending the boundaries above and below the numerical values set forth.

As used herein, "cigarette" means any roll of tobacco, which may include non-tobacco materials, wrapped in paper that when lit combusts and produces smoke. A cigarette usually also includes a filter, plug wrap (constrains the filtration materials) and tipping paper (holds the cigarette paper to the filter and plug wrap). Glue seals the cigarette paper together, and if the cigarette has a filter, glue holds these other components together. The term cigarette shall also include any roll of tobacco wrapped in any substance containing tobacco (e.g., cigar wrapper) which, because of its appearance, the type of tobacco used in the filler, or its packaging and labeling, is likely to be offered to, or purchased by, consumers as a cigarette. An example is a 'little cigar' which may include a filter and generally looks very similar to a cigarette.

The term cigarettes include roll-your-own cigarettes and make-your-own cigarettes; both types of cigarettes are typically put together by end users. Roll-your-own cigarettes can simply be made with tobacco and cigarette rolling papers or cigarette rollers can be used to roll the tobacco into the rolling paper. Make-your-own cigarettes are generally made with a mechanical cigarette injector machine in conjunction with cigarette tubes (e.g., assembled filtered cigarettes without any tobacco). An injector mechanism injects the tobacco into the tobacco tube and the result is a cigarette that looks identical to a typical pre-rolled commercial cigarette. Cigarettes can also be made by end users with motorized make-your-own cigarette machines.

As used herein, "filler" means the cumulative smokable material (besides cigarette paper), wrapped in the rod of a cigarette, or in a tobacco stick of a tobacco heating device (or in tobacco heating rod [e.g., TEEPS®] if no separate holder), selected from the group consisting of cut tobacco leaf (cut-rag), tobacco stem, reconstituted tobacco, expanded tobacco, *cannabis*, casings, flavorings and other additives which may include additional alkaloids or cannabinoids from an extrinsic source. Reconstituted tobacco, also known as recon, is usually included in the filler of cigarettes and resembles cut-rag tobacco. Expanded tobacco is also usually included in the filler of cigarettes and is processed through the expansion of suitable gases so that the tobacco is 'puffed' resulting in reduced density and greater filling capacity of the tobacco rod. Expanded tobacco reduces the weight of tobacco used in cigarettes.

As used herein, "reconstituted tobacco sheet" means a tobacco sheet produced by the rolling or casting of tobacco dust, stems and/or by-products that have been previously finely ground are then mixed with a cohesive agent or binder and may include humectants, flavors, preservatives, cannabinoids and/or additional terpenes. There are essentially two types of reconstituted tobacco in the art, band cast and paper cast, but for either of these each producer has a slightly different process. Once fabricated, the reconstituted tobacco sheet which is essentially 'recycled' tobacco, is then cut into small strips. The size and shape of the strips are similar to cut-rag tobacco and this "reconstituted tobacco" may be blended into the filler of cigarettes. See, e.g., U.S. Pat. Nos. 4,270,552 and 5,724,998 and Chapter 11, 377-379, Tobacco: Production, Chemistry and Technology, 1999; both of which are incorporated herein by reference in their entireties.

"Alkaloids" are a group of nitrogenous compounds typically of plant origin. For example, nicotine is the primary alkaloid found in commercialized, conventional cigarette tobacco accounting for, depending on tobacco type (e.g., flue cured) and variety (e.g., K326), about 95 percent of the total alkaloids in tobacco leaf. Anatabine, nornicotine, anabasine and other alkaloids account for the remaining portion of total alkaloids. Depending on tobacco type and variety, in tobacco leaf, anatabine accounts for about 1% to about 4%, nornicotine accounts for about 1% to about 3%, and anabasine accounts for about 0.02% to about 0.4%. As used herein 'nicotine,' 'anatabine' and 'anabasine' may be derived from any plant species including any species of the genus *Nicotiana*, and any of these alkaloids may also be synthesized, or be an analog, or be made in the form of salts of organic acids. Synthetic nicotine, synthetic anatabine and synthetic anabasine, analogs of nicotine, analogs of anatabine and analogs of anabasine, and nicotine salts of organic acids, anatabine salts of organic acids and anabasine salts of organic acids, are included in the meaning of nicotine, anatabine and anabasine, respectively. See, e.g., Sisson et al. 1990, *Beitrage zur Tabakforschung International*, Volume 14, No. 6, June-July.

As used herein, "conventional cigarette" means a cigarette having a conventional nicotine content of at least 9 mg per cigarette. Per-cigarette nicotine content is the product of the weight of the filler in a cigarette rod and the nicotine content of the filler in the cigarette rod. Popular brands generally contain approximately 13 mg nicotine per cigarette. For example, as shown in FIG. 2, a Marlboro® cigarette (code 102) contains 13.04 mg nicotine, which equals the weight of the filler, 660 mg, multiplied by the nicotine content of the filler, 19.75 mg/g. Across the 23 American commercial cigarette brand styles analyzed in FIG. 2, per-cigarette nicotine content ranged from 9.94 mg (GPC®—code 116) to 16.18 mg (Parliament®—code 106) and averaged 13.25 mg. See, Morton et al. 2008, *Regul Toxicol Pharmacol*. doi: 10.1016/j.yrtph.2008.03.001. However, per-cigarette nicotine content can be more than 20 mg; these higher nicotine brands are not shown in FIG. 2.

The weight of the filler in commercial cigarettes can vary widely across brands and depends on various factors such as the ratio of the components contained in the filler (e.g., whole leaf tobacco is heavier than expanded tobacco), tobacco rod length and circumference (volume), moisture levels, and the filler density level each cigarette is packed. Across the 23 brand styles analyzed and shown in in FIG. 2, the per-cigarette weight of the filler ranged from 480 mg (Merit®—code 120) to 800 mg (Parliament®—code 106), and the average was 659 mg.

The nicotine content of the filler in commercial cigarettes can also vary widely across brands. One major factor is the type of tobacco used and the percentage of each type used. Generally, burley tobacco has the highest nicotine content followed by flue-cured tobacco and oriental tobacco. Some cigarette brands include flue-cured tobacco without any burley or oriental, others include flue-cured and burley without oriental, and others include all three tobacco types. Most cigarette brands also contain reconstituted tobacco and expanded tobacco. Another major factor of nicotine content of filler is the amount of non-nicotine components in the filler such as casing and top flavors. Across the 23 brand styles analyzed in FIG. 2, the nicotine content of the filler ranged from 16.85 mg/g (GPC—code 116) to 24.27 mg/g (Merit—code 120), the average nicotine content of the filler was 20.18 mg/g, and the average nicotine content per cigarette was 13.25 mg.

The 3R4F reference cigarette is supplied to tobacco manufacturers by the Kentucky Tobacco Research & Development Center of the University of Kentucky and is a long-established standard for measuring cigarette filler and smoke chemistry. The tobacco weight (13% OV) of the filler in the 3R4F reference cigarette is 0.783 gram and the filler contains 20.5 mg/g (2.05%) total alkaloids. The cigarette therefore contains about 16.05 mg of total alkaloids. Although the nicotine portion of total alkaloids was not disclosed by the University of Kentucky analysis of the 3R4F reference cigarette, since nicotine typically comprises approximately 95% of total alkaloids in tobacco, the nicotine content of the 3R4F reference cigarette is about 15.7 mg.

As used herein, "very low nicotine cigarette" means a cigarette containing 2.0 milligrams (mg) nicotine per cigarette or less such as less than 0.05 mg, 0.10 mg, 0.15 mg, 0.20 mg, 0.25 mg, 0.30 mg, 0.35 mg, 0.40 mg, 0.45 mg, 0.50 mg, 0.55 mg, 0.60 mg, 0.65 mg, 0.70 mg, 0.75 mg, 0.80 mg, 0.85 mg, 0.90 mg, 0.95 mg, 1.00 mg, 1.05 mg, 1.10 mg, 1.15 mg, 1.20 mg, 1.25 mg, 1.30 mg, 1.35 mg, 1.40 mg, 1.45 mg, 1.50 mg, 1.55 mg, 1.60 mg, 1.65 mg, 1.70 mg, 1.75 mg, 1.80 mg 1.85 mg, 1.90 mg or 1.95 mg nicotine per cigarette. This is calculated by multiplying the weight of the filler in a cigarette rod by the nicotine content of the filler in the cigarette rod. For example, a cigarette containing 2.0 mg nicotine and weighing 0.667 gram has filler with a nicotine content of about 3 mg/g. Filler having a nicotine content of 3 mg/g equates to an approximate 85% reduction of the average nicotine content of tobacco filler of the cigarette brand styles in FIG. 2.

Total alkaloid levels or individual alkaloid levels such as the level of nicotine, anatabine or anabasine can be measured by several methods known in the art. Examples include quantification based on gas chromatography (GC) and high performance liquid chromatography. See, e.g., Lisko et al. 2013, *Anal Chem*. March 19; 85(6): 3380-3384, which provides the following methods used to measure quantities of alkaloids in the filler of cigarette brands and in tobacco types (e.g., burley tobacco). The analysis of minor alkaloids has been performed with gas chromatography (GC) coupled with a wide spectrum of detection techniques including flame ionization detection (FID), nitrogen-phosphorus detection (NPD), and mass spectrometry (MS). Other analysis approaches have included high-performance liquid chromatography-ultraviolet detection (HPLC-UV), capillary zone electrophoresis-ultraviolet detection (CZE-UV), micellar electrokinetic capillary chromatography-ultraviolet detection (MECC-UV), nitrogen chemiluminescence detection (NCD), and microemulsion electrokinetic chromatography-ultraviolet detection (MEEKC-UV). Utilization of gas chromatography-tandem mass spectrometry (GC-MS/MS) in multiple reaction mode (MRM) mode allows for greater compound specificity by eliminating matrix ions arising from other compounds that share the same parent mass but lack the correct transition ion, drastically decreasing background interferences and reducing detection limits. Unless specified insinuated otherwise, analyte measurements (e.g., nicotine) are on a dry weight basis.

As used herein, a "tobacco heating device" is a device that heats, but does not burn, tobacco and produces an aerosol, not tobacco smoke. A tobacco heating device may be comprised of a holder, tobacco sticks and a charger. In this exemplary configuration, the IQOS® tobacco stick (HeatStick®), for example, is inserted into the IQOS® holder which heats the tobacco material by means of an electronically-controlled heating blade. The HeatStick® differs from a cigarette in many ways. For example, the tobacco in the HeatSticks® for the IQOS® product is made from tobacco powder and the tobacco is uniquely processed and specifically designed to function with the holder to produce an aerosol. Unlike a cigarette that contains tobacco cut-filler (tobacco leaf cut in small pieces found in cigarettes), the HeatStick® contains specially processed tobacco that has been reconstituted into sheets (termed cast-leaf) following the addition of water, glycerin, guar gum (hemi-cellulose), and cellulose fibers. This tobacco stick, unlike a cigarette, contains two unique and independent filters, a polymer-film filter to cool the aerosol and a low-density cellulose acetate mouthpiece filter to mimic this aspect of a cigarette. A hollow acetate tube separates the tobacco plug and the polymer-film filter. The charger recharges the holder and stores enough energy for the use of around 20 tobacco sticks and can be recharged from household power.

IQOS® is operated by the user inserting a tobacco stick into the holder and turning on the device by means of a switch. These steps initiate the heating of the tobacco via the heating blade inserted into the tobacco plug. The heating, which is electronically controlled, combined with the uniquely processed tobacco, prevent combustion from occurring. The holder supplies heat to the tobacco stick through the heating blade for about six minutes and allows up to 14 puffs to be drawn by the user during that time. The temperature of the heating blade is carefully controlled and the energy supply to the blade is cut if its operating temperature exceeds 350° C. The temperature measured in the tobacco never attains 350° C., and most of the tobacco remains below 250° C.

IQOS® produces an aerosol that has a very different composition than cigarette smoke due to heating tobacco below the level of combustion. The aerosol contains significantly reduced levels of harmful and potentially harmful constituents (HPHCs), as compared with cigarette smoke, and is composed mainly of water, glycerin and nicotine. The chemical analysis of the aerosol generated by IQOS® confirmed that IQOS® aerosol contains substantially reduced levels of HPHCs. On average, this equates to >90% reduction in the levels of HPHCs compared with smoke from the 3R4F reference cigarette.

In another exemplary configuration, a tobacco heating device is ignited like a conventional cigarette. There may not be any holder, charger or battery and the tobacco may be directly heated in a tobacco heating rod. For example, an ignited carbon heat source heats (and does not burn) the tobacco and produces an aerosol similar to tobacco heating devices which comprise of separate tobacco sticks. The types of tobacco heating devices with carbon heat sources, for example, closely resemble a typical cigarette physically, but do not burn. The disposable heating element is contained in each rod producing the aerosol that is inhaled, known herein as a "tobacco heating rod" or "heating rod." These types of tobacco heating devices also have significantly reduced levels of HPHCs. An example is TEEPS® which is being developed by Philip Morris International. Other examples include Eclipse® and Revo®, which were previously sold in the United States but are no longer on the market. In another exemplary configuration, a tobacco heating device has no holder or charger and includes a battery in every heating rod and each heating rod may be disposable. Accordingly, it is understood that any device that heats tobacco (or tobacco extract or a form of tobacco such as reconstituted tobacco) below combustion (and does not burn tobacco) to produce an aerosol is a tobacco heating device (or any other synonymous term), regardless whether there are separate tobacco sticks from the holder or heating element, whether charging a battery is required or a battery is even required, whether something needs to be ignited such as the end of a carbon heat source, and/or whether any electronics are involved. Tobacco heating device, tobacco heating product, heat-not-burn tobacco device, and heat-not-burn tobacco product as used herein are synonymous.

A tobacco stick or heating rod contains less tobacco compared with a cigarette. For example, each HeatStick® contains about 320 mg compared to about 480 to about 900 mg of filler in conventional cigarettes. The nicotine content of a HeatStick® is about 4.8 mg which is much less than a conventional cigarette even though IQOS® delivers nicotine to the smoker at comparable levels as conventional cigarettes. Less tobacco is required in a tobacco stick or heating rod since there is no combustion including between puffs. See, Farsalinos et al. 2017, *Nicotine Tob Res*. June 16. doi: 10.1093/ntr/ntx138; Tobacco Heating System (IQOS), Briefing Document, December 2017, *Prepared by Philip Morris Products S.A. for the* Jan. 24-25, 2018 Tobacco Products Scientific Advisory Committee Meeting. Each tobacco stick for a tobacco heating device and each tobacco heating rod which produces aerosol without a separate holder (the element produces the heat in the rod itself) may contain at least the following nicotine contents: 1.0 mg, 1.1 mg, 1.2 mg, 1.3 mg, 1.4 mg, 1.5 mg, 1.6 mg, 1.7 mg 1.8 mg, 1.9 mg, 2.0 mg, 2.1 mg, 2.2 mg, 2.3 mg, 2.4 mg, 2.5 mg, 2.6 mg, 2.7 mg, 2.8 mg, 2.9 mg, 3.0 mg, 3.1 mg, 3.2 mg, 3.3 mg, 3.4 mg, 3.5 mg, 3.6 mg, 3.7 mg, 3.8 mg, 3.9 mg, 4.0 mg, 4.1 mg, 4.2 mg, 4.3 mg, 4.4 mg, 4.5 mg, 4.6 mg, 4.7 mg, 4.8 mg, 4.9 mg, 5.0 mg, 5.1 mg, 5.2 mg, 5.3 mg, 5.4 mg, 5.5 mg, 5.6 mg, 5.7 mg, 5.8 mg, 5.9 mg, 6.0 mg 6.1 mg, 6.2 mg, 6.3 mg, 6.4 mg, 6.5 mg, 6.6 mg, 6.7 mg, 6.8 mg, 6.9 mg, 7.0 mg, 7.1 mg, 7.2 mg, 7.3 mg, 7.4 mg, 7.5 mg, 7.6 mg, 7.7 mg, 7.8 mg, 7.9 mg, 8.0 mg, 8.1 mg, 8.2 mg, 8.3 mg, 8.4 mg, 8.5 mg, 8.6 mg, 8.7 mg, 8.8 mg, 8.9 mg or 9.0 mg.

As used herein, an "aerosol device" means any device that produces an aerosol for inhalation such as any e-cigarette or tobacco heating device.

Typical components of e-cigarettes include a rechargeable device which includes a heating coil and atomizer that transforms the e-liquid to an aerosol, cartridge or the like (sticks or pods) contains the e-liquid, mouthpiece and battery in the rechargeable device. Although there are many appearances and designs that may encompass varying steps, they generally operate by drawing on the e-cigarette, activating a heating element which aerosolizes the e-liquid, and inhaling the liquid aerosol. E-liquids typically contain nicotine, water, flavors and humectants. The humectant acts as a carrier solvent which dissolves the nicotine and flavors and aerosolizes at a certain temperature on the atomizer of the e-cigarette. Typically, propylene glycol and/or glycerol are the solvents used in e-liquids. The e-liquid of e-cigarettes which is contained in cartridges, for example, contain nicotine contents which vary widely by brand and brand style. For instance, each JUUL® pod contains 0.7 ml nicotine by volume, which equals 5% nicotine by weight. One JUUL® pod is approximately equivalent, in terms of supply calculations for any method herein, to 20 cigarettes lasting for about 200 puffs. Each brand of e-cigarettes may vary in nicotine content and volume of e-liquid. The percent of nicotine contained in e-liquid of a cartridge, pod, stick (or the like) may be at least the approximate following percentages by weight: 0.25%, 0.50%, 0.75%, 1.0%, 1.25%, 1.5%, 1.75%, 2.0% 2.25%, 2.5% 2.75%, 3.0%, 3.25%, 3.5%, 3.75%, 4.0%, 4.25%, 4.5%, 4.75%, 5.0%, 5.25%, 5.5%, 5.75%, 6.0%, 6.25%, 6.5%, 6.75, 7.0%, 7.25%, 7.5%, 7.75%, 8.0%, etcetera. Alternatively, the approximate amount of nicotine contained in e-liquid of a cartridge, pod, stick (or the like) of an e-cigarette may be at least 0.025 ml, 0.05 ml, 0.075 ml, 0.10 ml, 0.15 ml, 0.20 ml, 0.25 ml, 0.30 ml, 0.35 ml, 0.40 ml, 0.45 ml, 0.50 ml, 0.55 ml, 0.60 ml, 0.65 ml, 0.70 ml, 0.75 ml, 0.80 ml, 0.85 ml, 0.90 ml, 0.95 ml, 1.00 ml, 1.05 ml, 1.10 ml, 1.15 ml, 1.20 ml, 1.25 ml, etcetera.

E-cigarette devices are sometimes characterized as first generation, second generation or third generation based on their product characteristics and features. First generation e-cigarette devices are referred to as 'cigalikes' or vape sticks since they are designed to mimic conventional cigarettes as far as appearance. Second generation e-cigarettes may be characterized by a clearomizer, which is a transparent cartridge that holds e-liquid, an atomizer and a battery. These second-generation devices are comparatively larger than first generation devices and are sometimes referred to as 'tank systems' in reference to the transparent reservoir that holds larger amounts of e-liquid than previous devices. Third generation devices are often considered 'vaping products' and have little resemblance to conventional cigarettes. These may feature rebuildable and custom atomizers and batteries.

The latest type or fourth generation e-cigarette utilizes a nicotine salt and an organic acid. For example, JUUL® pods (cartridges) contain a proprietary salt-based, nicotine, e-liquid formula, which includes benzoic acid, a naturally occurring ingredient found in tobacco and other substances. When benzoic acid is combined with nicotine salts, it helps provide increased satisfaction as compared to most e-cigarettes. JUUL® is a closed system, its pods are not designed to be refillable, and JUUL® is rechargeable by way of a USB port.

In some aspects, methods are provided to facilitate smokers who are not interested in quitting tobacco products altogether to switch from smoking conventional nicotine-content combustible cigarettes to using e-cigarettes or a tobacco heating device. In this methodology, very low nicotine cigarettes are utilized as a bridge between the smoker's usual cigarette brand and e-cigarettes or between the smoker's usual cigarette brand a tobacco heating device.

In other aspects, a computer or mobile application (App) assists smokers to switch to e-cigarettes or a tobacco heating device with the disclosed methods and products.

In other aspects, very low nicotine cigarettes comprising enhanced levels of anatabine and/or anabasine are provided which may be utilized for the disclosed methods.

In other aspects, transition kits are provided which comprise of very low nicotine cigarettes, a tobacco heating device, tobacco sticks, and information, instructions and recommendations to assist in switching smokers to a tobacco heating device.

In other aspects, transition kits are provided, which include very low nicotine cigarettes, e-cigarettes, and information, instructions and recommendations to assist in switching smokers to a tobacco heating device.

In other aspects, very low nicotine cigarettes comprising cannabinoids and/or THC-free *cannabis* are provided which may be utilized for the aforementioned methods. In this methodology, reconstituted *cannabis* or reconstituted tobacco including cannabinoids or THC-free *cannabis*, may be included in very low nicotine cigarettes.

1. Low Nicotine Tobacco

Various methods may be employed to reduce the nicotine content of tobacco for use in very low nicotine cigarettes. These include plant breeding techniques, genetic engineering of tobacco lines or tobacco varieties and/or nicotine extraction from conventional tobacco. Methods to reduce the nicotine content of tobacco plants, including commercial tobacco varieties used in the production of conventional cigarettes, may include plant breeding techniques. Examples of low nicotine tobacco lines produced by the introduction of two low alkaloid genes (nic1 and nic2 double mutants) from a Cuban cigar tobacco variety into a conventional tobacco variety through a series of backcrosses include LA Burley 21, LAFC 53 and LAMD 609. NIC1 and NIC2 loci are two independent genetic loci in *N. tabacum*, and nic1 and nic2 mutations independently reduce expression levels of nicotine biosynthesis enzymes and nicotine content. See, Legg et al., 1969, *Journal of Heredity* Vol. 60, Issue 4: 213-217; Hibi et al. 1994, *Plant Cell* 6: 723-35; Reed & Jelesko 2004, *Plant Science* 167(5): 1123-1130.

LA Burley 21 (sometimes referred to as Burley 21 LA) tobacco is a genetically stable breeding line developed and released cooperatively by the University of Kentucky Agricultural Experiment Station, Lexington, Ky. and Crops Research Division, *Agricultural Research* Service (ARS) of the U.S. Department of Agriculture, Beltsville, Md. LA Burley 21 was developed by introducing the nic1 and nic2 double mutant genes from Cuban cigar varieties into the Burley 21 variety. The low alkaloid content of LA Burley 21 is approximately 0.20% (on a dry weight basis) compared with an average of 3.5% for Burley 21 (a commercial variety at the time used for cigarettes), which is approximately a 94% reduction. See, Legg et al. 1970, Registration of LA Burley 21 Tobacco Germplasm, Registration No. GP 8, *Crop Science* Vol. 10, March-April 1970: 212.

LAFC 53 (sometimes referred to as LA 53) is a low-alkaloid, flue-cured tobacco line developed and released cooperatively by the Agricultural Research Service (ARS) of the U.S. Department of Agriculture and the North Carolina Agricultural Experimental Station. LAFC 53 was developed by backcrossing a low-alkaloid line containing the nic1 and nic2 double mutants to the NC 95 variety and selecting low alkaloid plants. The line was released in 1974 to plant breeders, experiment stations, and other organizations for research and breeding purposes. LAFC 53 may contain as little as approximately 10% of the nicotine content of NC 95 (90% reduction), which was a popular commercial flue-cured tobacco variety. See, Chaplin 1975, Registration of LAFC 53 Tobacco Germplasm, Registration No. GP 13, *Crop Science*, Vol. 15, March-April 1975: 282. RJ Reynolds Tobacco Company and Philip Morris researched and grew LAFC 53 during the 1980s. See, Tobacco Industry Documents, Bates Document No. 505348876, Low Nicotine Tobacco 1985 Crop, Chemical Analysis, RJ Reynolds Tobacco Company; and Tobacco Industry Documents, Bates Document No. 2031403998-2031404044, Mar. 27, 1987, Project 1904, Tobacco Physiology and Biochemistry, Philip Morris USA.

LAMD 609 is a low alkaloid germplasm line of Maryland tobacco developed by the Maryland Agricultural Experiment Station and released in 1994. LAMD 609 originated from a 1970 cross between LA Burley 21, which contains the nic1 and nic2 double mutants, and the MD 609 variety. In a 2-year field study in 1991 and 1992 with four replications at the Upper Marlboro Facility of the Central Maryland Research and Education Center, LAMD 609, MD 609, and LA Burley 21 were evaluated for agronomic performance and chemical content. Averaged over these 2 years, LAMD 609 had a total alkaloid content of 0.06%, compared with 1.93% for MD 609, which is approximately a 97% reduction. See, Aycock et al. 1998, Registration of LAMD 609 Tobacco Germplasm, Registration No. GP-52, PI 599689, *Crop Science*, Vol. 38, May-June 1998: 904; Aycock et al. 1997, LAMD 609: A low-alkaloid Maryland tobacco breeding line. University of Maryland Agronomy Res. Bull ARB-5.

Genetic engineering is a preferred method of producing tobacco having a reduced amount of nicotine or an increased amount of anatabine in conjunction with a reduced amount of nicotine. Genetic engineering includes any method of introducing a nucleic acid or specific mutation into a host organism which decreases or increases the expression or function of a gene product of interest (i.e., the target gene product). For example, a plant is genetically engineered when it comprises a polynucleotide sequence that, for instance, suppresses expression of a gene such that expression of a target gene is reduced compared to a control plant. Any enzyme involved in the nicotine biosynthetic pathway can be a target for reduced nicotine tobacco lines. Genetic engineering for suppressing expression may occur by any method known in the art, such as antisense technology, RNA interference (RNAi), ribozymes, CRISPR technology, and microRNAs (miRNAs).

As used herein and relating to tobacco, "down-regulation" or "suppression" are synonymous and mean that expression of a particular gene sequence or variant thereof or nucleotide fragment of at least 15 nucleotides of the gene sequence, in a tobacco plant, including for example progeny plants derived thereof, has been reduced, as compared to a control plant when grown in similar growth conditions, wherein the control plant shares an essentially identical genetic background with the tobacco plant except for the reduced nicotine alteration in the tobacco plant and any related incidental effects.

In some exemplary embodiments, low nicotine tobacco for use in very low nicotine cigarettes to facilitate smokers switching to e-cigarettes or a tobacco heating device is provided by genetically engineering tobacco plants to comprise a transgene or mutation directly down-regulating the expression or activity of one or more genes encoding a product such as putrescine N-methyltransferase (PMT), quinolate phosphoribosyl transferase (QPT), N-methylputrescine oxidase (MPO), BBL (BBL enzyme is a flavin-containing oxidase), A622 (A622 enzyme is a member of the PIP family of NADPH-dependent reductases), and MATE transporter. Any suitable method known in the art can be utilized for production of low nicotine tobacco, including sense suppression, sense co-suppression, antisense suppression, RNAi suppression, double-stranded RNA (dsRNA) interference, hairpin RNA interference and intron-containing hairpin RNA interference, ribozymes, amplicon-mediated interference, small interfering RNA, artificial trans-acting siRNA, artificial or synthetic microRNA, knock out approaches, random mutagenesis and targeted mutagenesis approaches. For example, the very low nicotine tobacco variety, Vector 21-41, was developed at North Carolina State University by Dr. Mark Conkling utilizing antisense suppression of QPT (nucleotide sequence set forth in SEQ ID NO: 1 and the amino acid sequence in set forth in SEQ ID NO: 2). See, U.S. Pat. No. 6,586,661. The nicotine content of this genetically modified burley variety is approximately 0.10%, which is approximately half of the nicotine content of its parent LA Burley 21. See, e.g., U.S. Plant Variety Protection Certificate No. 200100039 and Xie et al. 2004 Recent Advances in Tobacco *Science*, 30:17-37.

In some exemplary embodiments, low nicotine tobacco lines or tobacco varieties are produced (for use in very low nicotine cigarettes to facilitate smokers switching to an e-cigarettes or tobacco heating device) by introducing non-transgenic mutations into one or more nicotine biosynthetic genes, including but not limited to PMT gene family, QPT, MPO, BBL gene family including NBB1 and A622, via precise genetic engineering technologies. The NBB1 nucleotide sequence set forth in SEQ ID NO: 11 and the amino acid sequence in set forth in SEQ ID NO: 12. Since numerous obstacles exist to commercialize transgenic tobacco such as deregulation requirements of genetically modified crops in the United States and other countries, genetically engineering approaches which do not result in the low nicotine plant lines containing foreign DNA (DNA not native to *Nicotiana* plants) are preferable over transgenic approaches which do result in tobacco containing foreign DNA. For example, a mutation breeding approach to identify EMS-induced mutations in the three most highly expressed isoforms of the BBL gene family were developed at North Carolina State University. Berberine bridge enzyme-like (BBL) plays a major role in tobacco alkaloid formation. The BBL enzyme is a flavin-containing oxidase believed to be involved in the final oxidation step for nicotine production. The impact of suppressing expression of the BBL gene family leads to low nicotine phenotypes. See, Kajikawa et al. 2011, Vacuole-Localized Berberine Bridge Enzyme-Like Proteins Are Required for a Late Step of Nicotine Biosynthesis in Tobacco, *Plant Physiology*, April Vol. 155, pp. 2010-2022; Lewis et al. 2015, *PLOS One*, February 17; 10(2): e0117273, both of which are incorporated herein by reference in their entirety.

In other exemplary embodiments, non-transgenic approaches of providing low nicotine tobacco (for use in very low nicotine cigarettes to facilitate smokers switching to e-cigarettes or a tobacco heating device) include utilizing random mutagenesis approaches or via precise genome engineering technologies, for example, transcription activator-like effector nucleases (TALENs), meganuclease, zinc finger nuclease, and CRISPR-cas9 system. See e.g., Gaj et al. 2013, Trends in Biotechnology, 31(7):397-405; Bomgardner 2017, Chemical & Engineering News, Vol. 95, Issue 24: 30-34.

In some exemplary embodiments, low nicotine tobacco (for use in very low nicotine cigarettes to facilitate smokers switching to e-cigarettes or a tobacco heating device) is provided by genetically engineering transcription factors of a tobacco line or variety. A transcription factor is a protein which binds to DNA regions, typically promoter regions, using DNA binding domains and decreases or increases the transcription of specific genes. A transcription factor negatively regulates nicotine biosynthesis if expression of the transcription factor decreases the transcription of one or more genes encoding nicotine biosynthesis enzymes and decreases nicotine production. A transcription factor positively regulates nicotine biosynthesis if expression of the transcription factor increases the transcription of one or more genes encoding nicotine biosynthesis enzymes and increases nicotine production. Transcription factors are classified based on the similarity of their DNA binding domains. See, Todd et al. 2010, A functional genomics screen identifies diverse transcription factors that regulate alkaloid biosynthesis in *Nicotiana benthamiana*, The Plant Journal 62, 589-600, which is incorporated herein by reference in its entirety.

In some exemplary embodiments, tobacco lines or varieties are genetically engineered to comprise one or more non-naturally existing mutant alleles at Nic1 or Nic2 locus, which reduce or eliminate one or more gene activity from Nic1 or Nic2 locus resulting in low nicotine tobacco for use in very low nicotine cigarettes to facilitate smokers switching to a e-cigarettes or tobacco heating device. Mutant Nic1 or Nic2 alleles can be introduced by any method known in the art including random mutagenesis approaches or via precise genome engineering technologies, for example, transcription activator-like effector nucleases (TALENs), meganuclease, zinc finger nuclease, and CRISPR-cas9 system.

The nicotine content of any specific tobacco variety or tobacco line planted in a field may vary depending on many factors such as weather conditions, fertilizer rate, soil conditions and topping practices (the removal of the tobacco flowers which increases nicotine and other tobacco alkaloids) and growing location. For example, dry weather conditions generally result in a tobacco crop with a higher nicotinic alkaloid content, including nicotine content. The same commercial tobacco variety planted in the same field for various growing seasons may result in nicotine contents of the cured tobacco that can vary by up to approximately forty percent.

In some exemplary embodiments, processes are utilized that extract nicotine from conventional tobacco for use in very low nicotine cigarettes to facilitate smokers switching to e-cigarettes or a tobacco heating device. These processes are generally costlier compared to growing tobacco with low nicotine levels since an additional production process is required. For example, a supercritical $CO_2$ process to remove up to approximately 97% of nicotine from tobacco, which is similar to the process of producing decaffeinated coffee, has been utilized for commercial cigarettes test-marketed from 1989 to 1991. It was concluded that extracting nicotine from tobacco also removed various other tobacco leaf compounds and components important to tobacco's taste characteristics. These incidental extractions include oils and waxes of the tobacco plant. Analogous to essential oils in citrus fruit, the presence and balance of these compounds in tobacco give it the characteristic flavor and aroma that is associated with tobacco. Removal of these compounds, or even a change in the concentration ratios, can destroy the characteristic flavor and aroma of the plant. An advantage of the extraction method is that nicotine and other nicotinic alkaloids that are extracted from tobacco may be used in other products such as e-cigarettes. See, e.g., Tobacco Industry Documents, Bates Document No. 2057908259-2057908291, Sep. 1, 1994, Alkaloid Reduced Tobacco (ART) Program, Philip Morris USA.

2. Assessing and Transitioning Smokers to E-Cigarettes or Tobacco Heating Devices The Fagerstrom test is a short, convenient self-report measure of a person's dependency on conventional cigarette smoke. It asks smokers six multiple-choice questions. See, Table 3 in The Fagerstrom Test for Nicotine Dependence: a revision of the Fagerstrom Tolerance Questionnaire, *British*

*Journal of Addiction* (1991) 86, 1119-1127. Based on a smoker's answers to each of six question, which assigns a score from 0 to 1 for four questions and 0 to 3 for two questions, the score results of the answers to all six questions are added together and the total ranges from 0 to 10, and known herein as "dependence score." The higher the value indicates greater dependence on cigarette smoke. A smoker who scores between 1 and 2 on the Fagerstrom test is considered to have low dependence, a Fagerstrom score of 3 or 4 is considered low to moderately dependent, a score of 4 is considered moderately dependent, and a score of 5 or more is considered highly dependent. See Heatherton et al 1991, *British Journal of Addiction,* 86:1119-1127. Other methods exist to gauge nicotine dependence such as the 37-item Wisconsin Inventory of Smoking Dependence Motives (score range is from 11 to 77 with higher values indicating greater dependence).

The magnitude of past conventional cigarette usage of a smoker is an important consideration for extinguishing or changing any positively reinforced behavior including methods described herein of transitioning a smoker to e-cigarettes or a tobacco heating device. Conventional cigarette usage is measured by pack years, which is the number of years a person smokes multiplied by the average number of packs smoked per day over the timeframe the person smoked. For example, a person who smokes about 1 pack of cigarettes per day (each pack contains 20 cigarettes), and has done so for 15 years, equates to 15 pack years. Ranges of pack years are scored as follows: up to and including five pack years (rating of 1), more than five pack years up to and including ten pack years (rating of 2), more than ten pack years up to and including fifteen pack years (rating of 3), more than fifteen pack years up to and including twenty pack years (rating of 4), more than twenty pack years up to and including twenty-five pack years (rating of 5), more than twenty-five pack years up to and including thirty pack years (rating of 6), more than thirty pack years up to and including thirty-five pack years (rating of 7), more than thirty-five pack years up to and including forty pack years (rating of 8), more than forty pack years up to and including forty-five pack years (rating of 9), more than forty-five pack years (rating of 10). Smokers of 5 or less pack years (rating of 1) are generally more easily converted to e-cigarettes or tobacco heating devices, than smokers of twenty-five pack years (rating of 5).

The combination of the Fagerstrom dependence score and the pack-year rating are added together, known herein as "total smoke dependence score," to assist in determining the optimal method and product variables (as defined below) to switch a smoker to e-cigarettes or a tobacco heating device such as switching method, duration of the transitional period, nicotine level of very low nicotine cigarettes, and/or nicotine level of tobacco sticks for an individual smoker desiring. For example, smokers with a dependence score of 7 and a pack-year rating of 5, which equates to a total smoke dependence score of 12, would generally require a longer transitional period than smokers with a dependence score of 2 and a pack-year rating of 1, which equates to a total smoke dependence score of 3.

The methods described herein to facilitate smokers to switch to e-cigarettes or a tobacco heating device and the duration of the transitional period of these methods may vary. Personalized methods of assisting a smoker to switch to e-cigarettes or a tobacco heating device (which can utilize the computer or mobile App herein) may be determined by any number of "demographic and tobacco use characteristics" of the smoker, which may include the smoker's Fagerstrom dependence score, pack-year rating, number of years smoking, packs per day, total smoke dependence score, how the smoker first learned about the App, average number of cigarettes smoked per day over the last month, usual cigarette brand used, any current or previous use of nicotine products including e-cigarettes, any current or previous use of a tobacco heating product, any current or previous use of any other tobacco products, number of previous cigarette quit attempts if any, level of interest in switching to e-cigarettes or a tobacco heating product compared to level of interest in quitting tobacco altogether, marital status, significant other's smoking status and smoking status of any person(s) the smoker cohabitates with, gender, age, race, ethnicity, national origin, highest level of education attained, occupation, ease of being able to smoke conventional cigarettes, e-cigarettes or a tobacco heating product while working. These demographic and tobacco use characteristics are utilized to construct smoker profiles which may be inputted to a computing system or device that considers various factors and performs various operations.

In this way, the software generates instructions and recommendations for a specific transition regimen and types of products to assist smokers transitioning to e-cigarettes or a tobacco heating device based on a particular smoker's information or profile. The term "method and product variables," as used herein, include (a) a method to transition smokers to e-cigarettes or a tobacco heating product (e.g., Method A) and any variables of the method such as the length of the transitional period, (b) the type, brand and model of e-cigarette (e.g., JUUL® and JUUL pods which are a closed system not designed to be refillable with e-liquid) or tobacco heating product (holder and tobacco sticks like IQOS® versus tobacco heating rods), (c) brand of very low nicotine cigarettes, (d) the product variables for the method during the transitional period (and potentially after the transitional period) such as nicotine, anatabine, and anabasine content of the very low nicotine cigarettes e-cigarettes or tobacco sticks/heating rods, *cannabis* content or cannabinoid content, if any, of the very low nicotine cigarettes, e-cigarettes or tobacco sticks/heating rods, and flavorings in the very low nicotine cigarettes, e-cigarettes or tobacco sticks/heating rods, and (e) information, recommendations and instructions for using the method and products including any daily reminders, individualized or personalized aspects, and method of delivery (e.g., via smartphone). Any method used to transition a smoker of conventional cigarettes to e-cigarettes or a tobacco heating device may be combined with any product disclosed herein.

The efficacy of the method and product variables is measured based on the percentage of e-cigarette use or tobacco stick use (or tobacco heating rod use) and cigarette use, if any, for a period of time generally after the transitional period (may also be during the transitional period) of the transition regimen utilized by the smoker. This measurement period may be any number of days and may start at any time point. For example, a clinical trial's measurement period may be 1 week immediately following the transitional period. There may also be one or more follow-up measurement periods such as 3 months immediately following the end of the transitional period and 6 months immediately following the end of the transitional period. In some instances, the measurement period may be during the transitional period such as the last three days of the transitional period. The three top levels of switching efficacy in a clinical trial may be the following: smokers exclusively switching to a tobacco heating product (≥99% and <100% tobacco stick use and ≥0 to ≤1% cigarette use), smokers overwhelmingly switching (≥90% and <99% tobacco sticks and >1% and ≤10% cigarettes), and smokers predominantly switching (≥70% and <90% tobacco sticks and >10% and ≤30% cigarettes). These types of particulars may be determined by a regulatory agency such as the U.S. Food and Drug Administration (FDA) when studies are performed to measure the efficacy of combinations of method and product variables for certain profiles of smokers or population subgroups of smokers to assist them in transitioning to e-cigarettes or a tobacco heating product.

"Optimal method and product variables," as used herein, means the combination of method and product variables recommended to the smoker, which in most cases give the smoker the highest estimated probability of switching to e-cigarettes or a tobacco heating product. The optimal method and product variables may be calculated by the computer system supporting an App and are based on historical data of smokers with the same or similar demographic and tobacco use characteristics and the predictive modeling of machine learning algorithms within the computer system. Depending on the standard during the measuring period, switching means, for example, ≥70% and <90% tobacco sticks and >10% and ≤30% cigarette use or ≥99% and ≤100% tobacco stick use and ≥0 to ≤1% cigarette use. In some cases, the algorithms may recommend the method and product variables that may not give the smoker the highest mathematical probability of switching to e-cigarettes or a tobacco heating product in the interest of having the algorithms learn which method or product variables improves switching rates for a given profile or population subgroup. The measurement period may be any number of days and may start at any time point. In some exemplary embodiments, there may be the same method and product variables for a population or subpopulation of smokers. For example, for a clinical trial for switching smokers to e-cigarettes or a tobacco heating device, certain arms of the study may all use the same methods and products and the most efficacious protocol may become a commercial product sanctioned by a regulatory agency or health insurers.

In some exemplary embodiments, the smoker's profile is matched by the computer or mobile App to smokers with the most similar demographic and tobacco use characteristics who have used the methods herein and achieved the best switching results such as, for example, those who have exclusively switched to a tobacco heating device (≥99% and ≤100% tobacco sticks and ≥0 to ≤1% cigarettes), those who have overwhelmingly switched (≥90% and <99% tobacco sticks and >1% and ≤10% cigarettes), and those who have predominantly switched (≥70% and <90% tobacco sticks and >10% and ≤30% cigarettes). In other exemplary embodiments, the smoker's profile is matched by the computer or mobile App to smokers with the most similar demographic and tobacco use characteristics who have used the methods herein and achieved the best switching results such as, for example, those who have exclusively switched to e-cigarettes (≥99% and ≤100% e-cigarette use and ≥0 to ≤1% of previous cigarette use), those who have overwhelmingly switched (≥90% and <99% e-cigarette use and >1% and ≤10% cigarette use), and those who have predominantly switched (≥70% and <90% e-cigarette use and >10% and ≤30% cigarette use). The App then recommends to the smoker, for example, the type of e-cigarette or tobacco heating product (holder and tobacco sticks versus heating rods) and brand and model, the optimal switching method including duration of the transitional period, the required number of tobacco sticks and very low nicotine cigarettes, and the optimal types of tobacco sticks and very low nicotine cigarettes in terms of alkaloid profile, flavorings, and whether very low THC *cannabis* is included. For example, the duration of the transitional period for any method described herein may be at least 2 days, 3 days, 4 days, 5 days, 6 days, 7 days, 8 days, 9 days, 10 days, 11 days, 12 days, 13 days, 14 days, 15 days, 16 days, 17 days, 18 days, 19 days, 20 days, 21 days, 22 days, 23 days, 24 days, 25 days, 26 days, 27 days, 28 days, 29 days, 30 days, 31 days, 32 days, 33 days, 34 days, 35 days, 36 days, 37 days, 38 days, 39 days, 40 days, 41 days, 42 days, 43 days, 44 days, 45 days, 46 days, 47 days, 48 days, 49 days, 50 days, 51 days, 52 days, 53 days, 54 days, 55 days, 56 days, 57 days, 58 days, 59 days, 60 days, 61 days, 62 days, 63 days, 64 days, 65 days, 66 days, 67 days, 68 days, 69 days, 70 days, 71 days, 72 days, 73 days, 74 days, 75 days, 76 days, 77 days, 78 days, 79 days, 80 days, 81 days, 82 days, 83 days, 84 days, 85 days, 86 days, 87 days, 88 days, 89 days, 90 days, 91 days, 92 days, 93 days, 94 days, 95 days, 96 days, 97 days or 98 days. In some exemplary embodiments, the duration of the transitional period may be a fixed number of days for a group of people such as 14 days. For example, in determining the ideal method variable or product variable for the general population of smokers, especially upon launching the App, the transitional period for a given method such as Method A may be fixed. This may assist the predictive modeling of the machine learning algorithms of the App to quickly improve adoption rates of smokers of aerosol devices.

Generally, dual users of conventional cigarettes and tobacco heating devices in studies tradeoff conventional cigarettes for tobacco sticks and vice versa on a one-to-one basis since a cigarette and a tobacco stick deliver roughly the same amount of nicotine to the smoker. For example, a dual user who previously smoked 20 conventional cigarettes per day may now smoke 10 conventional cigarettes per day and use 10 tobacco sticks per day which equates to 50% cigarette use and 50% tobacco stick use. The number of tobacco sticks required for the methods herein during the transitional period may be partially based on the number of cigarettes smoked per day (e.g., for the last 30 days) multiplied by the number of days in the transitional period. A cushion of extra tobacco sticks by a certain percentage may also be included. For example, if a smoker smokes 25 cigarettes per day, there is a 21-day transitional period, and an overallotment of 15 percent, at least 604 (525+79) tobacco sticks are provided to the smoker. Some types of tobacco sticks or heating rods may deliver to the smoker more or less nicotine than a conventional cigarette (approximately 1 to 1.5 mg per cigarette) in which case the number of tobacco sticks provided to the smoker is adjusted. For example, a tobacco stick may be capable of delivering 20 mg of nicotine per tobacco stick. This tobacco stick would be sufficient for the pack (typically 20 cigarettes) a day smoker to use in about 1 day.

Similarly, for e-cigarettes, depending on the type of e-cigarette, the number of e-liquid tanks, cartridges, sticks or pods required for the methods herein may not be on a one-to-one basis like tobacco sticks of a tobacco heating product are with conventional cigarettes. For example, JUUL® e-cigarettes require less JUUL® pods per day as compared to tobacco sticks. One JUUL® pod, is approximately equivalent to 20 cigarettes (in terms of supply calculations for any method herein) lasting for about 200 puffs, which would be sufficient for one day for a pack (typically 20 cigarettes) a day smoker. The appropriate adjustments are required for supplying a sufficient number of tobacco sticks during a transitional period (and any follow-up periods) based on the amount of nicotine in a tobacco stick heating rod, e-liquid tank, e-cigarette cartridge, stick or pod, and the typical usage rates of former smokers who have exclusively switched to a specific type of aerosol device are also considered. For example, the supply of JUUL® pod cartridges for Method A approximately equals the product of the number of conventional cigarettes the smoker smokes per day, and the number of days in the transitional period, divided by 20. Therefore, the number of tobacco sticks, heating rods, e-liquid tanks, cartridges, sticks or pods (or the like) of any aerosol device required for any method herein, may be referred to as 'a sufficient number for the transitional period based on the design of the aerosol device, tobacco heating product, or e-cigarette and the cigarette consumption history of the smoker.

The number of very low nicotine cigarettes required for the methods herein (during the transitional period and in some instances for a period of time after the transitional period) may be also be partially based on the number of cigarettes smoked per day (e.g., for the last 30 days), multiplied by the number of days in the transitional period. This product is then multiplied by at least 17 percent and the result is the minimum number of very low nicotine cigarettes required for the transitional period. For example, if a smoker smokes 20 cigarettes per day and there is a 28-day transitional period, at least 95 very low nicotine cigarettes (20*28)*0.17 are provided to the smoker. This number may be rounded up to 100 since typically there are 20 cigarettes in a pack. The number of 100 cigarettes may be adjusted depending on the method. For example, a mobile App recommending Method A may require the product of cigarettes smoked per day and the number of days in the transitional period to be multiplied by a percentage greater than 17 percent based on the smoker's profile of demographic and tobacco use characteristics and demographic and tobacco use characteristics of past users of the App. One of the best predictors for the amount of these tobacco products required is actual use patterns of smokers who have used the methods and products herein to transition to an aerosol device.

As used herein, a "transition kit" is a package of one or more compartments, and which includes very low nicotine cigarettes, e-cigarettes, or a tobacco heating device and tobacco sticks (or tobacco heating rods in place of the tobacco heating device and tobacco sticks), and may include information, recommendations and/or instructions for using these tobacco products to assist a conventional cigarette smoker to transition to e-cigarettes or a tobacco heating device. A transition kit may be a single package and delivered to the smoker as a single package, as shown in FIG. 1, or the transition kit may comprise of multiple packages. For example, tobacco sticks and very low nicotine cigarettes may be sold or delivered separately or enough tobacco sticks or very low nicotine cigarettes for half of a transitional period may be sold or delivered separately. When software-generated information, recommendations or instructions for using the transition kit for Method A or any other method herein are messaged, texted or emailed to the person using the method or if the instructions, for example, are conveyed on YouTube® or included on social media platforms such as Twitter® or Facebook®, this may eliminate the need for instructions to be present in the transition kit. Ideally, all of the components of the transition kit are included in one package shipped directly to the smoker desiring assistance to transition to an aerosol device, or they may all be available at one retail location. This important convenience feature allows the smoker greater flexibility to comply with the App's recommendations and instructions during the stressful transition period of switching to an aerosol device.

The information, recommendations and instructions for any method herein of transitioning smokers of conventional cigarettes to e-cigarettes or a tobacco heating device may be general for all smokers or population subgroups of smokers, but the transition regimen is preferably personalized for an individual smoker based on historical data of smokers with similar demographic and tobacco use characteristics and predictive modeling of the machine learning algorithms of a computer system of a mobile App, as further described below. The information, recommendations and instructions may be in electronic format generated by a computer system and/or in the form of a hard copy such as a label placed on or in the transition kit provided to the smoker containing e-cigarettes or the tobacco heating device and tobacco sticks (or heating rods) and very low nicotine cigarettes. In both instances, the information and recommendations may be determined by the computer or mobile App based on input to a computing system that considers various factors, including method and product variables (described below), and performs various operations. These software-generated instructions for the transitional period (and for a period of time after the transitional period) of a method herein and/or daily instructions pertinent to each day may be messaged, texted or emailed to the person using the method.

3. Exemplary Hardware and Software Implementations

In other aspects, the present disclosure provides an apparatus, computer-implemented method, and the like for transitioning a smoker of conventional cigarettes to e-cigarettes or a tobacco heating device. For instance, such an apparatus has a communications module (e.g., Ethernet network interface card (NIC), wireless transceiver (Bluetooth, WiFi, etc.)), a storage unit with instructions (i.e., memory), and at least one processor coupled to the communication module and the storage unit via one or more buses or wired connections, such that the processor is configured to execute instructions. In this regard, the apparatus may execute instructions to receive demographic and tobacco use information of a first smoker; obtain demographic information and tobacco use of a second smoker, etc.; apply a probabilistic algorithm to portions of the first demographic data and compute a value indicative of a likelihood that the first smoker transitions from conventional cigarettes to e-cigarettes or a tobacco heating device using each of a plurality of candidate products and methods, the candidate products and methods being capable of transitioning the first smoker from the conventional cigarettes to e-cigarettes or a tobacco heating device; select one of the candidates for administering to the first smoker based on the computed values; and generate and transmit, via the communications unit, a second signal that identifies the selected product or method to the device of the first smoker, the second signal comprising information that instructs the device to present, within a corresponding interface, data characterizing an administration of the selected product or service.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification, including but not limited to, the executable or mobile applications and application programs described herein, can be implemented as one or more computer programs, i.e., one or more modules of computer program instructions encoded on a tangible non-transitory program carrier for execution by, or to control the operation of, a data processing apparatus (or a computer system). Additionally or alternatively, the program instructions can be encoded on an artificially-generated propagated signal, such as a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The terms "apparatus," "device," and/or "system" refer to data processing hardware and encompasses all kinds of apparatuses, devices, and machines for processing data, including by way of example a programmable processor, a computer, or multiple processors or computers. The apparatus, device, and/or system can also be or further include special purpose logic circuitry, such as an FPGA (field programmable gate array) or an ASIC (application-specific integrated circuit). The apparatus, device, and/or system can optionally include, in addition to hardware, code that creates an execution environment for computer programs, such as code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, such as one or more scripts stored in a markup language document, in a single file dedicated to the program in question, or in multiple coordinated files, such as files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, such as an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random-access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, such as magnetic, magneto-optical disks, or optical disks. However, a computer need not have such devices. Moreover, a computer can be embedded in another device, such as a mobile telephone, a personal digital assistant (PDA), a mobile audio or video player, a game console, a Global Positioning System (GPS) receiver, or a portable storage device, such as a universal serial bus (USB) flash drive, to name just a few.

Computer-readable media suitable for storing computer program instructions and data include all forms of non-volatile memory, media and memory devices, including by way of example semiconductor memory devices, such as EPROM, EEPROM, and flash memory devices; magnetic disks, such as internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, such as a CRT (cathode ray tube) or LCD (liquid crystal display) monitor, for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Implementations of the subject matter described in this specification can be implemented in a computing system that includes a back-end component, such as a data server, or that includes a middleware component, such as an application server, or that includes a front-end component, such as a client computer having a graphical user interface or a Web browser through which a user can interact with an implementation of the subject matter described in this specification, or any combination of one or more such back-end, middleware, or front-end components. The components of the system can be interconnected by any form or medium of digital data communication, such as a communication network. Examples of communication networks include a local area network (LAN) and a wide area network (WAN) such as the Internet.

The computing system can include clients and servers. A client and server are generally remote from each other and typically interact through a communication network. The relationship of client and server arises by virtue of computer programs running on the respective computers and having a client-server relationship to each other. In some implementations, a server transmits data, such as an HTML page, to a user device, such as for purposes of displaying data to and receiving user input from a user interacting with the user device, which acts as a client. Data generated at the user device, such as a result of the user interaction, can be received from the user device at the server.

While this specification contains many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the figures in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

In other embodiments, the present application may use machine learning algorithms or adaptive processes. Examples of the one or more machine learning algorithms or adaptive processes include, but are not limited to, an association-rule algorithm (such as an Apriori algorithm, an Eclat algorithm, or an FP-growth algorithm), a clustering algorithm (such as a hierarchical clustering module, a k-means algorithm, or other statistical clustering algorithms), a collaborative filtering algorithm (such as a memory- or model-based algorithm), or an artificial intelligence algorithm (such as an artificial neural network). Further, and as described herein, one or more of these machine learning algorithms or adaptive process may be trained against, and adaptively improved using, certain portions of training data that include, but are not limited to, data characterizing one or more products and methods administered to smokers to transition from conventional cigarettes to e-cigarettes or tobacco heating products and data characterizing a success (or failure) of these products and methods.

The present application provides Examples for methodology, apparatuses, devices, products, and the like for facilitating smokers switching from conventional cigarettes to e-cigarettes or a tobacco heating product. The Examples are illustrative and non-limiting and include variations within the spirit of the application.

4. Example 1

Method A—Exemplary Embodiment to Facilitate Smokers Switching to E-Cigarettes or a Tobacco Heating Product FIG. 1 is a diagram illustrating a method of transitioning cigarette smokers to a tobacco heating device. As illustrated in FIG. 1, upon a smoker downloading the App 2, the smoker may be asked to answer a series of demographic and tobacco use questions to assist in determining a profile for each smoker, which will be utilized to build the database of smoker profiles and for the computer to recommend the optimal method and product variables for each smoker. These initial demographic and tobacco use questions may include, but are not limited to, questions to determine a smoker's Fagerstrom dependence score, pack-year rating, total smoke dependence score, how the smoker first learned about the App, average number of cigarettes smoked per day over the last month, usual cigarette brand used, any current or previous use of nicotine products including e-cigarettes, any current or previous use of a tobacco heating product, any current or previous use of any other tobacco products, number of previous cigarette quit attempts if any, level of interest in switching to e-cigarettes or a tobacco heating product compared to level of interest in quitting tobacco altogether, significant other's smoking status and smoking status of any person(s) the smoker cohabitates with, gender, age, race, ethnicity, national origin, highest level of education attained, occupation, and ease of being able to smoke conventional cigarettes, e-cigarettes and a tobacco heating product while working.

An example of a smoker profile is a 37-year-old, Caucasian, American, male smoker of Marlboro® Gold (formerly referred to as Marlboro "Lights") who first learned about the App from a friend, smokes an average of 20 cigarettes per day, has a Fagerstrom dependence score of 8, has a pack-year rating of 5 (total smoke dependence score of 13), has never tried to quit smoking, does not currently and has never significantly used nicotine products in the past other than has tried e-cigarettes a few times but has never attempted to switch to e-cigarettes, does not currently and has never previously used tobacco products besides conventional cigarettes and therefore has never had any significant dual use of cigarettes and another tobacco product, has a high interest in switching to e-cigarettes or a tobacco heating product but not quitting tobacco altogether, is a high school teacher with a master of education degree, is not married, can only smoke at lunchtime while working, has girlfriend but she does not smoke, and the smoker lives alone.

Based on the smoker's answers to the questions regarding demographic and tobacco use characteristics and the predictive modeling of the machine learning algorithms, the computer of the mobile App selects the optimal transition regimen for the smoker. As shown in FIG. 1, this includes Method A of transitioning smokers of conventional cigarettes with a 4-week transitional period 1, which commences at time point zero 3 and ends at time point two 4. A transition kit 5 is recommended to the smoker which includes tobacco sticks of a tobacco heating device. The smoker either subsequently agrees to the method and product variables, including an outline of the Method A, and purchases the transition kit or does not. In other exemplary embodiments, the computer of the mobile App recommends a transition kit for smokers which includes e-cigarettes such as JUUL® e-cigarettes and pods and not a tobacco heating device. Upon the smoker's confirmation of the method and product variables and the timeline of the transitional period, the information, recommendations, and instructions 6 for transitioning the smoker to e-cigarettes or a tobacco heating product are delivered to the smoker's smartphone based on the smoker's demographic and tobacco use characteristics, and the transition kit 5 is shortly thereafter shipped and delivered to the smoker. The smoker may not be required to purchase a transition kit if the smoker is part of a study or other effort to motivate the smoker to switch.

The information, recommendations, and instructions 6 for Method A in FIG. 1 includes the App's recommendations to the smoker as to the timing of important time points during the transition regimen. For example, the App will consider a smoker's work schedule among many other factors when determining ideal potential time points such as time point zero, which the smoker ultimately determines after the App recommends some options. Reminders for upcoming events such as the arrival of the transitional kit, time point zero, time point one 7, and time point two 4 are sent to the smoker's smartphone at least once a day throughout the transitional period. Messages of encouragement to follow the recommendations and instructions of Method A are also regularly sent to the smoker's smartphone during and after the transitional period. In this exemplary embodiment, the information, recommendations and instructions to the smoker are personalized based on smoker profiles considered and weighed by predictive modeling of the machine learning algorithms of a device, apparatus, and/or computer system. In other embodiments, the information, recommendations and instructions may be much more general and standard for a subgroup of the smoking population.

The exemplary transition kit for the 37-year-old profiled smoker includes very low nicotine cigarettes containing 1.0 mg of nicotine per cigarette and a specific type (brand and model) of tobacco heating system for the 4-week transitional period along with tobacco sticks containing 4.8 mg of nicotine per tobacco stick, and information and instructions for Method A to switch the smoker to a tobacco heating device are included in the transition kit delivered to the smoker. The transition kit includes enough tobacco products for at least the 4-week transitional period and potentially for a period of time after the transitional period. In some exemplary embodiments, components of the transition kit may each be separately made available to the smoker, for instance, at a pharmacy or other retail location.

Figure 3A:
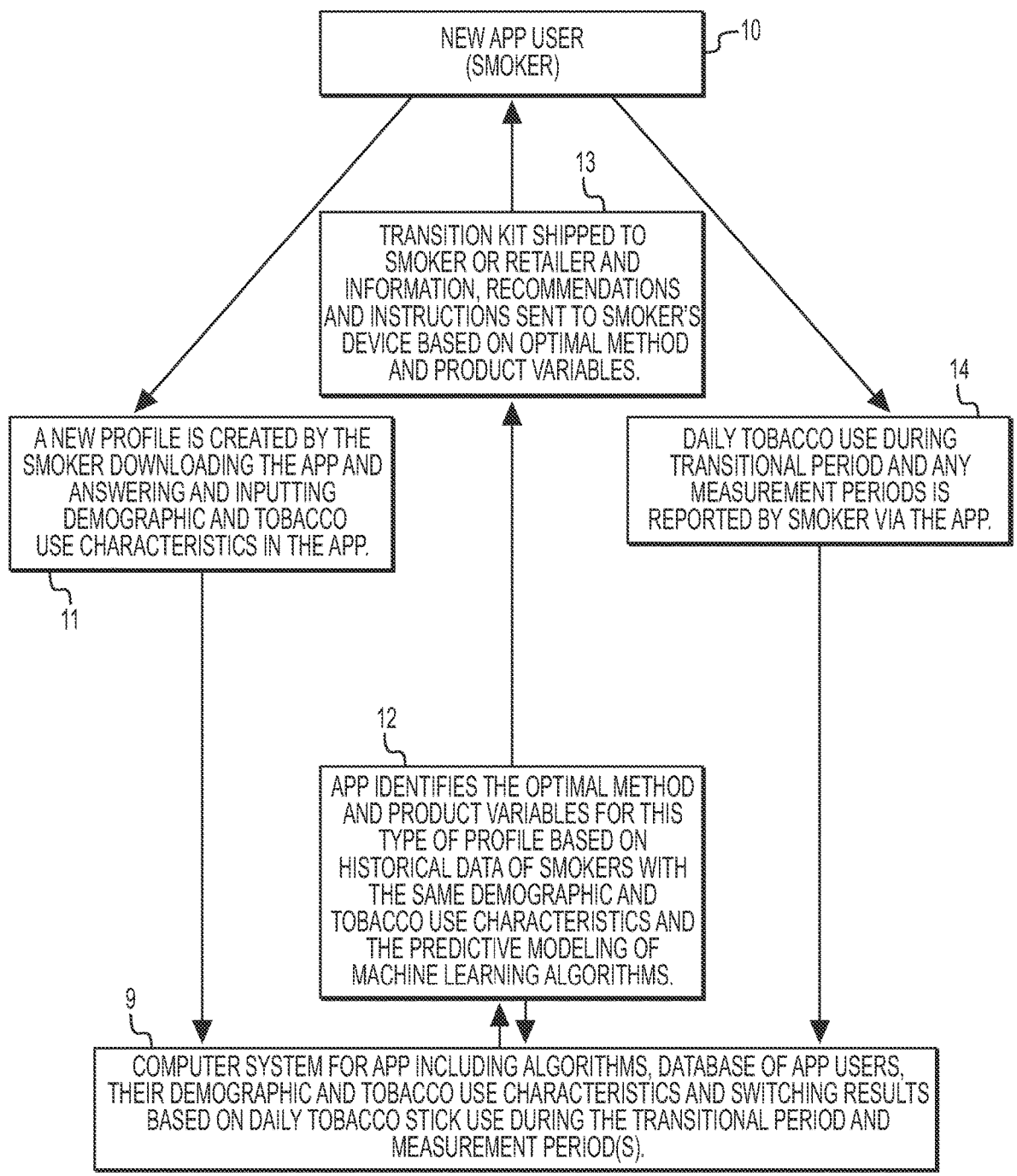
FIG. 3A is a data flow diagram illustrating a system for transitioning cigarette smokers to e-cigarettes or a tobacco heating device.

FIG. 3A is a data flow diagram illustrating a system for transitioning cigarette smokers to a tobacco heating device. As shown in FIG. 3A, the data set collected from each smoker, including the demographic and tobacco use characteristics inputted into the App prior to transitional period of Method A and the smoker's daily tobacco use during the transitional period (and any measurement periods), is reported by the smoker via the App and added to the computer system database of smoker profiles. The smoker's daily tobacco use of very low nicotine cigarettes, e-cigarettes or tobacco sticks (or heating rods), and conventional cigarettes (if any) during the transitional period (and potentially for a period of time thereafter) is inputted into the App by the smoker on a daily basis.

As shown in FIG. 1, the protocol of Method A in this exemplary embodiment instructs the smoker to stop using their usual brand of conventional cigarettes (and any other conventional cigarettes) at a moment in time, referred to as "time point zero." 3 Once the smoker has the transition kit 4, which includes very low nicotine cigarettes, a tobacco heating device and tobacco sticks (or e-cigarettes), and the instructions and recommendations 6 for Method A, the smoker is directed to schedule time point zero, which commences the transitional period. The duration of the transitional period is outlined in the instructions and recommendations and the smoker's total smoke dependence score and demographic and tobacco use characteristics are considered. The optimal method and product variables may be calculated by a computer system of the App. It is generally recommended to the smoker to schedule time point zero 3, at a moment in time, after the last conventional cigarette in the smoker's last pack has been smoked or discarded so that the smoker does not have any conventional cigarettes. After time point zero, the smoker is directed to smoke the very low nicotine cigarettes without restriction for as long of a period as possible. Without restriction means the smoker may smoke as many very low nicotine cigarettes as desired and any number of puffs may be taken from each cigarette as desired by the smoker. There are no limitations. It may be recommended that no other tobacco or nicotine product be used during this portion of the transitional period.

In this exemplary embodiment, from time point zero 3 through the end of the transitional period 1, the smoker is instructed to smoke the very low nicotine cigarettes without restriction. During the time of exclusively smoking very low nicotine cigarettes, from time point zero of the transitional period up to time point one, the smoker is extinguishing the pleasurable and reinforcing effects of combustible cigarettes. Smoking very low nicotine cigarettes generally reduces craving for conventional cigarettes. The lower the smoker's dependence score, usually the more likely very low nicotine cigarettes effectively reduce craving and the longer period of time a conventional cigarette smoker can go without smoking a conventional cigarette. The longer period of time the smoker can exclusively smoke very low nicotine cigarettes after time point zero, the easier the transition to a tobacco heating device (or e-cigarettes) will be.

As shown in FIG. 1, the smoker is instructed to start to use the tobacco heating device (or e-cigarettes) without restriction if and when the smoker has an overwhelming craving for a conventional cigarette. An overwhelming craving may be characterized as such a strong desire to smoke a conventional cigarette that the smoker's mind is made up or virtually made up that the smoker needs, and is going to smoke, a conventional cigarette. "Time point one" 7 is referred to as the moment in time the smoker commences using the tobacco heating device (or e-cigarettes). The smoker is instructed to start to use the tobacco heating device (or e-cigarettes) upon the smoker having an overwhelming craving for a conventional cigarette (and to resist smoking a conventional cigarette) since the aerosol from the tobacco heating device (or e-cigarettes) is positively reinforcing to the smoker and to an extent replaces the pleasurable effects of smoke from conventional cigarettes. This experience is impressionable due to the prior use of the very low nicotine cigarettes extinguishing the pleasurable and reinforcing effects of combustible cigarettes. During this timeframe, between time point zero 3 and time point one 7, the very low nicotine cigarettes cause the tobacco heating device (or e-cigarettes) to be more palatable to the smoker, as compared to the smoker going directly from conventional cigarettes to a tobacco heating device (or directly to e-cigarettes), which assists the smoker to continue to use the tobacco heating device (or e-cigarettes).

Between time point zero 3 and time point one 7, it may be recommended to the smoker to not use any other tobacco product or nicotine product. If and when the smoker desires a combustible cigarette between these two time points and throughout the remainder of the transitional period, the smoker is directed and urged to smoke a very low nicotine cigarette and not a conventional cigarette. Each and every time the smoker smokes a very low nicotine cigarette during this timeframe and subsequently uses a tobacco heating product (or adequately satisfying e-cigarette), the smoker is continuing the process of extinguishing the positive effects of combustible cigarettes and reinforcing the positive effects of a tobacco heating product or e-cigarette. Reminders to use the tobacco heating device (or e-cigarettes) (without restriction) and very low nicotine cigarettes (without restriction) may be in the form of, for example, daily messages such as text messages to a smartphone or smartwatch, alarms, telephone calls or other types of communications. It may also be recommended, and reminders may also be sent, that no other tobacco or nicotine product be used during the transitional period and/or after transitional period. These types of reminders, whether on a daily basis or otherwise, are greatly facilitated and enhanced by the computer and mobile App described herein since all the smoker's contact information as well as the smoker's demographic and tobacco use characteristics are already factored and considered by the computing system.

As shown in FIG. 1, the smoker is instructed to cease smoking very low nicotine cigarettes on the last day of the scheduled transitional period, referred to as "time point two," and to continue to use the tobacco heating device (or e-cigarettes) after the transitional period without smoking any conventional cigarettes. As time point two 4 approaches, the smoker is reminded of this date at least on a daily basis through text messages and these reminders not to smoke conventional cigarettes may continue after the transitional period. In this example, the end of the transitional period 1 is exactly 28 days from time point zero, and the smoker is also reminded after the transitional period to use the tobacco heating device (or e-cigarettes) without restriction and to use the tobacco heating device (or e-cigarettes) exclusively (without other tobacco products). The smoker may be instructed to store any remaining very low nicotine cigarettes in the refrigerator (so that these cigarettes do not get stale), and to only smoke these if and when the smoker experiences overwhelming craving for a conventional cigarette. If the smoker runs out of very low nicotine cigarettes prior to time point two 4 or additional very low nicotine cigarettes are recommended based on the assessment of the computing system, the smoker may be directed to obtain additional very low nicotine cigarettes in the interest of not smoking any conventional cigarettes. Very low nicotine cigarette and tobacco sticks (or heating rods) or e-cigarettes may be ordered through the App at any time and the App can be set to automatically order any tobacco product such as tobacco sticks upon the App user running low.

While the smoker smokes the very low nicotine cigarettes throughout the transitional period and uses the tobacco heating device (or e-cigarettes) from time point one of the transitional period, very low nicotine cigarettes are extinguishing the pleasurable and reinforcing effects of combustible cigarettes, and the tobacco heating device (or e-cigarettes) is reinforcing the pleasurable effects of tobacco. By both of these conditioning principles occurring during the transitional period, smokers transitioning from conventional cigarettes to tobacco heating devices (or e-cigarettes) is facilitated. As depicted in FIG. 1, it is expected that during the transitional period average tobacco use 8 of very low nicotine cigarettes decreases among smokers following Method A, and while using the aforementioned transition kit and assuming no conventional cigarettes are consumed, average use of tobacco sticks of the tobacco heating device (or e-cigarettes) 8 increases to about the smoker's previous level of conventional cigarettes per day. Replacing cigarette smoke with aerosol from a tobacco heating device or e-cigarettes reduces the levels of harmful and potentially harmful constituents (HPHCs) smokers are exposed to and expectedly reduces the risk of tobacco-related disease.

Messages may be sent by the App to the smoker's devices (e.g., smartphone) leading up to time point zero, throughout the transitional period, and depending on the smoker's level of success of switching to a tobacco heating device (or e-cigarettes), potentially for a period of time after the transitional period. Multiple messages may be sent per day in the interest of the smoker having the highest probability of switching to a tobacco heating device (or e-cigarettes). These messages in terms of their content, frequency and timing are in part based on matching new users of the App with smokers of similar profiles who have already successfully used the App in conjunction with the methods and products disclosed herein and who have successfully switched to a tobacco heating product (or e-cigarettes). For example, the optimal message content, how many times to send the message, and the timing of the messages for the timeframe between the smoker receiving the transition kit and time point zero may include the smoker receiving messages starting when the transition kit is received, and every eight hours thereafter until time point zero. These messages remind and prepare the smoker for time point zero. Subsequent messages from the App remind and prepare the smoker for other notable events of the protocol and encourage the smoker to follow the recommended protocol in the interest of becoming smoke free.

Although there are no known published, peer-reviewed results of studies utilizing very low nicotine cigarettes to transition smokers to e-cigarettes or a tobacco heating product as of the filing of this application, information and results from such studies may also be inputted into, and evaluated by, the computer system related to the App as they become available. Unlike e-cigarettes which are popular, approximately 99.95 percent of current worldwide smokers has never smoked a very low nicotine cigarette, and approximately 97 percent of current worldwide smokers has never used a tobacco heating device.

5. Example 2

Developing Smoker Profiles and Increasing Rates of Smokers Switching to E-cigarettes or a Tobacco Heating Device Through an App Because the present disclosure provides user generated information for inputting into a computer system, such as pack-year rating, number of cigarettes smoked per day, etc., the disclosure contemplates a computer and mobile application (App) for conventional cigarette smokers to download to a smartphone, wearable device, computer or other device to further assist conventional cigarette smokers to switch to e-cigarettes or a tobacco heating device using the methods and products disclosed herein. In this regard, databases are first generated and populated with data and information from studies of smoking behavior, e-cigarette behavior and tobacco heating device behavior. These include demographic and tobacco use characteristics of smokers in market studies and studies evaluating dual use of conventional cigarettes and e-cigarettes and dual use of conventional cigarettes and tobacco heating devices.

As described herein, a "computer or mobile App" or "App" includes an application program, script, or one or more elements of compiled code executable by a computing device or computing system operating within a corresponding network environment. Since there are potentially millions of smoker profiles due to many combinations of demographic and tobacco use characteristics of the world's approximate one billion smokers, plus an enormous amount of data recorded on the daily use of e-cigarettes or tobacco heating devices, and very low nicotine cigarettes during and after the transitional period of the methods disclosed herein, it is not possible for a human to mentally calculate this amount of data and recommend the optimal method and product variables. These demographic and tobacco use characteristics, along with the daily inputted data of tobacco product use, need to be inputted to a computing system or device that has the sufficient computing power to process, analyze and make predictions from this large amount of data.

The probability of another smoker having the exact smoker profile as the above 37-year-old male smoker profile is small. The exact probability depends on how questions are asked by the App, the type of questions (e.g., multiple choice questions), and how many choices the smoker has for each question. For example, a smoker's occupation can be an important factor in determining what method the App recommends and the variables of the method and the variables of the products used for the method. A multiple-choice question for occupation in which the choices are white collar or blue collar would be less revealing than a menu in which the smoker has dozens of occupation choices. The greater number questions and the greater number of potential answers for each question that the App asks the smoker, the greater number of potential smoker profiles and the more differentiated the smoker profile database becomes. The greater the differentiation of the database in terms of demographic and tobacco use characteristics and daily tobacco use data during and after the transitional period, the more effective the predictive modeling of machine learning algorithms becomes within the computer system.

After the smoker answers the required questions and the App calculates in real time the optimal method and product variables, an order form appears on the screen of the device for the smoker to order the personalized transition kit. This includes e-cigarettes or a tobacco heating device and tobacco sticks for the tobacco heating device, very low nicotine cigarettes, and highly individualized computer-generated information, including instructions and recommendations for switching a conventional cigarette smoker to e-cigarettes or a tobacco heating device. The tobacco sticks may not be included with the tobacco heating device if there's not a separate holder in which case the heating element is contained in each of the tobacco heating rods (e.g., an Eclipse® type or a TEEPS® type tobacco heating product described above). The package is then delivered to the smoker by courier or it may be delivered to a pharmacy or other location where the smoker picks it up and shows identification that the smoker is of the minimum age to use tobacco products.

The computer-generated information, recommendations or instructions for any method to facilitate smokers switching to e-cigarettes or a tobacco heating product, besides being included in the transition kit provided to the smoker, may also be furnished to the smoker by the App as pop-up messages or text messages on a smartphone, cellular telephone, smartwatch or other device and may be provided on a daily basis or otherwise. This enhances the effectiveness of the information, recommendations and instructions and efficiently provides any reminders, encouragement, and/or individualized recommendations and instructions based on the recommendation of the App and considering the smoker's demographic and tobacco use characteristics. For example, for a smoker with a similar profile of the above 37-year-old male, during the work week he may have two opportunities per work day to smoke outside while teaching at school, a 15-minute break at 9:30 AM and an hour lunch break at 12:30 PM. During the transitional period and even after the transitional period, the App may send him a text message at these exact times reminding him to not smoke conventional tobacco cigarettes and depending on the stage of the method he in using, to smoke the very low nicotine cigarettes or use the tobacco heating device or e-cigarettes.

In some embodiments, the transition kit, which includes e-cigarettes or a tobacco heating device with tobacco sticks for the tobacco heating device, and very low nicotine cigarettes, may be free of charge, sold at manufacturer's cost, or deeply discounted compared to retail prices, as long as the smoker throughout the transitional period, and for a period of time after the transitional period, inputs the required pertinent information into the App or otherwise conveys the pertinent information to the computing system. This required pertinent information provided by the smoker includes details on the daily use of the very low nicotine cigarettes and tobacco sticks in the transition kit during the transitional period or during and after the transitional period for a period of time such as 6 months. Any conventional cigarette use must also be reported on a daily basis to the computing system. For a free or deeply discounted transition kit of tobacco products, for example, the smoker may also have to agree to exchange the tobacco heating device for a new tobacco heating device at some point since some tobacco heating devices such as IQOS® have data storage capacity which tracks various usage information. Even more demanding requirements may include carbon monoxide (CO), blood and/or urine tests during and/or after the transitional period to chemically verify the type of and amount of tobacco products the person has been exposed to over certain timeframes.

It is important for smokers using the App to accurately report their tobacco use during and after the transitional period, which is a reason for offering incentives such as free or discounted products to the user of the App. In some cases, the value of this data inputted to the computer system through the App is worth the cost of subsidizing the products to certain stakeholders such as health insurance carriers. Any reordering of tobacco sticks or very low nicotine cigarettes through the App for a period of time can assist in confirming data inputted by the App user.

All of the data from each smoker using the App is collected and added to the computer system, including the smoker's profile, the optimal method and product variables recommended by the App, reordering information, and cigarette and tobacco heating device use (or e-cigarettes use) during and after the transitional period. The level of success of the method and product variables that the App recommended to the smoker, post transitional period, is compared to the level of success of the method and product variables that the App recommended to the smokers with similar smoker profiles, post transitional period. The measurement period, which is one or more periods of time typically after the transitional period of a method to measure the level of switching success the method and product variables achieved on the smoker, may be any length of time in duration, may start at any time (even during the transitional period). Examples of measurement periods include 7 days immediately after the transitional period and/or 10 days starting 6 months after the transitional period. Relevant levels of tobacco use during a measurement period include (a) smokers who have tried a tobacco heating product (or e-cigarettes) and no longer use a tobacco heating product (or e-cigarettes), whatsoever, and have gone back to smoking cigarettes, (b) smokers who dually use cigarettes and a tobacco heating product (or dually use cigarettes and e-cigarettes), (c) smokers who have successfully switched to a tobacco heating product (or e-cigarettes) and exclusively use the tobacco heating product (or e-cigarettes), and (d) smokers who have quit tobacco use altogether. These levels may then be further stratified by the computing system into eight categories:

(i) smokers who have completely failed to adopt e-cigarettes or a tobacco heating product (still smokers: 100% cigarette use), (ii) smokers who primarily smoke cigarettes (predominant smokers: ≥70% cigarette use and ≤30% tobacco stick use or e-cigarette use), (iii) smokers who mostly smoke cigarettes (inclined smokers: ≥50% and <70% cigarette use and >30% and ≤50% tobacco stick use or e-cigarette use), (iv) smokers who smoke about the same number of cigarettes as use tobacco sticks or e-cigarettes (half smokers: about 50% cigarette use and about 50% tobacco stick or e-cigarette use), (v) smokers who mostly use tobacco sticks or e-cigarettes (inclined tobacco stick or e-cigarette users: ≥50% and <70% tobacco stick or e-cigarette use and >30% and ≤50% cigarette use), (vi) smokers who primarily use tobacco sticks or e-cigarettes (predominant tobacco stick or e-cigarette users: ≥70% and <90% tobacco stick or e-cigarette use and >10% and ≤30% cigarette use), (vii) smokers who overwhelmingly use tobacco sticks or e-cigarettes (overwhelming tobacco stick or e-cigarette users: ≥90% and <99% tobacco stick or e-cigarette use and >1% and ≤10 cigarette use), and (viii) former smokers who have exclusively switched to e-cigarettes or a tobacco heating device (exclusive tobacco stick or e-cigarette users: ≥99% and ≤100% tobacco stick or e-cigarette use and ≥0 to ≤1% cigarette use).

Dual users of conventional cigarettes and tobacco heating devices in studies typically tradeoff conventional cigarettes for tobacco sticks and vice versa on a one-to-one basis. Any replacement of smoking cigarettes with use of tobacco sticks or heating rods is generally beneficial for health since dual use of smoking cigarettes, whether conventional and/or very low nicotine, and using a tobacco heating device generally reduces smoke exposure to the smoker, as compared to smoking only cigarettes and not using a tobacco heating device. A complete switch in which the smoker exclusively uses a tobacco heating device is the ultimate goal (short of complete tobacco and nicotine cessation) since a tobacco heating device produces an aerosol without any smoke thereby significantly reducing toxins. Any replacement of smoking cigarettes with e-cigarette use is also generally beneficial for health since dual use of e-cigarettes and conventional cigarettes generally reduces smoke exposure to the smoker, as compared to smoking only cigarettes and not using e-cigarettes.

Proprietary machine learning algorithms work in conjunction with the database of the computing system and identify and calculate significant correlations among demographic and tobacco use characteristics of a person using the App for the first time with those who have already used the App and switched to e-cigarettes or a tobacco heating device. Upon launching the App and shortly thereafter, the App recommends the optimal method and product variables for the new App user which most closely resemble the most successful method and product variables utilized by the most similar smoker profile in the database. Subsequently, as more smokers use the App and provide an increasing number of smoker profiles and switching results from multiple combinations of method and product variables, predictive modeling algorithms of the App continually improve in successfully switching smokers to a tobacco heating product.

As shown in the App data flow diagram of FIG. 3A, there are various inputs and outputs within the computer system of the App 9. After downloading the App, a smoker 10 inputs demographic and tobacco use characteristics 11 into the App by answering, for example, questions to determine a smoker's Fagerstrom dependence score, pack-year rating, total smoke dependence score, how the smoker first learned about the App, average number of cigarettes smoked per day over the last month, usual cigarette brand used, any current or previous use of nicotine products including e-cigarettes, any current or previous use of a tobacco heating product, any current or previous use of any other tobacco products, number of previous cigarette quit attempts if any, level of interest in switching to e-cigarettes or a tobacco heating product compared to level of interest in quitting tobacco altogether, significant other's smoking status and smoking status of any person(s) the smoker cohabitates with, gender, age, race, ethnicity, national origin, highest level of education attained, occupation, and ease of being able to smoke conventional cigarettes, e-cigarettes, or a tobacco heating product while working. These inputs occur before the smoker commences utilizing any of the methods and products disclosed herein, and this data is added to the database of the computer system.

As a result of these inputs, the computer system and App identify a series of outputs to the smoker, as shown in FIG. 3A. These include the optimal method and product variables 12 for the smoker such as the specific switching method (e.g., Method A), duration of transitional period, nicotine level of very low nicotine cigarettes, nicotine level of tobacco sticks, level of very low THC *cannabis* in the filler of very low nicotine cigarettes (if any), level of very low THC *cannabis* in the filler of the tobacco sticks (if any), and personalized recommendations and instructions including App reminders and encouragement messages are continually reviewed and finetuned. Upon the smoker agreeing to these, the personalized transition kit 13 and information, recommendations and instructions are forwarded to the smoker.

Another set of inputs occurs after the smoker commences utilizing any of the methods and products disclosed herein. As shown in FIG. 3A, the smoker inputs his or her daily tobacco use 14, including very low nicotine cigarettes, e-cigarettes or tobacco sticks or heating rods, and any conventional cigarette use or other tobacco or nicotine product use during the transitional period and any measurements periods. This information being inputted back into the App by the smoker and added to the database of the computer system is important for the predictive modeling of machine learning algorithms to improve the effectiveness of the transition regimen of the method and product variables to future App users. The flow of information throughout the computer system of the App in FIG. 3A, including product use information during and after the transitional period, is essentially the same for every App user except the timing of certain timepoints vary based on the method recommended and the method's variables. As smokers increasingly utilize the App and use the methods and transition kits herein, the amount of data in the computer's database and the accuracy of the machine learning algorithms in regards to the method and product variables also increase, which results in the improving switching rates. As the number of smoker profiles increases, there is more relevant data on how various combinations of method and product variables affect switching results for similar smoker profiles. Also, there is an increased probability that a new user of the App will be matched or closely matched with a smoker profile in the database previously proven to successfully transition to the tobacco heating device. It is understood that the singular form of algorithm may also include the plural form of algorithms, that is, multiple apps, which are often required for predictive modeling and analytics.

Figure 3B:
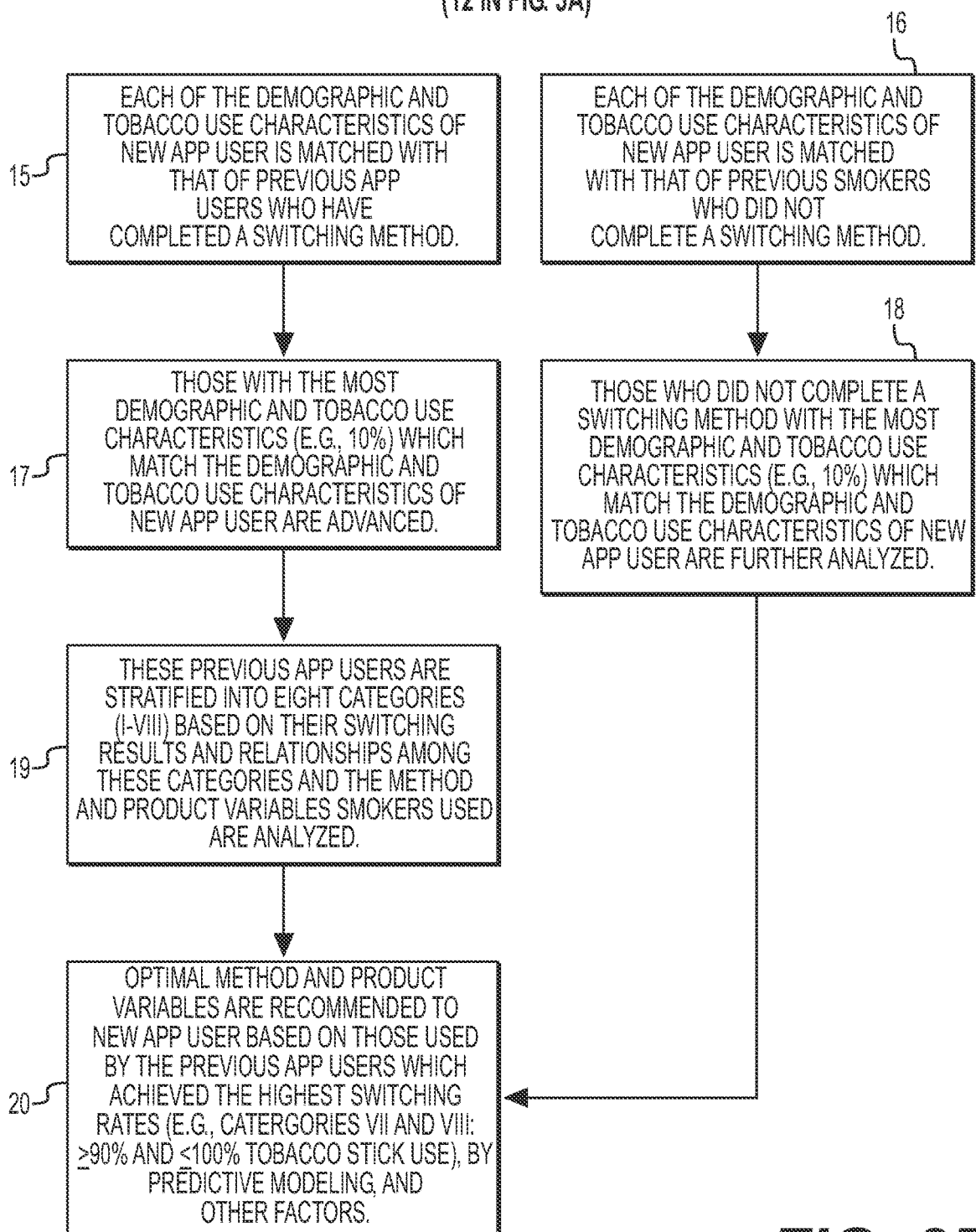
FIG. 3B is a diagram of an algorithm matching process for identifying the optimal method and product variables.

FIG. 3B is a diagram of an exemplary embodiment of an algorithm matching process for identifying the optimal method and product variables 12 of FIG. 3A. This process of how the computer identifies the optimal method and product variables for a new App user is shown in FIG. 3B. The first step is matching each and every of the dozens of demographic and tobacco use characteristics of the new App user with the demographic and tobacco use characteristics of those smokers in the database who have completed a switching method 15 and those smokers in the database who have started a switching method but have not completed switching method 16. Smokers in the database who have the most similar profile of demographic and tobacco use characteristics may be identified for each of these two groups. This may be accomplished by matching each demographic and tobacco use characteristic of the new App user with those already in the database who have completed a switching method and a certain percentage of those smokers (e.g., 10%) with greatest number of demographic and tobacco use characteristics to advance to the next step 17. The same is done for the group who has not completed a switching method 18. Alternatively, each demographic and tobacco use characteristic is given a weight (for example, 10 being the most important and 1 being the least important) and a certain percentage of those smokers in the database who have completed a switching method with the highest cumulative number of matches (e.g., 5%) advance to the next step.

The subset of previous App users who have finished a method may then be stratified into the aforementioned eight categories of switching results (i-viii) from still smokers (i) to former smokers who have exclusively switched to e-cigarettes or a tobacco heating product (viii) 19. Statistically significant relationships among these eight categories and method and product variables utilized by former App users are analyzed. Method and product variables include (i) a method to transition smokers to e-cigarettes or a tobacco heating product (e.g., Method A) and any variables of the method such as the length of the transitional period, (ii) the type, brand and model of e-cigarette (e.g., JUUL® and JUUL pods which are a closed system not designed to be refillable with e-liquid) or tobacco heating product (e.g., IQOS® including a holder and tobacco sticks versus tobacco heating rods), (iii) brand of very low nicotine cigarettes, (iv) the product variables for the method during the transitional period (and potentially after the transitional period) such as nicotine, anatabine, and anabasine content of the very low nicotine cigarettes, e-cigarettes or tobacco sticks/heating rods, *cannabis* content or cannabinoid content, if any, of the very low nicotine cigarettes, e-cigarettes or tobacco sticks/heating rods, and flavorings in the very low nicotine cigarettes, e-cigarettes or tobacco sticks/heating rods, and (v) information, recommendations and instructions for using the method and products including any daily reminders, individualized or personalized aspects, and method of delivery (e.g., via smartwatch).

As shown in FIG. 3B, based on the method and product variables used by these previous App users who achieved the highest switching rates, in conjunction with considerations of previous smokers who did not complete a method and predictive modeling for improving switching rates, optimal method and product variables are recommended to the new App user 20. Any factors that may have caused smokers to not complete the recommended transitional period need to be investigated and addressed since non-compliance with the recommended protocol causes reduced switching rates.

An example of predictive learning is that the App may recommend a different method variable (e.g., duration of transitional period) and/or a different product variable (e.g., very low nicotine cigarettes comprising 2 mg of nicotine versus 1 mg of nicotine or less) to a new App user other than those used by the previous App users who achieved the highest switching rates for a given profile or a given subset of demographic and tobacco use characteristics. For example, if 40 year-old smokers who (a) have a pack rating of 4, (b) smoke Winston®, (c) have attempted to quit smoking (defined by purchasing a smoking cessation aid) 2 or 3 times, have better switching results the longer the transitional period is for Method A and the longest transitional period recommended by the App thus far has only been 30 days, the algorithm will continually recommend a longer transitional period for these smokers that have this subset of matching demographic and tobacco use characteristics. Upon the switching success rate maximizing for this subgroup of 40-year-old smokers in terms of length of the transitional period (e.g., 42 days), the App will no longer recommend longer transitional periods and continue to identify other variables to improve the switching rate for this subgroup.

In this way, the App evolves from initially using only historical correlations among demographic and tobacco use characteristics of smokers who have already used the App to utilizing predictive modeling and analytics. The App 'learns' by artificial intelligence (AI) the optimal method and product variables for as many smoker profiles as possible by using cause and effect as well as historical correlations. Switching rates for each type of smoker profile may be continually improved by optimizing the method and product variables of switching smokers to e-cigarettes or a tobacco heating device. New questions in developing smoker profiles may also be added or modified periodically in the interest of further diversifying each smoker profile to improve switching success rates. The App may also recommend to smokers with a subset of demographic and tobacco use characteristics that overlap a different switching method with the same method and product variables to mathematically determine improvements in switching rates.

The App choosing the optimal method and product variables means the combination of switching method, type of e-cigarettes or tobacco heating product, and other method variables and product variables that have resulted in the best switching results for smokers that have used the App which most closely resemble the smoker profile of the new App user at the time. Since there are millions or at least hundreds of thousands of potential smoker profiles due to many combinations of demographic and tobacco use characteristics, rarely is there an exact match between a new user of the App and previous user of the App.

The optimal method and product variables for a new App user calculated by machine learning algorithms of the computer system do not necessarily mean the method and product variables which have resulted in smokers exclusively switching to e-cigarettes or a tobacco heating device ($\geq 99\%$ and $\leq 100\%$ e-cigarettes or tobacco sticks and $\geq 0$ to 1% cigarettes), but also considers smokers who have overwhelmingly switched ($\geq 90\%$ and $<99\%$ e-cigarettes or tobacco sticks and $>1\%$ and $\leq 10\%$ cigarettes) and those who have predominantly switched (70% and $<90\%$ e-cigarettes or tobacco sticks and $>10\%$ and $\leq 30\%$ cigarettes) and so on. For example, it may be more efficacious for the App to recommend a set of method and product variables which have, for example, a 55 percent probability of a smoker becoming an overwhelming tobacco stick users ($\geq 90\%$ and <99% tobacco sticks and >1% and ≤10% cigarettes) than for the App to recommend a set of method and product variables which have, for example, a 20 percent probability of success for the smoker to become an exclusive tobacco stick users (≥99% and ≤100% tobacco sticks and ≥0 to ≤1% cigarettes). These calculations would be evidence based and consider the epidemiological record of comparing different levels of exposure to tobacco smoke and aerosol from e-cigarettes or tobacco heating devices. At this time, there is not enough evidence to determine these types of tradeoffs but as more results from studies of e-cigarettes and tobacco heating devices become available, the more data will be utilized by the machine learning algorithms. Data from peer reviewed studies will be imputed into the computer system of the App and updated regularly.

6. Example 3

Method B—Exemplary Embodiment to Facilitate Smokers Switching to E-Cigarettes or a Tobacco Heating Product Method B may be more suitable than Method A for certain smokers who have been using e-cigarettes or a tobacco heating device in conjunction with their usual brand of conventional cigarettes. Unlike new users of e-cigarettes or a tobacco heating device, these dual users have experience in using e-cigarettes and/or a tobacco heating device with conventional cigarettes and may be stratified into the aforementioned seven of eight categories of smokers who have already tried e-cigarettes or a tobacco heating device (ii-viii). Unlike e-cigarettes which are popular, only about 3 percent of current worldwide smokers has previously used a tobacco heating device; however, this number is expected to increase over time. Method and product variables are preferably determined by the computing system of an App as described herein.

Figure 4:
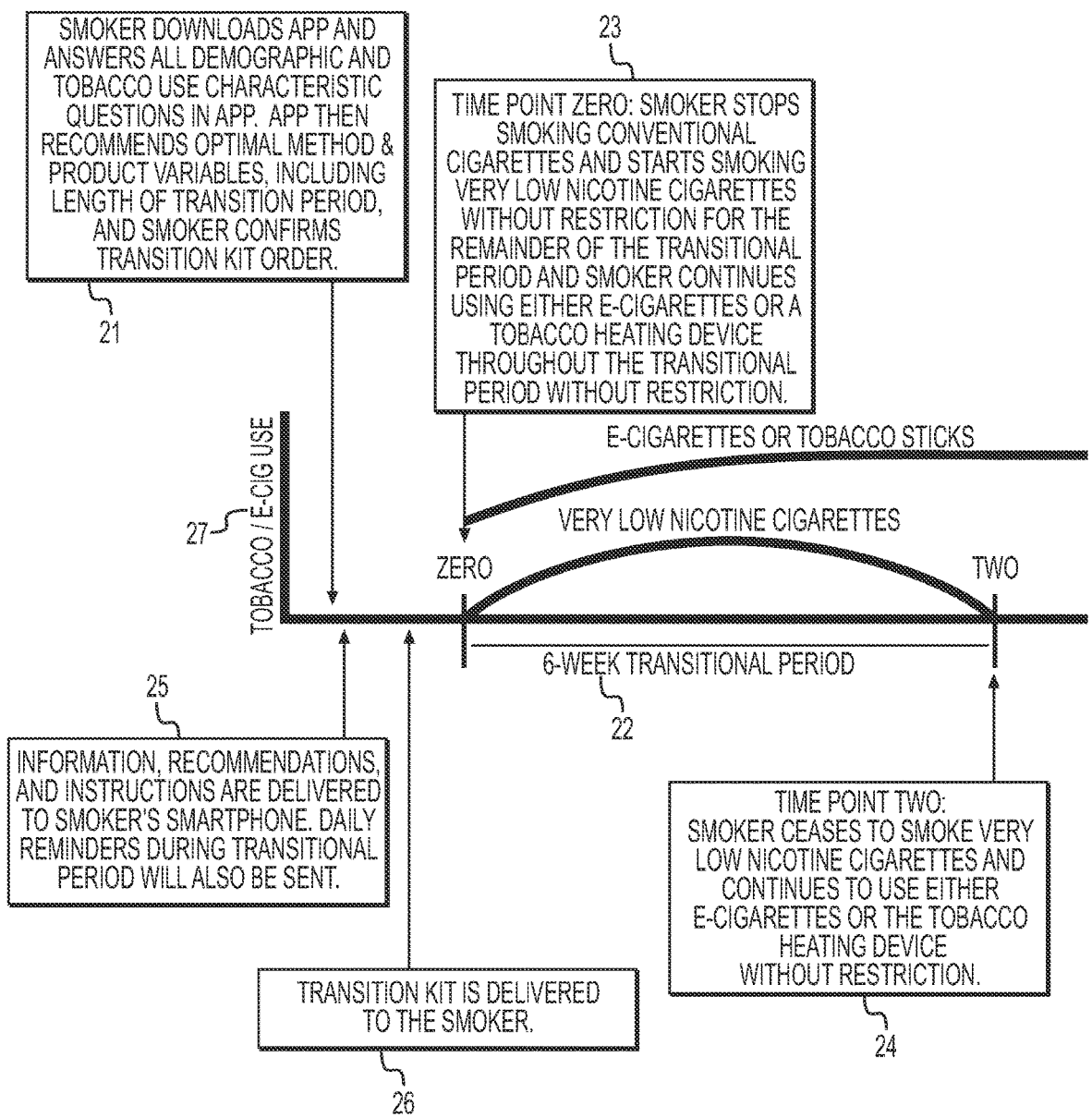
FIG. 4 is a diagram illustrating a method of transitioning cigarette smokers to e-cigarettes or a tobacco heating device.

FIG. 4 is a diagram illustrating Method B of transitioning cigarette smokers. This exemplary embodiment may transition a dual user of conventional cigarettes and e-cigarettes or a dual user of conventional cigarettes and a tobacco heating device to reduce or eliminate smoke exposure from conventional cigarettes and replace this cigarette use with aerosol from e-cigarettes or a tobacco heating device. After downloading the App and answering all demographic and tobacco use questions, the App recommends that the smoker 21, a dual user of conventional cigarettes and a tobacco heating device, uses Method B with a 6-week transitional period 22, which commences at time point zero 23 and ends at time point two 24 (there is no time point one in Method B). Also recommended to the smoker is that very low nicotine cigarettes containing 1.50 mg of nicotine per cigarette are used and that a specific type of brand and model of tobacco heating system (may be different than the smoker's usual brand and model of tobacco heating product) is used during the 6-week transitional period along with tobacco sticks containing 6.5 mg of nicotine per tobacco stick. The smoker either subsequently agrees to the recommended method and product variables, including a summary of Method B, and purchases the transition kit or does not agree. The smoker may not have to purchase anything if the smoker is part of a study or other effort to have the smoker switch. In either case, upon the smoker agreeing to the recommended method and product variables, the smoker is informed by the App how and when the transition kit will be delivered to the smoker. Information, recommendations, and instructions 25 for reducing cigarette use and increasing use of a tobacco heating product are delivered to the smoker's smartphone based on the smoker's demographic and tobacco use answers. The transition kit 26 is delivered to the smoker shortly thereafter. This includes the App's recommendations to the smoker of ideal time points to stop smoking conventional cigarettes, including the smoker's usual brand, which is referred to as time point zero 23, and to continue smoking the very low nicotine cigarettes. For example, the App may consider a smoker's age, marital status and/or work schedule, among many other factors, when determining ideal potential times for time point zero, which the smoker ultimately determines after the App recommends some options.

If the smoker is a dual user of conventional cigarettes and e-cigarettes, the App may recommend, for example, Method B with a 6-week transitional period and very low nicotine cigarettes containing 2.00 mg of nicotine and an e-cigarette with a relatively higher nicotine content than the smoker's usual brand. Depending on the smoker's usual brand of conventional cigarettes and tobacco heating product and other factors, the App may recommend e-cigarettes to a dual user of conventional cigarettes and a tobacco heating product for Method B, and depending on the smoker's usual brand of conventional cigarettes and e-cigarettes and other factors, the App may recommend a tobacco heating product to a dual user of conventional cigarettes and e-cigarettes.

Method B may be utilized to replace the smoke portion from the smoker's cigarette use with the aerosol of e-cigarettes or aerosol of a tobacco heating device, and depending on the level of cigarette use, exclusively switch the dual user to e-cigarettes or a tobacco heating device (≥99% and ≤100% e-cigarettes or tobacco sticks and ≥0 to ≤1% cigarettes), overwhelmingly switch the dual user to e-cigarettes or a tobacco heating device (≥90% and <99% e-cigarettes or tobacco sticks and >1% and ≤10% cigarettes) or predominantly switch the dual user to e-cigarettes or a tobacco heating device (≥70% and <90% e-cigarettes or tobacco sticks and >10% and ≤30% cigarettes). As shown in FIG. 4, the protocol of Method B directs smokers during the transitional period to stop using their usual brand of conventional cigarettes at a moment in time, referred to as "time point zero," 23 and to continue to use e-cigarettes or a tobacco heating device. This may be the e-cigarette brand or tobacco heating device brand that the smoker has been using in conjunction with conventional cigarettes or it may be a different e-cigarette brand or tobacco heating device brand with a high nicotine content such as one that may be included in a transition kit. Once the smoker obtains the transition kit 26, which includes very low nicotine cigarettes, e-cigarettes or a tobacco heating device with tobacco sticks, and the information, recommendations and instructions 25 for Method B, the smoker is directed to schedule time point zero 23, which commences the transitional period.

The nicotine content of the e-cigarettes or tobacco sticks in the transition kit 26 may be higher (than what is typical) for use in any method herein including for dual users employing Method B. A higher nicotine content e-cigarette or tobacco stick (or tobacco heating rod) used during the transitional period and/or thereafter will likely facilitate certain smokers not smoking any conventional cigarettes including the smoker's usual brand. The duration of the transitional period, which may be calculated by the computing system of an App, is outlined in the instructions 25 and depends in part on a smoker's Fagerstrom dependence score, pack-year rating and total smoke dependence score, current level of dual use (e.g., predominant tobacco stick use which is ≥70% and <90% tobacco stick use and >10% and ≤30% conventional cigarette use), and other factors which may be considered calculated by the App.

After time point zero 23 during the transitional period, the smoker is directed to smoke the very low nicotine cigarettes without restriction and either the e-cigarettes or tobacco heating device without restriction. If and when the smoker desires a combustible cigarette during the transitional period (and in some cases after), the smoker is directed and urged to smoke a very low nicotine cigarette and not any conventional cigarettes. Reminders to use the e-cigarettes or tobacco heating device (without restriction) and very low nicotine cigarettes (without restriction) during the transitional period may also be in the form of, for example, daily text messages, telephone calls or other types of communications. It may also be recommended, and reminders may also be sent that no other tobacco or nicotine product be used during the transitional period and/or after transitional period. The effectiveness of these types of reminders, whether on a daily basis or otherwise, is greatly enhanced by the App described herein since the smoker's contact information is known as well as the smoker's demographic and tobacco use characteristics.

The smoker is directed to cease smoking very low nicotine cigarettes on the last day of the scheduled transitional period, defined as "time point two," 24 and to continue to use the either the e-cigarettes or tobacco heating device after the transitional period without smoking conventional cigarettes. As time point two 24 approaches, the smoker may also be reminded of this date on a daily basis and these reminders, which may be in the form of messages to smartphone, can continue after the transitional period. The smoker may be directed to store any remaining very low nicotine cigarettes in the refrigerator. Any opened pack could be stored in a plastic bag so the cigarettes do not get stale. These remaining very low nicotine cigarettes should only be used if and when the smoker experiences overwhelming craving for a combustible cigarette. If the smoker runs out of very low nicotine cigarettes and the smoker believes that the very low nicotine cigarettes may still be needed, rather than smoking any conventional cigarettes such as the smoker's usual brand, the smoker may be directed to obtain additional very low nicotine cigarettes, whether through an App or otherwise.

As shown in FIG. 4, it is expected that during the transitional period average tobacco use 27 of very low nicotine cigarettes decreases among smokers following Method B, and assuming no conventional cigarettes are smoked, average use of e-cigarettes or tobacco sticks 27 of the tobacco heating device increases to about the smoker's previous cumulative level of per-day e-cigarettes and conventional cigarettes or tobacco sticks and conventional cigarettes. Replacing cigarette smoke with aerosol from e-cigarettes or a tobacco heating device reduces the levels of harmful and potentially harmful constituents (HPHCs) smokers are exposed to and expectedly reduces the risk of tobacco-related disease.

While the smoker smokes the very low nicotine cigarettes and uses the tobacco heating device (or e-cigarettes) throughout the transitional period, very low nicotine cigarettes are extinguishing the pleasurable and reinforcing effects of conventional combustible cigarettes, and the tobacco heating device (or e-cigarettes) is reinforcing the pleasurable effects of tobacco to a greater extent than when the dual use was with conventional cigarettes and the tobacco heating device (or e-cigarettes). By both of these conditioning principles occurring during the transitional period, dual users more easily reduce their smoking of conventional cigarettes or eliminate their smoking of conventional cigarettes altogether, and replace their reduced smoking of conventional cigarettes with increased use of the tobacco heating device (or e-cigarettes). This reduces levels of harmful and potentially harmful constituents (HPHCs) smokers are exposed to and expectedly reduces the risk of tobacco-related disease.

7. Example 4

Very Low Nicotine Cigarettes with Enhanced Anatabine and/or Anabasine Content

Anatabine and anabasine share a chemical structure with nicotine, and anatabine and anabasine have been shown to have affinity for nicotinic acetylcholine receptors (nAChRs). Studies on rats have demonstrated the higher the dose of anatabine, nicotine self-administration decreases, and the lower the dose of anatabine, nicotine self-administration increases. Pretreatment with 2.0 mg/kg anatabine significantly reduced nicotine self-administration by nearly half Anabasine displayed a biphasic dose-effect function. Pretreatment with 0.02 mg/kg anabasine resulted in a 25% increase in nicotine self-administration, while 2.0 mg/kg of anabasine reduced nicotine infusions per session by over 50%. The elimination half-life of anatabine administered orally to rats is approximately 2 to 2.5-fold greater than that of nicotine. These results show that anatabine and anabasine can substitute for the subjective effects of nicotine and attenuate withdrawal and craving without the abuse liability of nicotine. See, e.g., Hall et al. 2014, *Pharmacol Biochem Behav*, May; 120: 103-108.

Another exemplary embodiment of the present invention is the use of very low nicotine cigarettes designed to contain an enhanced content of anatabine and/or anabasine. Levels of anatabine and/or anabasine in very low nicotine cigarettes are typical, as compared to that of conventional cigarettes or even elevated beyond typical levels found in conventional cigarettes; however, at the very least levels of anatabine and/or anabasine are increased as compared to typical very low nicotine cigarettes used in research studies. There is a need for these types of very low nicotine cigarettes with unique proportions of these important alkaloids found in tobacco, and these cigarettes are especially advantageous when used to assist smokers in switching to e-cigarettes or a tobacco heating device or to assist smokers in quitting tobacco use altogether. FIG. 5 shows levels of certain minor nicotinic alkaloids in the filler of the fifty top-selling cigarette brand styles in the United States. Anatabine content ranges from 0.927 to 1.390 mg/g with a mean of 1.1 mg/g. Anabasine content ranges from 0.127 to 0.185 mg/g with a mean of 0.147 mg/g. See, Lisko et al 2013, *Anal Chem*. March 19; 85(6): 3380-3384.

Generally, due to common biosynthetic pathways, there is a high correlation of nicotine content, which makes up about 95 percent of total alkaloids in the tobacco plant, to anatabine content or anabasine content in tobacco varieties and tobacco lines. Tobacco that is low in nicotine content (as compared tobacco in conventional cigarettes), including all of the aforementioned tobacco lines with the nic1/nic2 double mutants (LA Burley 21, LAFC 53, LAMD 609 and Vector 21-41), is also relatively low in anatabine and anabasine. For example, six styles of very low nicotine research cigarettes (NRC 100, NRC 101, NRC 102, NRC 103, NRC 104, and NRC 105) distributed for research studies by the National Institute on Drug Abuse (NIDA) of the National Institutes of Health (NIH) under the Nicotine Research Cigarettes Drug Supply Program contains about 0.40 mg/g of nicotine, 0.0065 mg/g of anatabine and 0.0315 mg/g of anabasine in the filler of these cigarettes. See Lisko et al. 2013, von Weymarn et al. 2016, *Chem Res Toxicol.* March 21; 29(3): 390-397, and Notice of Availability of Nicotine Research Cigarettes through NIDA's Drug Supply Program, Notice Number: NOT-DA-14-004: https://grant.nih.gov/grant/guide/notice-files/NOT-DA-14-004.html. Accessed on Jul. 20, 2018.

The nicotine, anatabine and anabasine levels of these very low nicotine research cigarettes are lower by 98%, 99% and 79%, respectively, compared to the average nicotine levels of the conventional cigarette brands in FIG. 2 and the average anatabine and average anabasine levels of the conventional cigarette brands in FIG. 5. None of these conventional cigarette brands contain genetically engineered low nicotine tobacco. Typically, the levels of anatabine and anabasine are concurrently reduced along with nicotine levels in genetically engineered tobacco plants by down-regulating expression of a nicotine biosynthesis gene. For example, suppressing the expression of members of the BBL gene family by genetic engineering is another example in which nicotine, anatabine and anabasine content are concurrently reduced. In six functioning RNAi tobacco lines, nicotine levels in cured leaf were significantly lower (P<0.05) than that observed for the untransformed control line, K326, and these 6 tobacco lines averaged 16 percent of the anatabine content and 70 percent of the anabasine content, as compared to untransformed control line, K326. See, Lewis et al. 2015, PLOS One, February 17; 10(2): e0117273.

However, an exception to the positive correlation of nicotine content and anatabine content occurs when a tobacco line is genetically engineered by down-regulating the expression of (1) a member of the putrescine N-methyltransferase (PMT) gene family (e.g., nucleotide sequence of PMT1 and PMT2 set forth in SEQ ID NO: 3 and SEQ ID NO: 5) (2) N-methylputrescine oxidase (MPO) (SEQ ID NO: 7) or (3) ornithine decarboxylase (ODC) (SEQ ID NO: 9), which may result in anatabine content being increased while nicotine content is decreased. In fact, in some of the resulting tobacco lines, anatabine levels in the leaf may be higher than nicotine content. See Chintapakom et al. 2003, *Plant Molecular Biology* 53: 87-105; and U.S. Pat. No. 8,410,341. Although these modifications have been done in tobacco plants to elucidate pathways of secondary metabolites for experimental reasons, and not for use in tobacco products, the applicant of the present specification discovered that utilizing very low nicotine cigarettes with enhanced levels of anatabine is an improvement over typical very low nicotine cigarettes, especially for smokers attempting to switch to e-cigarettes or a tobacco heating product or attempting to quit tobacco products altogether. Typical very low nicotine cigarettes such as those distributed by NIDA contain anatabine levels that are a tiny fraction of anatabine levels of conventional cigarettes, as demonstrated by Lisko et al. Whether or not the enhanced level of anatabine is from down-regulating the expression of the PMT, MPO and/or ODC or adding anatabine from an extrinsic source, very low nicotine cigarettes comprising an enhanced anatabine content are useful to assist in extinguishing the pleasurable and reinforcing effects of conventional combustible cigarettes. The PMT1 nucleotide sequence is set forth in SEQ ID NO: 3 and the amino acid sequence is set forth in SEQ ID NO: 4. The PMT2 nucleotide sequence is set forth in SEQ ID NO: 5 and the amino acid sequence in set forth in SEQ ID NO: 6. The MPO nucleotide sequence is set forth in SEQ ID NO: 7 and the amino acid sequence is set forth in SEQ ID NO: 8. The ODC nucleotide sequence is set forth in SEQ ID NO: 9 and the amino acid sequence in set forth in SEQ ID NO: 10.

As used herein, an "anatabine-enhanced very low nicotine cigarette" means a cigarette containing 2.0 milligrams (mg) or less of nicotine and at least 0.15 mg anatabine. In some exemplary embodiments, an extrinsic source of anatabine may be utilized and added to the filler of said cigarette. This source may be plants including tobacco plants with high anatabine in which the anatabine is extracted by, for example, a supercritical $CO_2$ extraction process. Alternatively, in other exemplary embodiments, genetically engineered tobacco plants may be used in said cigarette in which anatabine has been increased, as compared to a control plant. In either case, extrinsic anatabine or high anatabine plants may be included in reconstituted tobacco used in the filler of the anatabine-enhanced very low nicotine cigarette. The anatabine content may also be enhanced by anatabine salts of organic acids, anatabine analogs or synthesized anatabine. Either of these anatabine sources may also be incorporated into reconstituted tobacco used in the filler of the anatabine-enhanced very low nicotine cigarette. An anatabine-enhanced very low nicotine cigarette may contain at least the following per-cigarette anatabine contents: 0.15 mg, 0.20 mg, 0.25 mg, 0.30 mg, 0.35 mg, 0.40 mg, 0.45 mg, 0.50 mg, 0.55 mg, 0.60 mg, 0.65 mg, 0.70 mg, 0.75 mg, 0.80 mg, 0.85 mg, 0.90 mg, 0.95 mg, 1.0 mg, 1.05 mg, 1.10 mg, 1.15 mg, 1.20 mg, 1.25 mg, 1.30 mg, 1.35 mg, 1.40 mg, 1.45 mg, 1.50 mg, 1.55 mg, 1.60 mg, 1.65 mg, 1.70 mg, 1.75 mg, 1.80 mg, 1.85 mg, 1.90 mg, 1.95 mg, 2.0 mg, 2.05 mg, 2.10 mg, 2.15 mg, 2.20 mg, 2.25 mg, 2.30 mg, 2.35 mg, 2.4 mg, 2.45 mg, 2.50 mg, 2.55 mg, 2.60 mg, 2.65 mg, 2.70 mg, 2.75 mg, 2.80 mg, 2.85 mg, 2.90 mg, 2.95 mg, 3.0 mg, 3.05 mg, 3.1 mg, 3.15 mg, 3.20 mg, 3.25 mg, 3.30 mg, 3.35 mg, 3.40 mg, 3.45 mg, 3.50 mg, 3.55 mg, 3.60 mg, 3.65 mg, 3.70 mg, 3.75 mg, 3.80 mg, 3.85 mg, 3.90 mg, 3.95 mg, 4.0 mg, 4.05 mg, 4.10 mg, 4.15 mg, 4.20 mg, 4.25 mg, 4.30 mg, 4.35 mg, 4.40 mg, 4.45 mg, 4.50 mg, 4.55 mg, 4.60 mg, 4.65 mg 4.70 mg, 4.75 mg, 4.80 mg, 4.85 mg, 4.90 mg, 4.95 mg or 5.0 mg of anatabine per cigarette. An advantage of an anatabine-enhanced very low nicotine cigarette is that this type of cigarette reduces withdrawal and craving of conventional cigarettes more effectively than very low nicotine cigarettes with filler comprising, for example, 0.0065 mg/g of anatabine. Anatabine-enhanced very low nicotine cigarettes are especially useful when used to assist smokers in transitioning to e-cigarettes or a tobacco heating device or to assist smokers in quitting tobacco use altogether.

It is important to note that these percentages and others herein which refer to the amount of nicotine, anatabine or anabasine contained in a cigarette (in milligrams) or in filler (in mg/g or as a percentage) are not perfectly correlated with the amount of these alkaloids in tobacco leaf contained in filler. Filler in cigarettes includes tobacco leaf in the form of cut-rag tobacco but almost always also includes non-tobacco components which do not contain any alkaloids, such as casing, flavorings and a portion of the components that reconstituted tobacco is made from. These non-tobacco portions of filler reduce the percentage of alkaloids, including nicotine, anatabine, anabasine and nornicotine in filler, as compared to the percentage of alkaloids of the tobacco leaf per se contained in filler (or whole tobacco leaf in which alkaloid levels are measured independently of filler or before tobacco leaf becomes part of the filler in a cigarette).

As used herein, an "anabasine-enhanced very low nicotine cigarette" means a cigarette containing 2.0 milligrams (mg) or less of nicotine and at least 0.10 mg of anabasine.

In some exemplary embodiments, an extrinsic source of anabasine may be utilized and added to the filler of said cigarette. This source may be plants including tobacco plants or plants in which the predominant alkaloid is anabasine such as *Nicotiana glauca, Nicotiana noctiflora, Nicotiana petunioides* and/or *Nicotiana debneyi* plants. The anabasine may be extracted by, for example, a supercritical $CO_2$ extraction process from any type of tobacco. In other exemplary embodiments, genetically engineered tobacco plants may be used in anabasine-enhanced very low nicotine cigarettes in which anabasine has been increased, as compared to a control plant. In either case, extrinsic anabasine or high anabasine plants may be included in reconstituted tobacco used in the filler of the anabasine-enhanced very low nicotine cigarette. The anabasine content may also be enhanced by anabasine salts of organic acids, anabasine analogs or synthesized anabasine. Each of these may also be incorporated into reconstituted tobacco used in the filler of the anabasine-enhanced very low nicotine cigarette. An anabasine-enhanced very low nicotine cigarette may contain at least the following per-cigarette anabasine contents: 0.10 mg, 0.12 mg, 0.14 mg, 0.16 mg 0.18 mg, 0.20 mg 0.22 mg, 0.24 mg 0.26 mg, 0.28, 0.30 mg, 0.32 mg. 0.34 mg, 0.36 mg 0.38 mg, 0.40 mg, 0.42 mg, 0.44 mg, 0.46 mg, 0.48 mg, 0.50 mg, 0.52 mg, 0.54 mg, 0.56 mg, 0.58 mg, 0.60 mg, 0.62 mg, 0.64 mg, 0.66 mg, 0.68 mg, 0.70 mg, 0.72 mg, 0.74 mg, 0.76 mg, 0.78 mg, 0.80 mg, 0.82 mg, 0.84 mg, 0.86 mg, 0.88 mg, 0.90 mg, 0.92 mg, 0.94 mg, 0.96 mg, 0.98 mg, 1.0 mg, 1.02 mg, 1.04 mg, 1.06 mg, 1.08 mg, 1.10 mg, 1.12 mg, 1.14 mg, 1.16 mg, 1.18 mg, 1.20 mg, 1.22 mg, 1.24 mg, 1.26 mg, 1.28 mg, 1.30 mg, 1.32 mg, 1.34 mg, 1.36 mg, 1.38 mg, 1.40 mg, 1.42 mg, 1.44 mg, 1.46 mg, 1.48 mg, 1.50 mg, 1.52 mg, 1.54 mg, 1.56 mg, 1.58 mg, 1.60 mg, 1.62 mg, 1.64 mg, 1.66 mg, 1.68 mg, 1.70 mg, 1.72 mg, 1.74 mg, 1.76 mg, 1.78 mg, 1.80 mg, 1.82 mg, 1.84 mg, 1.86 mg, 1.88 mg, 1.90 mg, 1.92 mg, 1.94 mg, 1.96 mg, 1.98 mg or 2.0 mg of anabasine per cigarette. An advantage of an anabasine-enhanced very low nicotine cigarette is that this cigarette reduces withdrawal and craving of conventional cigarettes more effectively than very low nicotine cigarettes with filler comprising, for example, 0.0135 mg/g of anabasine. Anabasine-enhanced very low nicotine cigarettes are especially useful when used to assist smokers in transitioning to e-cigarettes or a tobacco heating device or to assist smokers in quitting tobacco use altogether.

A *Nicotiana tabacum* plant variety or line can be crossed with a *Nicotiana* species in which the predominant alkaloid is anabasine (e.g., *N. glauca*). Backcrossing refers to the process in which a progeny plant is repeatedly crossed back to one of its parents. In this case, the 'donor' parent (*N. glauca*) refers to the parental plant with the desired gene or locus to be introgressed, which is high anabasine. The 'recipient' parent (may be an elite commercialized *N. tabacum* variety), which can be used one or more times, or 'recurrent' parent, which can be used two or more times, refers to the parental plant into which the gene or locus is being introgressed. The initial cross gives rise to the F1 generation and the second cross is the F2 generation and so on. The backcrossing in this example is performed repeatedly with a progeny individual of each successive backcross generation being itself backcrossed to the same parental genotype. In the above backcrossing scheme, enough generations are produced in order to achieve a tobacco line that is has a high anabasine content but has as many other desirable traits of typical cigarette tobacco, *N. tabacum*, as reasonably possible.

Very low nicotine cigarettes comprising an enhanced anatabine content and an enhanced anabasine content (i.e., "anatabine-enhanced and anabasine-enhanced very low nicotine cigarette") may contain, for example, approximately 1.0 milligram nicotine per cigarette, approximately 2.0 mg/g anatabine per cigarette and approximately 0.55 mg/g anabasine per cigarette. Assuming the filler of these very low nicotine cigarettes weighs 700 mg per cigarette, the filler of these cigarettes contains about 1.43 mg/g nicotine, about 2.86 mg/g anatabine, and about 0.79 mg/g anabasine. This anatabine-enhanced and anabasine-enhanced very low nicotine cigarette contains the nicotine of a very low nicotine cigarette in conjunction with an anatabine content of approximately a conventional cigarette and an anabasine content slightly higher than the upper range of a conventional cigarette. Anatabine-enhanced and anabasine-enhanced very low nicotine cigarettes are especially useful when used to assist smokers in transitioning to e-cigarettes or a tobacco heating device or to assist smokers in quitting tobacco use altogether. They may be more effective than an anatabine-enhanced very low nicotine cigarette or an anabasine-enhanced very low nicotine cigarette.

LAFC 53 which contains approximately a 90 percent nicotine reduction, as compared to its parent variety, NC 95, as described above, is an example of a preferred tobacco line used to produce improved low nicotine tobacco plant lines. As a bona fide flue-cured variety, NC 95 has been grown for decades and has been used in many commercial products. LAFC 53 is a tobacco line which has been naturally bred (nic1/nic2) from NC 95, and therefore is non-transgenic. Importantly, unlike other nic1/nic2 low nicotine lines such as LA Burley 21, LAFC 53 is a flue cured line. The filler of virtually all filtered cigarettes either only includes flue-cured cut-rag tobacco or flue-cured cut-rag tobacco is the predominant type of tobacco in the filler.

In one exemplary embodiment, LAFC 53 is genetically engineered in which the expression of putrescine methyltransferase (e.g., PMT1 or PMT2) is suppressed by any of the aforementioned methods. This may be accomplished by down-regulating PMT via antisense or RNAi technologies, both of which are well known in the art. For example, LAFC 53 is transformed with a binary *Agrobacterium* vector that carries the 2.0 kb NtQPT1 root cortex specific promoter (or any other suitable plant promoter) which drives the antisense expression of the NtPMT1 cDNA (or NtPMT2 cDNA). Three hundred independent transformants are allowed to self. Progeny of these plants (T1) are screened for segregation of the transgene. Progeny of two-thirds of the primary transformants segregate 3:1 (a single locus). The remaining one-third progeny segregate at ratios of 15:1 or higher (two or more loci). T1 progeny segregating 3:1 (resulting from transformation at a single locus) are advanced.

Nicotine and anatabine levels of T1 progeny segregating 3:1 are measured using Gas Chromatography. TI progeny that have less than 50% of the nicotine content of the LAFC 53 parent are allowed to self to produce T2 progeny. Homozygous T2 progeny are identified by selecting populations in which 100% of the progeny carried the transgene (heterozygous progeny segregate 3:1). Nicotine and anatabine levels in homozygous and heterozygous T2 progeny are measured using Gas Chromatography to confirm nicotine levels have less than 50% of the nicotine content of the LAFC 53 parent. Homozygous T2 progeny of transformants that also have the same or increased levels of anatabine, as compared to the LAFC 53 parent, are allowed to self, producing T3 progeny. T3 progeny are grown and nicotine and anatabine levels are again measured and confirmed. T3 progeny of the plant line with the lowest nicotine level and the highest anatabine level are allowed to self, producing T4 progeny. Samples of the bulked seeds of T4 progeny are grown and nicotine and anatabine are again measured and confirmed. This low-nicotine anatabine-enhanced tobacco line is renamed LN-HA. The LN-HA plant line is further field tested and compared to its NC 95 parent and another control.

In another exemplary embodiment, LAFC 53 is genetically engineered in which the expression of N-methylputrescine oxidase (SEQ ID NO: 7) is suppressed by any of the aforementioned methods. This may be accomplished by down-regulating MPO via antisense or RNAi technologies. For example, LAFC 53 is transformed with a binary *Agrobacterium* vector that carries the 2.0 kb NtQPT1 root cortex specific promoter (or any other suitable plant promoter) which drives the antisense expression of the NtMPO cDNA. Three hundred independent transformants are allowed to self, and the remainder of the process for these MPO down-regulated transformants is exactly the same as the aforementioned methodology for PMT down-regulation and the like known in the art.

In another exemplary embodiment, one or more of the genes in the PMT gene family (e.g., PMT1, SEQ ID NO:5) is knocked out of plants belonging to an elite, conventional-nicotine-content, flue-cured tobacco variety. Considerable progress has been made in targeting proteins to specific DNA sequences in the genomes of live cells. Zinc fingers, TALENS, and CRISPR/CAS9 proteins or protein/RNA complexes are experimentally amenable to changes in their amino acid sequences or RNA targeting sequences to facilitate their binding to specific DNA sequences. For example, and as known in the art, CRISPRs (clustered regularly interspaced short palindromic repeats) are DNA loci containing short repetitions of base sequences that are present within prokaryotes and function as a primitive immune system, cleaving foreign DNA (from invading viruses). CRISPRs are now used as gene editing tools in many eukaryotic systems, including plant systems such as models *Arabidopsis* and *Nicotiana*. When paired with the Cas9 nuclease, CRISPRs can cleave genomic DNA in a site-specific manner, thus knocking out gene expression. Guide RNAs (gRNA or sgRNA) are designed to a specific genomic sequence, thus directing Cas9 to knockout the gene. Predictive software exists for designing gRNA designs, and for plants, gRNAs are typically expressed from U6 or U3 promoters, such as the wheat U6 promoter; the rice U3 promoter; the maize U3 promoter; or the *Arabidopsis* or rice U6 promoters. For a recent review in plants, see Bortesi and Fischer, 2015, *Biotechnology Advances* 33(10): 41-52. In this regard, and as known in the art, an *Agrobacterium* transformation vector may be constructed having gRNAs specific for knocking out any of the PMT gene family members, PMT1, PMT2, PMT3, and PMT4, in a recipient transformed *Nicotiana* plant. See, e.g., Nekrasov V, Staskawicz B, Weigel D, Jones J D, Kamoun S. Targeted mutagenesis in the model plant *Nicotiana benthamiana* using Cas9 RNA-guided endonuclease. *Nat Biotechnol.* 2013 August; 31(8):691-3.

In another exemplary embodiment, MPO and one or more BBL genes are knocked out of tobacco lines belonging to elite, flue-cured, burley or Oriental tobacco varieties with, for example, the CRISPR-cas9 system. Similar to the use of CRISPR/CAS9 system described above for suppressing PMT gene expression, the system may be used for suppressing MPO and/or one or more BBL genes. That is, and as known in the art, an *Agrobacterium* transformation vector may be constructed having gRNAs specific for knocking out MPO and/or one or more BBL genes, again using a plant U6 or U3 promoter, in a recipient transformed *Nicotiana* plant. The resulting plant lines have reduced MPO and one or more BBL genes, contain the targeted balance of nicotine and anatabine, and are then utilized for anatabine-enhanced very low nicotine cigarettes which are improvements over very low nicotine cigarettes without enhanced levels of anatabine. For example, plant lines which contain approximately 2 mg/g nicotine and 2 mg/g of anatabine may be included in very low nicotine cigarettes used for transitioning smokers to a tobacco heating product or for quitting tobacco products altogether.

In another embodiment, NBB1 and MPO may be reduced concurrently in a single plant line to produce tobacco having reduced nicotine and enhanced anatabine. Suitable tobacco plants include elite, flue-cured, burley or Oriental tobacco varieties, each of which can be genetically manipulated using technology known in the art. For example, and in no way limiting, an *Agrobacterium* transformation vector may be constructed having gRNAs specific for knocking out any NBB1 and MPO in single, recipient transformed *Nicotiana* plant. Tobacco plants are selected that have reduced nicotine (compared to a control plant) and enhanced anatabine (compared to a low nicotine control plant) for use in producing tobacco products, such as very low nicotine cigarettes used for transitioning smokers to a tobacco heating product or for quitting tobacco products altogether.

Similarly, NBB1 and MPO may be suppressed separately in independent plant lines, and then the resultant cured tobacco may be blended for use in tobacco products. For example, in one plant line, an *Agrobacterium* transformation vector may be constructed having a gRNA specific for knocking out NBB1 in a recipient transformed *Nicotiana* plant. In a separate plant line, MPO can be suppressed, for example, using an *Agrobacterium* transformation vector with a gRNA specific for knocking out MPO. Following selection of a first plant line having suppressed NBB1 (characterized by reduced nicotine compared to a control plant) and selection of a second plant line having suppressed MPO (characterized by reduced nicotine and enhanced anatabine compared to a control plant), cured tobacco from each plant line may be blended together for use in a tobacco product, such as a very low nicotine cigarettes used for transitioning smokers to a tobacco heating product or for quitting tobacco products altogether.

Cured tobacco from these anatabine-enhanced tobacco plant lines (which may be registered for plant variety protection) in which one or more of the following has been knocked out: PMT, ODC, and/or MPO, may be utilized directly in the filler of anatabine-enhanced very low nicotine cigarettes or the anatabine may be extracted from these tobacco types (e.g., by a supercritical CO2 extraction process) and incorporated into reconstituted tobacco which in turn is incorporated into anatabine-enhanced very low nicotine cigarettes. Additional exemplary embodiments include filler that is precisely blended to achieve targeted levels of very low nicotine and targeted levels of enhanced anatabine and/or anabasine. Filler of an anatabine-enhanced and anabasine-enhanced very low nicotine cigarette comprising targeted levels of nicotine, anatabine and anabasine of 1 mg/g, 2 mg/g, and 1/mg/g, respectively, may be fabricated by adjusting the alkaloid content of the reconstituted tobacco based on the alkaloid content of the tobacco that is on hand. For the filler of a cigarette which is 60 percent flue cured tobacco, 20 percent burley tobacco, and 20 percent reconstituted tobacco, the nicotine, anatabine and anabasine content of the reconstituted tobacco is adjusted based on the alkaloid content of the flue cured and burley tobacco. With a flue cured tobacco that has a nicotine content of 0.4 mg/g, an anatabine content of 0.02 mg/g and an anabasine content of 0.05 mg/g and a burley tobacco that has a nicotine content of 1.8 mg/g, an anatabine content of 5 mg/g and an anabasine content of 0.10 mg/g, the reconstituted tobacco is fabricated with 2 mg/g nicotine, 4.94 mg/g anatabine and 4.75 mg/g anabasine. By blending the 60 percent flue cured tobacco, 20 percent burley tobacco, and 20 percent of the incrementally adjusted reconstituted tobacco, the final filler has a nicotine, anatabine and anabasine content of 1 mg/g, 2 mg/g, and 1/mg/g, respectively, precisely hitting the alkaloid targets. The weight of the casing and top flavoring of the filler was not considered in this example for illustrative purposes but this is easily adjusted for by increasing the nicotine, anatabine and anabasine levels in the reconstituted tobacco by amounts to make up for the weight of these non-tobacco components.

Using this method of blending and adjusting the nicotine, anatabine and anabasine levels of the reconstituted tobacco based on the alkaloid content of the tobacco varieties on hand, accordingly, virtually any desired nicotine, anatabine and anabasine level can be achieved in a cigarette. Nicotine, anatabine and anabasine levels in cigarettes will no longer vary based due to the year-to-year variability of the tobacco harvested and on hand. Precisely blended filler from this method can be incorporated into anatabine-enhanced very low nicotine cigarettes, anabasine-enhanced very low nicotine cigarettes, or anatabine-enhanced and anabasine-enhanced very low nicotine cigarettes and may be included in transition kits of tobacco products to assist smokers switching to e-cigarettes or a tobacco heating device or for quitting tobacco use altogether. These types of very low nicotine cigarettes reduce withdrawal and craving of conventional cigarettes more effectively than typical very low nicotine cigarettes which have extremely low anatabine levels and extremely low anabasine levels.

8. Example 5

Very Low Nicotine Cigarettes Comprising Cannabinoids or THC-Free *Cannabis*

Another exemplary embodiment of the present invention is to include very low THC *Cannabis sativa* in the filler of very low nicotine cigarettes which may be utilized for any method of facilitating smokers to switch to e-cigarettes or a tobacco heating product or to quit tobacco products altogether. Very low THC *cannabis* (as defined below) does not contain significant levels of Δ9-tetrahydrocannabinol (THC). The species *Cannabis sativa* includes both marijuana and hemp. "*Cannabis*" as used herein includes *C. indica* and *C. ruderalis* which are sometimes considered as separate species of *C. sativa* but herein are considered types of *C. sativa* and not separate species. Hemp is genetically more similar to the indica type of marijuana than to *sativa* strains. Cannabinoids are the group of more than 100 natural chemical compounds that mainly accumulate in female flowers (known as, buds) of *cannabis* plants. They act on cannabinoid receptors in cells that alter neurotransmitter release in the brain. THC is one of the dozens of cannabinoids present in *cannabis* plants. Even though very low nicotine cigarettes containing very low THC *cannabis* do not contain any significant amount of THC, they do contain other cannabinoids, including cannabidiol (CBD) which shows benefits in treating anxiety and depression. When smokers cease smoking conventional cigarettes their levels of anxiety and depression usually increase; therefore, very low nicotine cigarettes containing very low THC *cannabis* is beneficial in assisting smokers to switch to e-cigarettes or a tobacco heating device or to quit tobacco use altogether. The smoke from very low nicotine cigarettes also containing non-THC cannabinoids is an improvement over smoke from very low nicotine cigarettes without cannabinoids. The greater period of time smokers are able to exclusively smoke very low nicotine cigarettes after time point zero during the transitional period of the methods herein (while not smoking any conventional cigarettes), the greater probability of switching to e-cigarettes or a tobacco heating product or quitting tobacco altogether.

The psychoactive effects of THC are primarily mediated by the activation of cannabinoid receptors located throughout the body and are part of the endocannabinoid system, which is involved in a variety of physiological processes such as mood and appetite. Utilizing *cannabis*, whether marijuana stains (which contain higher levels of THC) or hemp strains or varieties (which contain lower THC levels since hemp has been bred for seed and biomass yield rather than THC), is problematic to include in very low nicotine cigarettes to assist smokers in switching to e-cigarettes or a tobacco heating device or to assist smokers in quitting tobacco altogether since the psychoactive effects of THC would interfere with the daily lives of smokers in that their physical and mental control would be diminished. For example, a smoker attempting to switch to e-cigarettes or a tobacco heating device would not be able to smoke very low nicotine cigarettes containing significant levels of THC during a lunch break while at work without becoming intoxicated and therefore may not be able to function normally upon returning to work and may become a danger to coworkers. Moreover, employees may fail drug tests if their very low nicotine cigarettes include *cannabis* containing THC. Therefore, it is not only useful and advantageous, but a necessity, to include very low THC *cannabis* (and not conventional *cannabis*) in very low nicotine cigarettes (for a subgroup of the smoking population) which prevents the significant psychoactive effects of THC while retaining the benefits of the other cannabinoids.

As used herein, "very low THC *cannabis*" means (i) flowers of a female *cannabis* plant, whether or not genetically engineered, which contain equal to or less than approximately 1.25 mg/g of Δ9-tetrahydrocannabinolic acid (THCA) and Δ9-tetrahydrocannabinol (THC), collectively, (ii) the other parts (besides the flowers) of a female *cannabis* plant (e.g., leaves) which contain equal to or less than approximately 1.25 mg/g of Δ9-tetrahydrocannabinolic acid (THCA) and Δ9-tetrahydrocannabinol (THC), collectively, and/or (iii) all parts of a male *cannabis* plant which contain equal to or less than approximately 1.25 mg/g of Δ9-tetrahydrocannabinolic acid (THCA) and Δ9-tetrahydrocannabinol (THC), collectively. High performance liquid chromatography tandem mass spectrometry (HPLC-MS/MS) may be utilized for measuring THCA and THC content. See, Aizpurua-Olaizola et al. 2014, *Anal Bioanal Chem* (2014) 406:7549-7560. The aforementioned methods of measuring nicotine content may also be utilized for measuring THCA and THC content. For example, both gas chromatography and high-performance liquid chromatography are routinely used in the art for measuring THCA and THC content. See, e.g., Mudge E. et al. 2017, *Analytical and Bioanalytical Chemistry*, 409(12) 3153-3163; Patel et al. 2017, J. Pharm Biomed Anal. November 30: 146:15-23. THC is the only plant cannabinoid known to have clear intoxicating effects on its own. THCV may also have intoxicating effects, although it is present in very small quantities in *cannabis* strains and varieties and in low doses is believed not to be intoxicating. Down-regulating the expression of genes responsible for the production of enzymes in the cannabinoid biosynthetic pathway by genetic engineering reduces THC and THCV.

The cannabinoid biosynthetic pathway in *Cannabis sativa* is understood and genetic engineering is an efficient method of producing *cannabis* plants with no THC or trace levels of THC. Cannabigerolic acid (CBGA) is the precursor to the three main cannabinoid lines: tetrahydrocannabinolic acid (THCA), cannabidiolic acid (CBDA) and cannabichromenic acid (CBCA). During decarboxylation, which occurs during drying and curing of the plant material prior to use and/or upon the application of heat (e.g., smoking) to the cannabinoid acid, each of the following 8 cannabinoid acids: CBGA (Cannabigerolic acid), THCA (Δ9-tetrahydrocannabinolic acid), CBDA (Cannabidiolic acid), CBCA (Cannabichromenenic acid), CBGVA (Cannabigerovarinic acid), THCVA (Tetrahydrocanabivarinic acid), CBDVA (Cannabidivarinic acid) and CBCVA (Cannabichromevarinic acid), converts to and yields the following corresponding 8 cannabinoid compounds: CBG (Cannabigerol), THC (Δ9-tetrahydrocannabinol), CBD (Cannabidiol), CBC (Cannabichromene), CBGV (Cannabigerivarin), THCV (Tetrahydrocannabivarin), CBDV (Cannabidivarin) and CBCV (Cannabichromevarin). As *cannabis* cures and moisture is reduced, the cannabinoid compounds in their acidic form mature and are slowly converted into related compounds (e.g., THCA to THC). Curing *cannabis* over time only causes partial decarboxylation to occur, which is the reason *cannabis* flowers generally test positive, for example, for both THCA and THC (designated herein as THCA/THC). Smoking or vaporizing *cannabis* will instantaneously decarboxylate cannabinoids due to the high temperatures present, making them instantly available for absorption through inhalation.

Utilizing genetic engineering to produce very low THC *cannabis* plants includes any method of introducing a nucleic acid or specific mutation into a host organism which decreases or increases the expression or function of a gene product of interest (i.e., the target gene product). For example, a plant is genetically engineered when it is transformed with a polynucleotide sequence that suppresses expression of a target gene such that expression of the target gene is reduced compared to a control plant. Any enzyme or combination of enzymes involved in the cannabinoid biosynthetic pathway can be a target to reduce THCA for the production of a very low THC *cannabis* plant. For example, down-regulating the expression or activity of one or more genes encoding a product selected from the group consisting of Acyl activating enzyme (nucleotide sequence set forth in SEQ ID NO: 13 and the amino acid sequence in set forth in SEQ ID NO: 14), Olivetol synthase (nucleotide sequence set forth in SEQ ID NO: 15 and the amino acid sequence in set forth in SEQ ID NO: 16), Olivetolic acid cyclase (nucleotide sequence set forth in SEQ ID NO: 17 and the amino acid sequence in set forth in SEQ ID NO: 18, Aromatic prenyltransferase (nucleotide sequence set forth in SEQ ID NO: 19 and the amino acid sequence in set forth in SEQ ID NO: 20), Cannabigerolic acid synthase (CBGAS), Tetrahydrocannabinolic acid synthase (THCAS) (nucleotide sequence set forth in SEQ ID NO: 21 and the amino acid sequence in set forth in SEQ ID NO: 22), Cannabidiolic acid synthase (CBDAS) (nucleotide sequence set forth in SEQ ID NO: 23 and the amino acid sequence in set forth in SEQ ID NO: 24), Cannabichromenic acid synthase (CBCAS) (nucleotide sequence set forth in SEQ ID NO: 25 and the amino acid sequence in set forth in SEQ ID NO: 26) may be utilized for very low THC *cannabis*. A genetically engineered plant characterized by reduced THCA, as compared to a control plant, is referred to herein as a reduced THCA *cannabis* plant. These plants may be utilized to provide very low THC *cannabis* flowers for use in very low nicotine cigarettes to assist in switching smokers to e-cigarettes or a tobacco heating device or quitting tobacco altogether.

Any suitable genetic engineering method known in the art can be utilized for production of very low THC *cannabis* plants, including sense suppression, sense co-suppression, antisense suppression, RNAi suppression, double-stranded RNA (dsRNA) interference, hairpin RNA interference and intron-containing hairpin RNA interference, ribozymes, amplicon-mediated interference, small interfering RNA, artificial trans-acting siRNA, artificial or synthetic microRNA, knock out approaches, random mutagenesis and targeted mutagenesis approaches. Non-transgenic approaches of providing very low THC *cannabis* plants are preferred for use in very low nicotine cigarettes, include utilizing random mutagenesis approaches or via precise genome engineering technologies, for example, transcription activator-like effector nucleases (TALENs), meganuclease, zinc finger nuclease, and CRISPR-cas9 system. See for example, Gaj et al. 2013, *Trends in Biotechnology*, 31(7): 397-405 and Bomgardner Melody M, 2017 Chemical & Engineering News, Vol. 95, Issue 24: 30-34.

Any enzyme involved in the cannabinoid biosynthetic pathway may be a target for reducing THC in *cannabis* plants. One or more nucleic acids that encode one or more enzymes in the cannabinoid biosynthetic pathway include the following cannabinoid biosynthesis enzymes (polypeptides): Hexanoyl-CoA synthetase (See U.S. Pat. No. 9,546,362), Acyl activating enzyme (SEQ ID NO: 14, See, Stout et al. 2012, *Plant J*; 71:353-65), Olivetol synthase (SEQ ID NO: 16, See, Taura et al. 2009, *FEBS Lett*; 583: 2061-6), Olivetolic acid cyclase (SEQ ID NO: 18, See, Gagne et al. 2012, *P Natl Acad Sci USA*; 109: 12811-6), Aromatic prenyltransferase (SEQ ID NO: 20, See, U.S. Pat. No. 8,884,100), Cannabigerolic acid synthase (See, Fellermeier and Zenk 1998, FEBS Lett; 427:283-5), Tetrahydrocannabinolic acid synthase (SEQ ID NO: 22, See, Sirikantaramas et al. 2004, *J Biol Chem*; 279:39767-74), Cannabidiolic acid synthase (SEQ ID NO: 24, See, Taura et al. 2007, *FEBS Lett*; 581: 2929-34.), Cannabichromenic acid synthase (SEQ ID NO: 26, See international patent publication no. WO/2015/196275). The foregoing patents, patent application and other references, including the polynucleotides and their sequences and polypeptides and their amino acid sequences, are incorporated herein by reference in their entirety. See, Carvalho et al. 2017. *FEMS Yeast Research*, Vol. 17, No. 4, 1-12.

There's usually an inverse relationship between THC and CBD across *cannabis* strains and varieties; the higher the THCA/THC content, the lower the CBDA/CBD content, and the higher the CBDA/CBD content, the lower the THCA/THC content. CBDA/CBD is generally the most abundant cannabinoid combination in hemp stains or varieties. The most abundant cannabinoid combination in most marihuana stains is THCA/THC, either of which on average can be approximately between 10 and 20 percent of the weight of the *cannabis* flower. While THCA is the more accurate label for *cannabis* flower that has not been decarboxylated, THCA or THC essentially means the same thing if the flower is going to be smoked, vaporized or heated in some way since heat further converts the remaining THCA to THC.

As used herein and relating to *cannabis*, "down-regulation" or "suppression" are synonymous and mean that expression of a particular gene sequence or variant thereof or nucleotide fragment of at least 15 nucleotides of the gene sequence, in a *cannabis* plant, including all progeny plants derived thereof, has been reduced, as compared to a control plant when grown in similar growth conditions, wherein the control plant shares an essentially identical genetic background with the *cannabis* plant except for the reduced THCV/THC alteration in the *cannabis* plant and any related incidental effects.

As used herein, "reconstituted *cannabis* sheet" means a *cannabis* sheet produced in the same fashion as reconstituted tobacco sheet in which *cannabis* flowers, leaves, dust, stems and/or by-products that have been previously finely ground are then rolled or casted and mixed with a cohesive agent or binder and may include humectants, flavors, preservatives, and/or additional cannabinoids or additional terpenes. Reconstituted *cannabis* sheet does not need to include any tobacco portions (tobacco and nicotine free) and is easily made into reconstituted sheets like reconstituted tobacco. The *cannabis* portion of the reconstituted *cannabis* sheet may be from approximately 70 percent to approximately 90 percent *cannabis*, the remainder may be the cohesive agent or binder, humectants, flavors, preservatives, and/or additional cannabinoids or additional terpenes. Once fabricated, reconstituted *cannabis* sheet is cut in a similar fashion as whole leaf tobacco and the "reconstituted *cannabis*" may be included in the filler of a cigarette. Alternatively, it may be made commercially available by itself.

As used herein, "reconstituted tobacco and *cannabis* sheet" means a sheet produced in the same fashion as reconstituted tobacco sheet in which tobacco dust, stems and/or by-products and *cannabis* flowers, leaves, dust, stems and/or by-products (both that have been previously finely ground) are then rolled or casted and mixed together with a cohesive agent or binder and may include humectants, flavors, preservatives, and/or additional cannabinoids or additional terpenes. Once fabricated, reconstituted tobacco and *cannabis* sheet is cut in a similar fashion as whole leaf tobacco and the "reconstituted tobacco and *cannabis*" may be included in the filler of a cigarette. Alternatively, it may be made commercially available by itself. The tobacco and *cannabis* portions of the reconstituted tobacco and *cannabis* sheet may be from approximately 70 to approximately 90 percent tobacco and *cannabis*, cumulatively, the remainder 10 to 30 percent may be the cohesive agent or binder, humectants, flavors, preservatives, and/or additional cannabinoids or additional terpenes. Reconstituted tobacco and *cannabis* sheet may have any ratio of tobacco to *cannabis* such as from 99 percent tobacco to 1 percent *cannabis* all the way to 99 percent *cannabis* to 1 percent tobacco.

Very low nicotine cigarettes may be specifically designed with targeted levels of nicotine and targeted levels of very low THC *cannabis*. For example, the filler in very low nicotine cigarettes may be precisely blended and comprise 82% low nicotine tobacco and 18% very low THC *cannabis*. The *cannabis* portion of a very low nicotine cigarette may be directly added to the filler or may be included in reconstituted *cannabis* sheet or reconstituted tobacco and *cannabis* sheet. Including *cannabis* in either type of reconstituted sheet facilitates precisely blending the cigarettes with the exact desired ratio of *cannabis* to low nicotine tobacco and/or the exact desired ratio of nicotine to one or more cannabinoids (e.g., CBD). Further, this method also improves the cigarette making process since *cannabis* flowers or leaves, whether whole, cut or ground, do not have the shape and form to efficiently pass through automated cigarette rolling machines (and fill cigarettes) without some retooling of these machines. Reconstituted *cannabis* sheet or reconstituted tobacco and *cannabis* sheet, which may include very low THC *cannabis* or any type of *cannabis*, is made in large sheets (similar to paper) and then may be cut to the exact or similar size and elongated shape as tobacco cut-rag and for this reason is now easily included in cigarettes by automated cigarette rolling machines.

Reconstituted *cannabis* is easily blended with low nicotine reconstituted tobacco and low nicotine cut-rag tobacco as three separate fractions of a filler. Producing reconstituted *cannabis* separately (tobacco and nicotine free), whether or not very low THC, has distinct advantages over mixing tobacco portions and *cannabis* portions into the same reconstituted sheet. These include that the reconstituted sheet is capable of much higher percentages of *cannabis* since there is no tobacco portion in the sheet, and reconstituted *cannabis* can also function to dilute the nicotine content of a type of very low nicotine cigarettes since reconstituted *cannabis* (whether or not very low THC) contains absolutely zero nicotine. For example, if the target of filler for a type of very low nicotine cigarette is 0.3 mg/g nicotine and only 0.4 mg/g nicotine tobacco is available, blending nicotine-free reconstituted *cannabis* at a rate of 25% with 75% low nicotine cut-rag tobacco will yield filler with a nicotine content of 0.30 mg/g nicotine. Since *cannabis* is one of the earliest plants to be cultivated and has been consumed by humans for millennia, it has a well-known safety profile. In addition to the advantages of containing non-THC cannabinoids, very low THC *cannabis* is the ideal non-tobacco/non-nicotine plant for blending with tobacco and smoking whether the very low THC *cannabis* is reconstituted into sheet or used directly in the filler of cigarettes.

Although the *cannabis* flower (bud) contains the vast majority of the cannabinoids in the female *cannabis* plant, *cannabis* leaves and/or stems may also be used in reconstituted *cannabis* sheet and reconstituted tobacco and *cannabis* sheet. The leaves may be dried until the chlorophyll is sufficiently reduced. The plant material is first ground into a powder consistency between approximately 100 mesh and approximately 400 mesh before introduced into a reconstituted sheet process, many of which are known in the art. The reconstituted *cannabis* or reconstituted tobacco and *cannabis* may be incorporated in the filler of cigarettes and either the reconstituted *cannabis* or reconstituted tobacco and *cannabis* may be very low THC *cannabis* or may be *cannabis* with high levels of THC. The filler of a conventional cigarette or of a very low nicotine cigarette may contain any percentage of reconstituted *cannabis* or reconstituted tobacco and *cannabis* including the following exemplary percentages of reconstituted *cannabis* or reconstituted tobacco and *cannabis*: 1%, 2%, 5%, 10%, 15%, 20%, 25%, 30%, 35%, 40%, 45%, 50%, 55%, 60%, 65%, 70%, 75%, 80%, 85%, 90%, 95% or 100% (percentages are in terms of weight).

In another exemplary embodiment, extrinsic extracted cannabinoids or cannabinoids produced outside a *cannabis* plant (e.g., CBD/CBDA) may be included in reconstituted tobacco, reconstituted tobacco/*cannabis*, or reconstituted *cannabis*. This allows for exact cannabinoid content and profiles (i.e., ratio between two individual cannabinoids or ratio among more than 2 individual cannabinoids) of individual cannabinoids in any reconstituted sheet. For example, low nicotine reconstituted tobacco may include CBD/CBDA and CBC/CBCA and have a (CBD/CBDA)/(CBC/CBCA) ratio of 10/1, and the source of these cannabinoids may either be extracted from *cannabis* or synthesized. See, e.g., U.S. Pat. No. 9,587,212. Very low nicotine cigarettes, tobacco sticks, reconstituted tobacco, and e-cigarettes may comprise at least 1.0 mg, 1.1 mg, 1.2 mg, 1.3 mg, 1.4 mg, 1.5 mg, 1.6 mg, 1.7 mg 1.8 mg, 1.9 mg, 2.0 mg, 2.1 mg, 2.2 mg, 2.3 mg, 2.4 mg, 2.5 mg, 2.6 mg, 2.7 mg, 2.8 mg, 2.9 mg, 3.0 mg, 3.1 mg, 3.2 mg, 3.3 mg, 3.4 mg, 3.5 mg, 3.6 mg, 3.7 mg, 3.8 mg, 3.9 mg, 4.0 mg, 4.1 mg, 4.2 mg, 4.3 mg, 4.4 mg, 4.5 mg, 4.6 mg, 4.7 mg, 4.8 mg, 4.9 mg, 5.0 mg, 5.1 mg, 5.2 mg, 5.3 mg, 5.4 mg, 5.5 mg, 5.6 mg, 5.7 mg, 5.8 mg, 5.9 mg, 6.0 mg 6.1 mg, 6.2 mg, 6.3 mg, 6.4 mg, 6.5 mg, 6.6 mg, 6.7 mg, 6.8 mg, 6.9 mg, 7.0 mg, 7.1 mg, 7.2 mg, 7.3 mg, 7.4 mg, 7.5 mg, 7.6 mg, 7.7 mg, 7.8 mg, 7.9 mg, 8.0 mg, 8.1 mg, 8.2 mg, 8.3 mg, 8.4 mg, 8.5 mg, 8.6 mg, 8.7 mg, 8.8 mg, 8.9 mg or 9.0 mg of cannabinoids.

Down-regulating the expression of Tetrahydrocannabinolic acid synthase (THCAS) is utilized to provide very low THC *cannabis* for use in very low nicotine cigarettes. Employing the CRISPR-cas9 system as previously described, THCAS is suppressed on a hemp variety (e.g., Cherry Wine), which its female flowers contain a high amount of CBDA and a low amount of THCA. A *cannabis* plant having genetically engineered suppression of THCAS and reduced content of THCA/THC may be used in very low nicotine cigarettes, e-cigarettes and tobacco heating products to assist in transitioning smokers away from conventional cigarettes. See, Sirikantaramas et al. 2004, *J. Biol. Chem.* 279 (38), 39767-39774. While any known system for suppressing gene expression may be used, one of ordinary skill in the art could use a CRISPR/CAS9 system, as described herein for suppressing gene expression. An *Agrobacterium* transformation vector may be constructed having gRNAs specific for knocking out THCAS, using a suitable plant promoter such as a plant U6 or U3 promoter, in a recipient transformed hemp plant, such as the hemp variety, Cherry Wine.

Regardless of the breeding or genetic engineering method, a *cannabis* plant, or part thereof, is provided, wherein the level of THCA/THC in the *cannabis* plant is reduced to below 1%, below 2%, below 5%, below 8%, below 10%, below 12%, below 15%, below 20%, below 25%, below 30%, below 40%, below 50%, below 60%, below 70%, or below 75% of the THCA/THC of a control plant when grown in similar growth conditions, wherein the control plant shares an essentially identical genetic background with the *cannabis* plant except for the reduced THCA/THC alteration and any related incidental effects. The genetically engineered plant is referred to herein as a THCA/THC reduced *cannabis* plant.

In another embodiment, the present disclosure provides methodology for reducing Δ9-tetrahydrocannabinolic acid (THCA/THC) in a *cannabis* plant and utilizing said plant in very low nicotine cigarettes for assisting smokers to switch to e-cigarettes or a tobacco heating product or to quit tobacco use altogether. A THCA/THC reduced *cannabis* plant also finds uses in any type of tobacco or *cannabis* formulation or product such as e-cigarettes, conventional cigarettes, and tobacco sticks or tobacco heating rods. As known in the art, any methodology for reducing gene expression may be used, such as but not limited to antisense technology, RNA interference (RNAi), ribozymes, CRISPR technology, and microRNAs (miRNAs).

Any very low nicotine cigarette, conventional cigarette, e-cigarette, tobacco stick or tobacco heating rod may each contain at least the following very-low-THC *cannabis* amounts: 2 mg, 3 mg, 5 mg, 10 mg, 20 mg, 40 mg, 60 mg, 80 mg, 100 mg, 120 mg, 140 mg, 160 mg, 180 mg, 200 mg, 220 mg, 240 mg, 260 mg, 280 mg, 300 mg, 320 mg, 340 mg, 360 mg 380 mg, 400 mg, 420 mg, 440 mg, 460 mg, 480 mg, 500 mg, 520 mg, 540 mg, 560 mg, 580 mg, 600 mg, 620 mg, 640 mg, 660 mg, 680 mg, 700 mg, 720 mg, 740 mg, 760 mg, 780 mg, 800 mg, 820 mg, 840 mg, 860 mg, 880 mg, 900 mg, 920 mg, 940 mg, 960 mg, 980 mg, 1000 mg, 1.020 g, 1.040 g, 1.060 g, 1.080 g, 1.100 g, 1.120 g or 1.140 g. These tobacco products, including conventional cigarettes that contain more than 2 mg of nicotine (e.g., 3 mg nicotine), may be used for transitioning smokers away from typical nicotine-content conventional cigarettes such as those in FIG. 2. Any *cannabis* plant part such as flowers or leaves may be included in these tobacco products and other tobacco products. The above *cannabis* amounts, 2 mg though 1.140 g, may also be in the form of reconstituted *cannabis* (including the non-*cannabis* fractions of any reconstituted *cannabis* process) or reconstituted tobacco and *cannabis* (including the non-*cannabis* and non-tobacco fractions of any reconstituted tobacco and *cannabis*). Reconstituted tobacco, reconstituted *cannabis*, or reconstituted tobacco and *cannabis* may include extracted cannabinoids or synthetic cannabinoids produced outside of a *cannabis* plant (e.g., CBD).

Δ9-tetrahydrocannabinolic acid (THCA) can be reduced in a *cannabis* plant by suppressing expression of Tetrahydrocannabinolic acid synthase (THCAS) in the plant as well as suppressing at least one additional cannabinoid biosynthesis enzyme. THCAS, as set forth in SEQ ID NO: 21, and one or more cannabinoid biosynthesis genes (SEQ ID NOS: 13, 15, 17, 19, 21, 23, 25) may be suppressed concurrently in a single plant line to produce *cannabis* with reduced THCA/THC. In addition, THCAS and Cannabigerolic acid synthase (CBGAS) may be concurrently suppressed in *cannabis* plants along with suppression of at least one additional cannabinoid biosynthesis enzyme selected from the following group: Acyl activating enzyme, Olivetol synthase, Olivetolic acid cyclase, Aromatic prenyltransferase, Tetrahydrocannabinolic acid synthase, Cannabidiolic acid synthase (CBDAS) and Cannabichromenic acid synthase (CBCAS). Any suitable method of plant genetic engineering may be used, as known in the art.

Suitable *cannabis* plants can be any elite *Cannabis sativa* strain or variety, each of which can be genetically manipulated using technology known in the art. For example, and in no way limiting, an *Agrobacterium* transformation vector may be constructed having gRNAs specific for knocking out THCAS and another cannabinoid biosynthesis gene in single, recipient transformed *Cannabis sativa* plant. *Cannabis* plants are selected that have reduced THCA/THC (compared to a control plant) for use tobacco or nicotine products, such as very low nicotine cigarettes used for transitioning smokers to e-cigarettes or a tobacco heating product, to reduce a smoker's nicotine exposure or for quitting tobacco products altogether. Very low THCA/THC *cannabis* plant parts (e.g., cannabinoids) may also be incorporated into the e-liquid of e-cigarettes or the tobacco in a tobacco stick of a tobacco heating product.

Similarly, expression of THCAS and another cannabinoid biosynthesis gene may be suppressed separately in independent plant lines, and then the resultant *cannabis* may be blended together for use in tobacco products. For example, in one plant line, an *Agrobacterium* transformation vector may be constructed having a gRNA specific for knocking out THCAS in a recipient transformed *Cannabis sativa* plant. In a separate plant line, another cannabinoid biosynthesis gene can be suppressed, including any of the aforementioned cannabinoid biosynthesis genes, for example, using an *Agrobacterium* transformation vector with a gRNA specific for knocking out this gene. Following selection of a first plant line having suppressed THCAS (characterized by reduced THCA/THC compared to a control plant) and selection of a second plant line having suppressed activity (characterized by low THCA/THC compared to a control plant), *cannabis* buds from each plant line may be blended together for use in a tobacco product, such as a very low nicotine cigarettes used for transitioning smokers to a tobacco heating product, reducing nicotine exposure, or for quitting tobacco products altogether. These buds of other plant parts may be incorporated into reconstituted *cannabis* or reconstituted tobacco and *cannabis*.

9. Example 6

Figure 6:
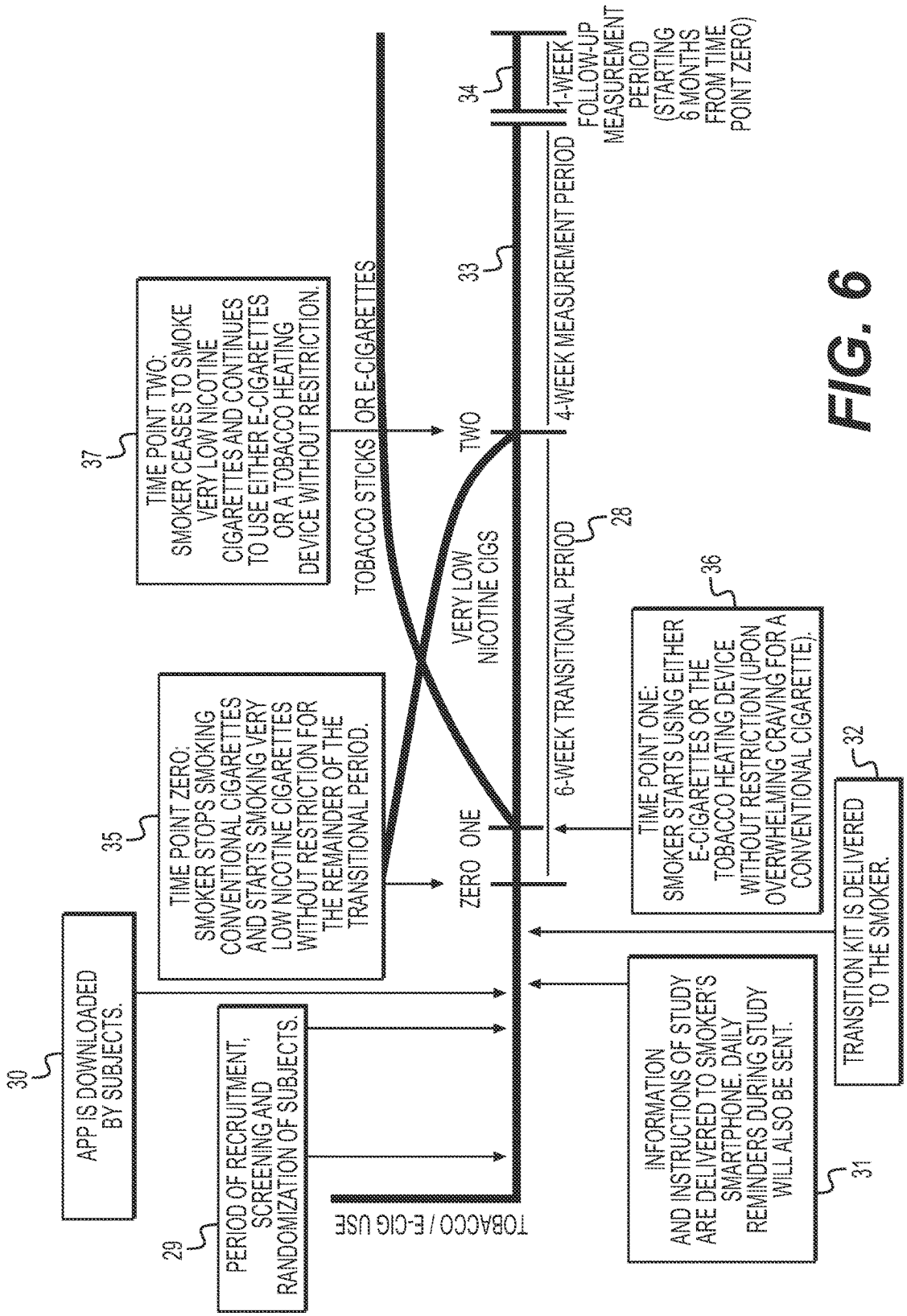
FIG. 6 is a diagram illustrating a clinical trial protocol of transitioning cigarette smokers to e-cigarettes or a tobacco heating device, according to the method of FIG. 1.

Method A clinical trial protocol evaluating very low nicotine cigarettes with and without very low THC *cannabis* to facilitate switching to IQOS® heating system or to JUUL® e-cigarettes FIG. 6 is a diagram illustrating a clinical trial protocol of transitioning cigarette smokers to e-cigarettes or a tobacco heating device, according to the method of FIG. 1. Criteria for being recruited into the 4-arm study include smokers who are not interested in quitting tobacco and smokers who have never extensively used very low nicotine cigarettes, e-cigarettes, or a tobacco heating device. Unlike e-cigarettes which are popular, approximately 99.95 percent of current worldwide smokers has never smoked a very low nicotine cigarette, and approximately 97 percent of current worldwide smokers has never used a tobacco heating device.

In this contemplated trial, the 6-week transitional period 28 is fixed for all subjects in the four arms of the trial, and the nicotine level of the tobacco sticks is the same for all the subjects using tobacco sticks in the study, and the nicotine level of the e-cigarettes is the same for all the subjects using e-cigarettes in the study. The total number of subjects is anticipated to be at least twelve hundred smokers. The timeframe leading up to the transitional period includes, recruitment, screening and randomization 29 of the subjects into the four arms. After randomization is complete, the App is downloaded 30 by the subjects, then information, recommendations and instructions 31 are sent to the smokers' smartphone and the smokers are supplied with their transition kits 32. Four hundred subjects will be in the first arm of the study and use very low nicotine cigarettes containing approximately 0.67 mg of nicotine per cigarette, and half of these subjects will use the IQOS® heating system and half will use JUUL® electronic cigarette. Four hundred subjects will be in the second arm and use very low nicotine cigarettes containing 80 percent low nicotine tobacco (same filler as cigarettes in first arm) and 20 percent reconstituted *cannabis*, which comprises 75 percent very low THC *cannabis* and 25 percent non-*cannabis*, non-tobacco fractions of the reconstituted *cannabis* process, and half of these subjects will use the IQOS® heating system and half will use JUUL® electronic cigarette. The very low nicotine cigarettes in the second arm therefore contains about 0.54 mg of nicotine per cigarette. The two hundred subjects in the third arm and the two hundred subjects in the fourth arms will not use any very low nicotine cigarettes so none are included in the clinical trial materials distributed to them.

As shown in FIG. 6, the 6-week treatment period (transitional period) 28 is followed by a 4-week measurement period 33 and a 1-week follow-up measurement period 34 to determine cigarette and tobacco stick use across the four arms of the study. The 1-week follow-up measurement period 34 commences six months from time point zero 35 to further evaluate tobacco use over this seven-day period. The subjects in the first and second arms follow the same general instructions and recommendations as the Method A exemplary embodiment of FIG. 1. Subjects stop smoking conventional cigarettes at time point zero 35 and start smoking very low nicotine cigarettes. They start using either the IQOS® heating system or JUUL® electronic cigarettes at time point one 36 (upon overwhelming craving) and stop smoking the very low nicotine cigarettes at time point two 37 and continue to use IQOS® or JUUL® after the transitional period.

The subjects in the third arm are instructed to start using the IQOS® heating system at time point zero 35 (the same time point the subjects in the first and second arms stop smoking conventional cigarettes and start smoking the very low nicotine cigarettes) and not to smoke cigarettes of any type. These subjects are also instructed to continue to use IQOS® throughout the 6-week transitional period and the 4-week measurement period. The subjects in the fourth arm are instructed to start using the JUUL® electronic cigarettes at time point zero 35 and not to smoke cigarettes of any type. These subjects are instructed to continue to use JUUL® throughout the 6-week transitional period and the 4-week measurement period.

The primary endpoint of this Method A clinical trial across the four arms is, for example, to exclusively or overwhelmingly use tobacco sticks or e-cigarettes (≥90% and ≤100% tobacco stick use or e-cigarette use and ≥0 to ≤10% cigarette use) over the 4-week and one-week measurement periods shown in FIG. 6. Switching rates, including usage rates of tobacco sticks and cigarettes and e-cigarettes and cigarettes, are evaluated during transitional period and measurement periods and are compared across the four arms of the study. Daily cigarette use (very low nicotine and conventional, if any), daily tobacco stick use, and daily e-cigarette use are counted, tracked and inputted into the App by each subject during the transitional period, 4-week measurement period and the 1-week follow-up measurement period.

What is claimed is:

1. A very low nicotine cigarette comprising:
   a blended filler of low nicotine tobacco and very low Δ9-tetrahydrocannabinol (THC) *Cannabis sativa*,
   wherein the very low THC *Cannabis sativa* comprises any of:
      flowers of a *Cannabis sativa* plant,
      leaves of a *Cannabis sativa* plant,
      reconstituted *cannabis* comprising flowers, leaves or stems of a *Cannabis sativa* plant, and
      reconstituted tobacco and *cannabis* comprising:
         tobacco, and
         flowers, leaves or stems of a *Cannabis sativa* plant,
   wherein a content of the very low THC *Cannabis sativa* of the very low nicotine cigarette is at least 5 mg,
   wherein a nicotine content of the very low nicotine cigarette is equal to or less than 2.0 mg, and
   wherein a collective content of Δ9-tetrahydrocannabinolic acid (THCA) and Δ9-tetrahydrocannabinol (THC) of the very low THC *Cannabis sativa* in the very low nicotine cigarette is equal to or less than 1.25 mg/g.

2. A kit for transitioning a smoker of conventional cigarettes to using a tobacco heating device, the kit comprising:
   a plurality of the very low nicotine cigarettes according to claim 1,
   a tobacco heating device,
   tobacco sticks, and
   information and recommendations for transitioning the smoker from the conventional cigarettes to using the tobacco heating device.

3. A kit for transitioning a smoker of conventional cigarettes to using e-cigarettes, the kit comprising:
   a plurality of the very low nicotine cigarettes according to claim 1,
   e-cigarettes, and
   information and recommendations for transitioning the smoker from the conventional cigarettes to using the e-cigarettes.

4. The very low nicotine cigarette according to claim 1, further comprising at least 0.25 mg anatabine.

5. The very low nicotine cigarette according to claim 1, further comprising at least 0.10 mg anabasine.

\* \* \* \* \*

SEQUENCE LISTING

```
<160> NUMBER OF SEQ ID NOS: 26

<210> SEQ ID NO 1
<211> LENGTH: 1399
<212> TYPE: DNA
<213> ORGANISM: Nicotiana tabacum
<220> FEATURE:
<223> OTHER INFORMATION: quinolate phosphoribosyl transferase

<400> SEQUENCE: 1
```

```
caaaaactat tttccacaaa attcatttca caaccccccc aaaaaaaaac catgtttaga      60
gctattcctt tcactgctac agtgcatcct tatgcaatta cagctccaag gttggtggtg     120
aaaatgtcag caatagccac caagaataca agagtggagt cattagaggt gaaaccacca     180
gcacacccaa cttatgattt aaaggaagtt atgaaacttg cactctctga agatgctggg     240
aatttaggag atgtgacttg taaggcgaca attcctcttg atatggaatc cgatgctcat     300
tttctagcaa aggaagacgg gatcatagca ggaattgcac ttgctgagat gatattcgcg     360
gaagttgatc cttcattaaa ggtggagtgg tatgtaaatg atggcgataa agttcataaa     420
ggcttgaaat ttggcaaagt acaaggaaac gcttacaaca ttgttatagc tgagagggtt     480
gttctcaatt ttatgcaaag aatgagtgga atagctacac taactaagga atggcagat      540
gctgcacacc ctgcttacat cttggagact aggaaaactg ctcctggatt acgtttggtg     600
gataaatggg cggtattgat cggtgggggg aagaatcaca gaatgggctt atttgatatg     660
gtaatgataa aagacaatca catatctgct gctggaggtg tcggcaaagc tctaaaatct     720
gtggatcagt atttggagca aaataaactt caaataggg ttgaggttga aaccaggaca      780
attgaagaag tacgtgaggt tctagactat gcatctcaaa caaagacttc gttgactagg     840
ataatgctgg acaatatggt tgttccatta tctaacggag atattgatgt atccatgctt     900
aaggaggctg tagaattgat caatgggagg tttgatacgg aggcttcagg aaatgttacc     960
cttgaaacag tacacaagat tggacaaact ggtgttacct acatttctag tggtgccctg    1020
acgcattccg tgaaagcact tgacatttcc ctgaagatcg atacagagct cgcccttgaa    1080
gttggaaggc gtacaaaacg agcatgagcg ccattacttc tgctataggg ttggagtaaa    1140
agcagctgaa tagctgaaag gtgcaaataa gaatcatttt actagttgtc aaacaaaaga    1200
tccttcactg tgtaatcaaa caaaagatg taaattgctg gaatatctca gatggctctt    1260
ttccaacctt attgcttgag ttggtaattt cattatagct ttgttttcat gtttcatgga    1320
atttgttaca atgaaaatac ttgatttata agtttggtgt atgtaaaatt ctgtgttact    1380
tcaaatattt tgagatgtt                                                 1399
```

<210> SEQ ID NO 2
<211> LENGTH: 351
<212> TYPE: PRT
<213> ORGANISM: Nicotiana tabacum
<220> FEATURE:
<223> OTHER INFORMATION: quinolate phosphoribosyl transferase

<400> SEQUENCE: 2

```
Met Phe Arg Ala Ile Pro Phe Thr Ala Thr Val His Pro Tyr Ala Ile
1               5                   10                  15

Thr Ala Pro Arg Leu Val Val Lys Met Ser Ile Ala Thr Lys Asn
            20                  25                  30

Thr Arg Val Glu Ser Leu Glu Val Lys Pro Pro Ala His Pro Thr Tyr
        35                  40                  45

Asp Leu Lys Glu Val Met Lys Leu Ala Leu Ser Glu Asp Ala Gly Asn
    50                  55                  60

Leu Gly Asp Val Thr Cys Lys Ala Thr Ile Pro Leu Asp Met Glu Ser
65                  70                  75                  80

Asp Ala His Phe Leu Ala Lys Glu Asp Gly Ile Ile Ala Gly Ile Ala
                85                  90                  95

Leu Ala Glu Met Ile Phe Ala Glu Val Asp Pro Ser Leu Lys Val Glu
            100                 105                 110
```

```
Trp Tyr Val Asn Asp Gly Asp Lys Val His Lys Gly Leu Lys Phe Gly
            115                 120                 125

Lys Val Gln Gly Asn Ala Tyr Asn Ile Val Ile Ala Glu Arg Val Val
        130                 135                 140

Leu Asn Phe Met Gln Arg Met Ser Gly Ile Ala Thr Leu Thr Lys Glu
145                 150                 155                 160

Met Ala Asp Ala Ala His Pro Ala Tyr Ile Leu Glu Thr Arg Lys Thr
                165                 170                 175

Ala Pro Gly Leu Arg Leu Val Asp Lys Trp Ala Val Leu Ile Gly Gly
            180                 185                 190

Gly Lys Asn His Arg Met Gly Leu Phe Asp Met Val Met Ile Lys Asp
        195                 200                 205

Asn His Ile Ser Ala Ala Gly Val Gly Lys Ala Leu Lys Ser Val
    210                 215                 220

Asp Gln Tyr Leu Glu Gln Asn Lys Leu Gln Ile Gly Val Glu Val Glu
225                 230                 235                 240

Thr Arg Thr Ile Glu Glu Val Arg Glu Val Leu Asp Tyr Ala Ser Gln
                245                 250                 255

Thr Lys Thr Ser Leu Thr Arg Ile Met Leu Asp Asn Met Val Val Pro
            260                 265                 270

Leu Ser Asn Gly Asp Ile Asp Val Ser Met Leu Lys Glu Ala Val Glu
        275                 280                 285

Leu Ile Asn Gly Arg Phe Asp Thr Glu Ala Ser Gly Asn Val Thr Leu
        290                 295                 300

Glu Thr Val His Lys Ile Gly Gln Thr Gly Val Thr Tyr Ile Ser Ser
305                 310                 315                 320

Gly Ala Leu Thr His Ser Val Lys Ala Leu Asp Ile Ser Leu Lys Ile
                325                 330                 335

Asp Thr Glu Leu Ala Leu Glu Val Gly Arg Arg Thr Lys Arg Ala
            340                 345                 350

<210> SEQ ID NO 3
<211> LENGTH: 1706
<212> TYPE: DNA
<213> ORGANISM: Nicotiana attenuata
<220> FEATURE:
<223> OTHER INFORMATION: putrescine N-methyltransferase AF280402.1

<400> SEQUENCE: 3
cagcagcaag ctttcagaaa atacaaacca taatactttc tcttctccaa tttgtttagt      60
ttaattttga aaatggaagt catatctacc aacacaaatg ctctactat cttcaagaat      120 ggtgccattc ccatgaacgg ctaccagaat ggcacttcta acaccaaaa cggccaccag      180 aatggcactt ccgaacatcg aacggccac cagaatggga tttccgaaca ccaaaacggc      240
cacaagaatg gcacttccga gcatcagaac ggccatcaga atggacttc cgaacaacag      300 aacgggacaa tcagccatga caatggcaac gagctacagc tactgggaag ctccaactct      360
attaagcctg gttggttttc agagtttagc gcattatggc caggtgaagc attctcactt      420
aaggttgaga agttactatt ccaggggaag tctgactacc aagatgtcat gctctttgag      480
tcagcaactt atgggaaggt tctgactttg gatggagcaa ttcaacacac agagaatggt      540
ggatttccat acactgaaat gattgttcat ctcccacttg gttccatccc aaacccgaaa      600
aaagttttga tcatcggcgg aggaattggt tttacattat tcgaaatgct tcgttatcct      660
tcaatcgaaa aaattgacat tgttgagatt gatgacgtgg tagttgatgt atccagaaaa      720
```

-continued

```
tttttcccctt atctcgcagc taattttaac gatcctcgtg taaccctagt cctcggagat      780
ggggctgcat ttgtaaaggc tgcacaagca ggatattatg atgctattat agtggactct      840
tctgatccca ttggtccagc aaaagacttg tttgagaggc cattctttga ggcagtagcg      900
aaagccctaa ggccaggagg agttgtatgc acacaggctg aaagcatttg gcttcatatg      960
catattatta agcaaatcat agctaactgt cgtcaagtct ttaagggctc tgtcaactat     1020
gcttggacta ctgttccaac atatcccact ggtgtaattg gttatatgct ctgctctact     1080
gaagggccag aagttgactt caaaaaccca ataaatccaa ttgacaaaga gacaactcaa     1140
gtcaagtcca aattagcacc actgaagttc tacaactttg atattcacaa agcagcattc     1200
attttgccat ctttcgccag aagtatgatc gagtcttaat caagtgaata atgaaccctg     1260
gtggtataat cattggacca agatcgagtc ttaatcaagt gaataaataa gtgaaatgca     1320
acgtattgta tgagaattct gcagtaatta tcataatttc caattcacca attattgtaa     1380
aattctttct ctgtggtgtt tggtacttta atataaattt tcctgctgaa gttttgaatc     1440
gacgtttcaa ctcaatcctc gcaaatcatt tcattgccct tcattcagtg tactaaagta     1500
aacaaatctc atagtgacga tggtgttgta cttttttgac tatgggattt tcgatctgta     1560
ttaaggtttt ggtctatgtt ttggattcat atttgtaact tgctctgtat ctaaatcgtt     1620
ggtctctctt tttaataaat agggtcatcg tcgttgtaat ttgttctctc agtaatattt     1680
tatcagcagt taccatttgt ttgctc                                          1706
```

<210> SEQ ID NO 4
<211> LENGTH: 388
<212> TYPE: PRT
<213> ORGANISM: Nicotiana attenuata
<220> FEATURE:
<223> OTHER INFORMATION: putrescine N-methyltransferase AF280402.1

<400> SEQUENCE: 4

```
Met Glu Val Ile Ser Thr Asn Thr Asn Gly Ser Thr Ile Phe Lys Asn
1               5                   10                  15

Gly Ala Ile Pro Met Asn Gly Tyr Gln Asn Gly Thr Ser Lys His Gln
            20                  25                  30

Asn Gly His Gln Asn Gly Thr Ser Glu His Arg Asn Gly His Gln Asn
        35                  40                  45

Gly Ile Ser Glu His Gln Asn Gly His Lys Asn Gly Thr Ser Glu His
    50                  55                  60

Gln Asn Gly His Gln Asn Gly Thr Ser Glu Gln Asn Gly Thr Ile
65                  70                  75                  80

Ser His Asp Asn Gly Asn Glu Leu Gln Leu Leu Gly Ser Ser Asn Ser
                85                  90                  95

Ile Lys Pro Gly Trp Phe Ser Glu Phe Ser Ala Leu Trp Pro Gly Glu
            100                 105                 110

Ala Phe Ser Leu Lys Val Glu Lys Leu Leu Phe Gln Gly Lys Ser Asp
        115                 120                 125

Tyr Gln Asp Val Met Leu Phe Glu Ser Ala Thr Tyr Gly Lys Val Leu
    130                 135                 140

Thr Leu Asp Gly Ala Ile Gln His Thr Glu Asn Gly Gly Phe Pro Tyr
145                 150                 155                 160

Thr Glu Met Ile Val His Leu Pro Leu Gly Ser Ile Pro Asn Pro Lys
                165                 170                 175

Lys Val Leu Ile Ile Gly Gly Gly Ile Gly Phe Thr Leu Phe Glu Met
            180                 185                 190
```

```
Leu Arg Tyr Pro Ser Ile Glu Lys Ile Asp Ile Val Glu Ile Asp Asp
        195                 200                 205

Val Val Val Asp Val Ser Arg Lys Phe Phe Pro Tyr Leu Ala Ala Asn
    210                 215                 220

Phe Asn Asp Pro Arg Val Thr Leu Val Leu Gly Asp Gly Ala Ala Phe
225                 230                 235                 240

Val Lys Ala Ala Gln Ala Gly Tyr Tyr Asp Ala Ile Ile Val Asp Ser
                245                 250                 255

Ser Asp Pro Ile Gly Pro Ala Lys Asp Leu Phe Glu Arg Pro Phe Phe
                260                 265                 270

Glu Ala Val Ala Lys Ala Leu Arg Pro Gly Val Val Cys Thr Gln
                275                 280                 285

Ala Glu Ser Ile Trp Leu His Met His Ile Ile Lys Gln Ile Ile Ala
        290                 295                 300

Asn Cys Arg Gln Val Phe Lys Gly Ser Val Asn Tyr Ala Trp Thr Thr
305                 310                 315                 320

Val Pro Thr Tyr Pro Thr Gly Val Ile Gly Tyr Met Leu Cys Ser Thr
                325                 330                 335

Glu Gly Pro Glu Val Asp Phe Lys Asn Pro Ile Asn Pro Ile Asp Lys
                340                 345                 350

Glu Thr Thr Gln Val Lys Ser Lys Leu Ala Pro Leu Lys Phe Tyr Asn
                355                 360                 365

Phe Asp Ile His Lys Ala Ala Phe Ile Leu Pro Ser Phe Ala Arg Ser
        370                 375                 380

Met Ile Glu Ser
385

<210> SEQ ID NO 5
<211> LENGTH: 3091
<212> TYPE: DNA
<213> ORGANISM: Nicotiana tabacum
<220> FEATURE:
<223> OTHER INFORMATION: cultivar Xanthi putrescine N-methyltransferase
      AF126809.1

<400> SEQUENCE: 5
ctgagttgac aagaacaatt cctggtgaat cagatggatg aagataatag aggtgggtgg     60
aatctataac caaagcagct ggttgagtga ctgtgcgagt tgcagaaaca attgaagggt    120
catttgtgga atttggggcc atttcaaagg aaaagaaaa gatgacttag cattaataaa    180
tcaaattaaa ataaggctta gcgttaaaat caaggaaat ggcaagcctg gctcctggag    240
caatgcttct gaggacagta gtaaaaacaa tatcagacaa aaagtaaagt tgtattattt    300
agcttgagga taaagtatgt cattagtttt gtgagagatt tggtgtcctc tacaatgatt    360
gttgaagtcc ctatttatag ctatacacag gaaacaaaat cctaggatca gcccctctt    420 aaatgacaat aatggggtta atgatgaata tgtagcggca tgacatgaat gccaaaattc    480
tccgcaacga ctatttattt aatattgagg aatatttttt attaaatact atctggtgac    540
aagcattcgt ttgcttccgt tgattacgtt gattttggga tctactctat accaaccgaa    600
gccgttgtcc ttgatcttcg ctttcattta attcatcttc cgtctgcctc cgatttcaca    660
agtcatgcac ccattcaatt atttaatgga aaccaatttt accctataca aatggtacat    720
cattcgtcaa atactttact tggatataaa caatttgcc cgaggagtaa acagatgcga    780
agaaagaaag cagacgatta agaaaatttt taaaaagga gagagaaatg aacacacaca    840
```

```
tgtactaata aaattagggt actactttac taataattgg acagagacta aattcatatt      900
ttagttccaa aatgtctcgg gcagtccaac catgcacgtt gtaatgattt tttaactcta      960
ttatatcgag ttgcgccctc cactcctcgg tgtccaaatt gtatataaat gcatatgtgt     1020
ctattgggag tgtacatcaa gctttcataa agtacaaatc gtaatacttg ttgaaacata     1080
atactttctc ttctccaatt tgtttagttt aattttgaaa atggaagtca tatctaccaa     1140
cacaaatggc tctaccatct tcaagagtgg tgccattccc atgaatggcc accataatgg     1200
cacttccaaa caccaaaacg gccacaagaa tgggacttcc gaacaacaga acgggacaat     1260
cagccttgat aatggcaacg agctactggg aaactccaat tgtattaagc ctggttggtt     1320
ttcagagttt agcgcattat ggccaggtta gtactgagaa agaaactcaa atgcatattt     1380
aaagttaaaa ttgttaggct aatataagga gttgatattc ttttagtgat taattaaaaa     1440
ggaaaaagta tcaaataaat tcaaaaaatg gatagtaact tcgcatatta ctctacacat     1500
taatttgaaa taaatcgaat tttgcaggtg aagcattctc acttaaggtt gagaagttac     1560
tgttccaggg gaagtctgac taccaagatg tcatgctctt tgaggtaaat aatattttaa     1620
tacacatgct tccatttaaa ttgatacttt taatttactt ttactttatt gcatgtgtac     1680
gtacagtcag caacttatgg gaaggttctg actttggatg gagcaattca acacacagag     1740
aatggtggat ttccatacac tgaaatgatt gttcatcttc cacttggttc catcccaaac     1800
ccaaaaaagg ttttgatcat cggcggagga attggtttta cattattcga aatgcttcgt     1860
tatcctacaa tcgaaaaaat tgacattgtt gagatcgatg acgtggtagt tgatgtaagt     1920
caaacttctt ttactcacat aaaaaaatgg tttagattgc ttcttgttat ttttctaaaa     1980
gaatactatt ttttaaaac aaaattttct tttttacagg tatctagaaa attttccct      2040
tatctcgctg ctaattttaa cgatcctcgt gtaaccctag tccttggaga tggtgcgtat     2100
ttgataatct cgcttttgtt ttatctttta tttttattgc atttaatttt tacctttgg      2160
tgtgtggtta attcacctgc cattggttct ctttcatttc aggggctgca tttgtaaagg     2220
ctgcacaagc agaatattat gatgctatta tagtggactc ttctgatccc attggtactc     2280
tattacttct taataccaag actaatctta ttgaataagc tactaataaa cggtaattga     2340
tttctaaaac aatataattt caggtccagc aaaagatttg tttgagaggc cattctttga     2400
ggcagtagct aaagccctaa ggccaggagg agttgtatgc acacaggctg aaagcatttg     2460
gcttcatatg catattatta agcaaatcat tgctaactgt cgtcaagtct ttaagggctc     2520
tgtcaactat gcttggacta ctgttccaac atatccaacg tattttctc tctctctc       2580
ttcctataaa attggaagtt tgattctat aattgtcaag aaatggagaa tcagttccaa      2640
gaaaaaccaa cttcttttct tttactcttc aaggtattgt gtttaatttt ttttcaactg     2700
atatgatcaa ttattttgat ttcagcggtg tgattggtta tatgctctgc tctactgaag     2760
gaccagaaat tgacttcaag aatccagtaa atccaattga caaagagaca gctcaagtca     2820
agtccaaatt agcacctctc aagttctaca actctgatgt aacttcatat ctcacaattt     2880
cttttttcct attgtacttt atgttcttcg tcaaatttta taattaactc ttttcaaatt     2940
gtctttttt ttttcagatt cacaaagcag cattcatttt gccatctttc gccagaagta     3000
tgatcgagtc ttaatcaact gattaatgaa tactggtggt acaatcattg gaccaagatc     3060
aataagtgaa agacgtattg tatgagaatt c                                   3091
```

<210> SEQ ID NO 6
<211> LENGTH: 353

```
<212> TYPE: PRT
<213> ORGANISM: Nicotiana tabacum
<220> FEATURE:
<223> OTHER INFORMATION: cultivar Xanthi putrescine N-methyltransferase
      AF126809.1

<400> SEQUENCE: 6

Met Glu Val Ile Ser Thr Asn Thr Asn Gly Ser Thr Ile Phe Lys Ser
1               5                   10                  15

Gly Ala Ile Pro Met Asn Gly His His Asn Gly Thr Ser Lys His Gln
            20                  25                  30

Asn Gly His Lys Asn Gly Thr Ser Glu Gln Gln Asn Gly Thr Ile Ser
        35                  40                  45

Leu Asp Asn Gly Asn Glu Leu Leu Gly Asn Ser Asn Cys Ile Lys Pro
    50                  55                  60

Gly Trp Phe Ser Glu Phe Ser Ala Leu Trp Pro Gly Glu Ala Phe Ser
65                  70                  75                  80

Leu Lys Val Glu Lys Leu Leu Phe Gln Gly Lys Ser Asp Tyr Gln Asp
                85                  90                  95

Val Met Leu Phe Glu Ser Ala Thr Tyr Gly Lys Val Leu Thr Leu Asp
            100                 105                 110

Gly Ala Ile Gln His Thr Glu Asn Gly Gly Phe Pro Tyr Thr Glu Met
        115                 120                 125

Ile Val His Leu Pro Leu Gly Ser Ile Pro Asn Pro Lys Lys Val Leu
    130                 135                 140

Ile Ile Gly Gly Gly Ile Gly Phe Thr Leu Phe Glu Met Leu Arg Tyr
145                 150                 155                 160

Pro Thr Ile Glu Lys Ile Asp Ile Val Glu Ile Asp Asp Val Val Val
                165                 170                 175

Asp Val Ser Arg Lys Phe Phe Pro Tyr Leu Ala Ala Asn Phe Asn Asp
            180                 185                 190

Pro Arg Val Thr Leu Val Leu Gly Asp Gly Ala Ala Phe Val Lys Ala
        195                 200                 205

Ala Gln Ala Glu Tyr Tyr Asp Ala Ile Ile Val Asp Ser Ser Asp Pro
    210                 215                 220

Ile Gly Pro Ala Lys Asp Leu Phe Glu Arg Pro Phe Phe Glu Ala Val
225                 230                 235                 240

Ala Lys Ala Leu Arg Pro Gly Gly Val Val Cys Thr Gln Ala Glu Ser
                245                 250                 255

Ile Trp Leu His Met His Ile Ile Lys Gln Ile Ile Ala Asn Cys Arg
            260                 265                 270

Gln Val Phe Lys Gly Ser Val Asn Tyr Ala Trp Thr Thr Val Pro Thr
        275                 280                 285

Tyr Pro Thr Gly Val Ile Gly Tyr Met Leu Cys Ser Thr Glu Gly Pro
    290                 295                 300

Glu Ile Asp Phe Lys Asn Pro Val Asn Pro Ile Asp Lys Glu Thr Ala
305                 310                 315                 320

Gln Val Lys Ser Lys Leu Ala Pro Leu Lys Phe Tyr Asn Ser Asp Ile
                325                 330                 335

His Lys Ala Ala Phe Ile Leu Pro Ser Phe Ala Arg Ser Met Ile Glu
            340                 345                 350

Ser

<210> SEQ ID NO 7
<211> LENGTH: 2465
```

<212> TYPE: DNA
<213> ORGANISM: Nicotiana tabacum
<220> FEATURE:
<223> OTHER INFORMATION: NtMPO1 mRNA for N-methylputrescine oxidase
      AB289456.1

<400> SEQUENCE: 7

```
gggttctcat cgcagctttc ttcctagcta agcagtactc acaatataat ggccactact      60
aaacagaaag tgacggcacc ttctccttct ccttcttctt cgactgcttc ttgctgtcct     120
tccacttcta tcctccgtcg tgaggcaaca gcggccattg cagtcgtggg tgacggcctg     180
cagaattgga ccaacatccc ctccgtcgac gagaagcaga aaaagacggc ctcatcagct     240
ctagcgtcat tgccaaccac tgaacctctt tccaccaata cctctaccaa aggtatccaa     300
atcatgacaa gggctcaaac ctgccatcct ttggacccdt tatctgctgc tgagatctca     360
gtggctgtgg caactgttag agctgccggt gaaacacctg aggtcagaga tgggatgcga     420
tttattgagg tggttctggt agaaccagat aaaagtgtag ttgcattggc agatgcatat     480
ttcttcccac cttttcagtc atcattgatg ccgagaacca aggaggatc tcagattcct      540
actaagcttc ctccaaggag agctaggctt attgtttaca ataagaaaac aaatgagaca     600
agcatttgga ttgttgagct aaacgaagta catgctgctg ctcgaggtgg acatcacagg     660
ggaaaagtca tcgcatccaa tgttgtccct gatgttcagc cacccataga tgctcaagag     720
tatgctgaat gtgaagctgt ggtgaaaagt tatcctcct ttcgagacgc aatgaggaga      780
agggttattg atgacttgga tcttgtgatg gttgacccdt ggtgtgttgg ttatcatagt     840
gaggctgatg ctcctagccg caggctcgcg aaaccacttg tattctgcag acagagagt      900
gactgcccaa tggaaaatgg atatgcaaga ccagttgaag gaatatatgt gcttgttgat     960
gtacaaaaca tgaagattat agaatttgaa gaccgaaaac ttgtaccatt acctccagtt    1020
gacccactga ggaactacac tgctggtgag acaagaggag gggttgatcg aagtgatgtg    1080
aaacccctac atattattca gcctgagggt ccaagctttc gtatcagtgg aaactacgta    1140
gagtggcaga gtggaacttt cggattggt ttcaccccta gagagggttt agttatacac     1200
tctgtggcgt atcttgatgg tagcagaggt cgtagaccaa tagcacatag ttgagtttt     1260
gtagagatgg ttgtccccta tggagatcca aatgatccac attataggaa gaatgcattt    1320
gatgcaggag aagatggcct tggaaagaat gctcattcac tgaagagggg atgtgattgt    1380
ttagggtaca taaagtactt tgatgcccat ttcacaaact ttaccggagg agttgaaacg    1440
actgaaaatt gtgtatgctt gcatgaagaa gatcacggaa tgctttggaa gcatcaagat    1500
tggagaactg gccttgctga agttagacgg tctaggcgac taacagtgtc ttttgtttgt    1560
acagtggcca attatgaata tgcattctac tggcatttct accaggatgg aaaaattgaa    1620
gcggaagtca aactcactgg aattcttagt ttgggagcat tgcaacctgg agaatatcgc    1680
aaatatggta ccacaatttt accaggtttg tatgcaccag ttcatcaaca cttctttgtt    1740
gcacgaatga atatggcagt tgattgtaag ccaggagaag cacacaatca ggttgttgaa    1800
gtaaatgtca agttgaaga acctggcaag gaaaatgttc ataataatgc attctatgct    1860
gaagaaacat tgcttaggtc tgaattgcaa gcaatgcgtg attgtgatcc attctctgct    1920
cgtcattgga ttgttaggaa cacaagaaca gtaaatagaa caggacagct aacagggtac    1980
aagctggtac ctggtccaaa ctgtttgcca ctggctggtc ctgaggcgaa atttttgaga    2040
agagctgcat ttctgaagca caatctatgg gttacacaat atgcacctgg agaagatttt    2100
ccaggaggag agttccctaa tcaaaatccc cgtgttggcg agggattagc ttcttgggtc    2160
```

```
aagcaagacc ggcctctgga agaaagtgat attgttctct ggtatatttt tggaatcaca    2220
catgttcctc ggttggaaga ctggcctgtt atgccagtag aacacattgg ttttgtgcta    2280
cagccacatg gatactttaa ctgctctccg gctgttgatg tccctccgcc ctttgcatgc    2340
gactcagaaa gcagagacag tgatgttact gaaactagtg tagcaaagtc cactgccact    2400
agcttgctgg ccaagctttg aatgtttcgt ttatcctaac atgagtcctc ctcgcctatt    2460
taatc                                                                2465
```

<210> SEQ ID NO 8
<211> LENGTH: 790
<212> TYPE: PRT
<213> ORGANISM: Nicotiana tabacum
<220> FEATURE:
<223> OTHER INFORMATION: NtMPO1 mRNA for N-methylputrescine oxidase
      AB289456.1

<400> SEQUENCE: 8

```
Met Ala Thr Thr Lys Gln Lys Val Thr Ala Pro Ser Pro Ser Pro Ser
1               5                   10                  15

Ser Ser Thr Ala Ser Cys Cys Pro Ser Thr Ser Ile Leu Arg Arg Glu
            20                  25                  30

Ala Thr Ala Ala Ile Ala Val Val Gly Asp Gly Leu Gln Asn Trp Thr
        35                  40                  45

Asn Ile Pro Ser Val Asp Glu Lys Gln Lys Lys Thr Ala Ser Ser Ala
    50                  55                  60

Leu Ala Ser Leu Pro Thr Thr Glu Pro Leu Ser Thr Asn Thr Ser Thr
65                  70                  75                  80

Lys Gly Ile Gln Ile Met Thr Arg Ala Gln Thr Cys His Pro Leu Asp
                85                  90                  95

Pro Leu Ser Ala Ala Glu Ile Ser Val Ala Val Ala Thr Val Arg Ala
            100                 105                 110

Ala Gly Glu Thr Pro Glu Val Arg Asp Gly Met Arg Phe Ile Glu Val
        115                 120                 125

Val Leu Val Glu Pro Asp Lys Ser Val Val Ala Leu Ala Asp Ala Tyr
    130                 135                 140

Phe Phe Pro Pro Phe Gln Ser Ser Leu Met Pro Arg Thr Lys Gly Gly
145                 150                 155                 160

Ser Gln Ile Pro Thr Lys Leu Pro Pro Arg Ala Arg Leu Ile Val
                165                 170                 175

Tyr Asn Lys Lys Thr Asn Glu Thr Ser Ile Trp Ile Val Glu Leu Asn
            180                 185                 190

Glu Val His Ala Ala Arg Gly Gly His His Arg Gly Lys Val Ile
        195                 200                 205

Ala Ser Asn Val Val Pro Asp Val Gln Pro Ile Asp Ala Gln Glu
    210                 215                 220

Tyr Ala Glu Cys Glu Ala Val Lys Ser Tyr Pro Pro Phe Arg Asp
225                 230                 235                 240

Ala Met Arg Arg Arg Gly Ile Asp Asp Leu Asp Leu Val Met Val Asp
                245                 250                 255

Pro Trp Cys Val Gly Tyr His Ser Glu Ala Asp Ala Pro Ser Arg Arg
            260                 265                 270

Leu Ala Lys Pro Leu Val Phe Cys Arg Thr Glu Ser Asp Cys Pro Met
        275                 280                 285

Glu Asn Gly Tyr Ala Arg Pro Val Glu Gly Ile Tyr Val Leu Val Asp
```

```
                290                 295                 300
Val Gln Asn Met Lys Ile Ile Glu Phe Glu Asp Arg Lys Leu Val Pro
305                 310                 315                 320

Leu Pro Pro Val Asp Pro Leu Arg Asn Tyr Thr Ala Gly Glu Thr Arg
                325                 330                 335

Gly Gly Val Asp Arg Ser Asp Val Lys Pro Leu His Ile Ile Gln Pro
            340                 345                 350

Glu Gly Pro Ser Phe Arg Ile Ser Gly Asn Tyr Val Glu Trp Gln Lys
        355                 360                 365

Trp Asn Phe Arg Ile Gly Phe Thr Pro Arg Glu Gly Leu Val Ile His
    370                 375                 380

Ser Val Ala Tyr Leu Asp Gly Ser Arg Gly Arg Pro Ile Ala His
385                 390                 395                 400

Arg Leu Ser Phe Val Glu Met Val Val Pro Tyr Gly Asp Pro Asn Asp
                405                 410                 415

Pro His Tyr Arg Lys Asn Ala Phe Asp Ala Gly Glu Asp Gly Leu Gly
            420                 425                 430

Lys Asn Ala His Ser Leu Lys Arg Gly Cys Asp Cys Leu Gly Tyr Ile
        435                 440                 445

Lys Tyr Phe Asp Ala His Phe Thr Asn Phe Thr Gly Gly Val Glu Thr
    450                 455                 460

Thr Glu Asn Cys Val Cys Leu His Glu Asp His Gly Met Leu Trp
465                 470                 475                 480

Lys His Gln Asp Trp Arg Thr Gly Leu Ala Glu Val Arg Arg Ser Arg
                485                 490                 495

Arg Leu Thr Val Ser Phe Val Cys Thr Val Ala Asn Tyr Glu Tyr Ala
            500                 505                 510

Phe Tyr Trp His Phe Tyr Gln Asp Gly Lys Ile Glu Ala Glu Val Lys
        515                 520                 525

Leu Thr Gly Ile Leu Ser Leu Gly Ala Leu Gln Pro Gly Glu Tyr Arg
    530                 535                 540

Lys Tyr Gly Thr Thr Ile Leu Pro Gly Leu Tyr Ala Pro Val His Gln
545                 550                 555                 560

His Phe Phe Val Ala Arg Met Asn Met Ala Val Asp Cys Lys Pro Gly
                565                 570                 575

Glu Ala His Asn Gln Val Val Glu Val Asn Val Lys Val Glu Glu Pro
            580                 585                 590

Gly Lys Glu Asn Val His Asn Asn Ala Phe Tyr Ala Glu Glu Thr Leu
        595                 600                 605

Leu Arg Ser Glu Leu Gln Ala Met Arg Asp Cys Asp Pro Phe Ser Ala
    610                 615                 620

Arg His Trp Ile Val Arg Asn Thr Arg Thr Val Asn Arg Thr Gly Gln
625                 630                 635                 640

Leu Thr Gly Tyr Lys Leu Val Pro Gly Pro Asn Cys Leu Pro Leu Ala
                645                 650                 655

Gly Pro Glu Ala Lys Phe Leu Arg Arg Ala Ala Phe Leu Lys His Asn
            660                 665                 670

Leu Trp Val Thr Gln Tyr Ala Pro Gly Glu Asp Phe Pro Gly Gly Glu
        675                 680                 685

Phe Pro Asn Gln Asn Pro Arg Val Gly Glu Gly Leu Ala Ser Trp Val
    690                 695                 700

Lys Gln Asp Arg Pro Leu Glu Glu Ser Asp Ile Val Leu Trp Tyr Ile
705                 710                 715                 720
```

```
Phe Gly Ile Thr His Val Pro Arg Leu Glu Asp Trp Pro Val Met Pro
                725                 730                 735

Val Glu His Ile Gly Phe Val Leu Gln Pro His Gly Tyr Phe Asn Cys
            740                 745                 750

Ser Pro Ala Val Asp Val Pro Pro Phe Ala Cys Asp Ser Glu Ser
        755                 760                 765

Arg Asp Ser Asp Val Thr Glu Thr Ser Val Ala Lys Ser Thr Ala Thr
    770                 775                 780

Ser Leu Leu Ala Lys Leu
785                 790

<210> SEQ ID NO 9
<211> LENGTH: 1596
<212> TYPE: DNA
<213> ORGANISM: Artificial Sequence
<220> FEATURE:
<223> OTHER INFORMATION: Ornithine Decarboxylase (ODC) Locus AF127242

<400> SEQUENCE: 9
ggcacgaggg gaacaagaga acatcatat tattgaatcc ctagttttctt ttctttccct      60 ttgattcctt cctctcattt acctctctct tttcttcctt tgtttggatg gccggccaaa    120
caatcatcgt ttccggggttg aacccggcgg ccattcttca gtccacaatt ggcggcggag    180
cttctcctac agcggcggcg gcggcggaaa acggcaccag aaaagtcatc cctctctcaa    240
gagatgcctt acaagatttc atgttatcaa tcataaccca aaaattacaa gatgagaaac    300
aaccttttta cgtgctagac ttgggtgagg ttgtttctct tatggaccaa tggaaatctg    360
ctctcccaaa tatccgtcca ttttacgctg ttaaatgtaa ccctgaaccg tcgttccttt    420
caattttatc tgctatgggc tcaaattttg attgtgctag ccgagctgaa attgagtatg    480
ttttatctct tggcatttca cctgaccgta ttgttttcgc aaatccatgc aaaccggaat    540
ccgatattat ttttgcagca aaagttgggg tgaatcttac aacctatgat ctgaagacg    600 aggtttacaa gatccgaaag catcacccga atccgaact cttgctccgc atcaagccca    660
tgctcgacgg caacgcgaga tgcccaatgg gcccgaaata cggcgcgctt ccagaagaag    720
tcgacccgct gctccgggca gctcaagccg cccgtctcac cgtatccggc gtctcattcc    780
acatcggtag cggagatgcc gattcaaacg cttatctcgg cgccatagcc gcggctaagg    840
aagtgtttga aacagctgct aaactcggga tgtcgaaaat gactgttcta gacgtcggcg    900
gcgggtttac atccggccac cagttcacaa ccgccgccgt cgccgttaaa tcagctttaa    960
aacaacactt cgatgacgaa ccggagttga caatcatagc tgaaccgggt cggttttttg   1020
cagagacggc gtttactttg gcaacgacga ttatagggaa aagagtgagg ggtgaattga   1080
gggagtattg gattaacgac gggctgtacg gttcgatgaa ctgtgtactt tacgaccatg   1140
cgacggtgaa tgcaacgccg ttagctgttc tgtcgaatcg tagtaacgtt acctgcggcg   1200
ggtcgaaaac gtttccgacg actgtgtttg ggcccacttg tgatgctctt gatactgttt   1260
taagggatta ccagttaccg gagctgcagg ttaatgattg gctggttttt cctaatatgg   1320
gtgcttatac taaagctgct gggtccaatt ttaatgaatt taatacttcc gccattgtta   1380
ctcacctcgc ttattcttat ccaagctgat gaaccacctg tattaggaat tactaccgtg   1440
gttttgatgg tttttttcctt ttttgggtat cttttttta attttgttgt ttttggtagt   1500
aatttatatt ccaaatcagc ttgtaattct cttgtatgcc ataagaatgc aaggatttgc   1560
taattgtgat tttctctaaa aaaaaaaaaa aaaaaa                             1596
```

```
<210> SEQ ID NO 10
<211> LENGTH: 433
<212> TYPE: PRT
<213> ORGANISM: Artificial Sequence
<220> FEATURE:
<223> OTHER INFORMATION: Ornithine Decarboxylase (ODC) Locus AF127242

<400> SEQUENCE: 10

Met Ala Gly Gln Thr Ile Ile Val Ser Gly Leu Asn Pro Ala Ala Ile
1               5                   10                  15

Leu Gln Ser Thr Ile Gly Gly Ala Ser Pro Thr Ala Ala Ala
            20                  25                  30

Ala Glu Asn Gly Thr Arg Lys Val Ile Pro Leu Ser Arg Asp Ala Leu
            35                  40                  45

Gln Asp Phe Met Leu Ser Ile Ile Thr Gln Lys Leu Gln Asp Glu Lys
        50                  55                  60

Gln Pro Phe Tyr Val Leu Asp Leu Gly Glu Val Val Ser Leu Met Asp
65                  70                  75                  80

Gln Trp Lys Ser Ala Leu Pro Asn Ile Arg Pro Phe Tyr Ala Val Lys
                85                  90                  95

Cys Asn Pro Glu Pro Ser Phe Leu Ser Ile Leu Ser Ala Met Gly Ser
            100                 105                 110

Asn Phe Asp Cys Ala Ser Arg Ala Glu Ile Glu Tyr Val Leu Ser Leu
        115                 120                 125

Gly Ile Ser Pro Asp Arg Ile Val Phe Ala Asn Pro Cys Lys Pro Glu
130                 135                 140

Ser Asp Ile Ile Phe Ala Ala Lys Val Gly Val Asn Leu Thr Thr Tyr
145                 150                 155                 160

Asp Ser Glu Asp Glu Val Tyr Lys Ile Arg Lys His His Pro Lys Ser
                165                 170                 175

Glu Leu Leu Leu Arg Ile Lys Pro Met Leu Asp Gly Asn Ala Arg Cys
            180                 185                 190

Pro Met Gly Pro Lys Tyr Gly Ala Leu Pro Glu Glu Val Asp Pro Leu
        195                 200                 205

Leu Arg Ala Ala Gln Ala Ala Arg Leu Thr Val Ser Gly Val Ser Phe
210                 215                 220

His Ile Gly Ser Gly Asp Ala Asp Ser Asn Ala Tyr Leu Gly Ala Ile
225                 230                 235                 240

Ala Ala Ala Lys Glu Val Phe Glu Thr Ala Ala Lys Leu Gly Met Ser
                245                 250                 255

Lys Met Thr Val Leu Asp Val Gly Gly Gly Phe Thr Ser Gly His Gln
            260                 265                 270

Phe Thr Thr Ala Ala Val Ala Lys Ser Ala Leu Lys Gln His Phe
        275                 280                 285

Asp Asp Glu Pro Glu Leu Thr Ile Ile Ala Glu Pro Gly Arg Phe Phe
290                 295                 300

Ala Glu Thr Ala Phe Thr Leu Ala Thr Thr Ile Ile Gly Lys Arg Val
305                 310                 315                 320

Arg Gly Glu Leu Arg Glu Tyr Trp Ile Asn Asp Gly Tyr Gly Ser
                325                 330                 335

Met Asn Cys Val Leu Tyr Asp His Ala Thr Val Asn Ala Thr Pro Leu
            340                 345                 350

Ala Val Leu Ser Asn Arg Ser Asn Val Thr Cys Gly Gly Ser Lys Thr
        355                 360                 365
```

```
Phe Pro Thr Thr Val Phe Gly Pro Thr Cys Asp Ala Leu Asp Thr Val
        370                 375                 380

Leu Arg Asp Tyr Gln Leu Pro Glu Leu Gln Val Asn Asp Trp Leu Val
385                 390                 395                 400

Phe Pro Asn Met Gly Ala Tyr Thr Lys Ala Gly Ser Asn Phe Asn
                405                 410                 415

Gly Phe Asn Thr Ser Ala Ile Val Thr His Leu Ala Tyr Ser Tyr Pro
            420                 425                 430

Ser
```

<210> SEQ ID NO 11
<211> LENGTH: 1749
<212> TYPE: DNA
<213> ORGANISM: Artificial Sequence
<220> FEATURE:
<223> OTHER INFORMATION: NBBI

<400> SEQUENCE: 11

```
acgcgggag aaatacatac aacatgtttc cgctcataat tctgatcagc ttttcacttg      60
cttccttgtc tgaaactgct actggagctg ttacaaatct ttcagcctgc ttaatcaacc    120
acaatgtcca taacttctct atttacccca caagtagaaa ttactttaac ttgctccact    180
tctcccttca aaatcttcgc tttgctgcac ctttcatgcc gaaaccaacc ttcattatcc    240
taccaagcag taaggaggag ctcgtgagca ccattttttg ttgcagaaaa gcatcttatg    300
aaatcagagt aaggtgcggc ggacacagtt acgaaggaac ttcttacgtt tcctttgacg    360
cttctccatt cgtgatcgtt gacttgatga attagacga cgtttcagta gatttggatt     420
ctgaaacagc ttgggctcag gcggcgcaa caattggcca aatttattat gccattgcca     480
aggtaagtga cgttcatgca ttttcagcag gttcgggacc aacagtagga tctggaggtc    540
atatttcagg tggtggattt ggactttttat ctagaaaatt cggacttgct gctgataatg    600
tcgttgatgc tcttcttatt gatgctgatg acggttatt agaccgaaaa gccatgggcg      660
aagacgtgtt tgggcaatc agaggtggcg gcggtgaaa ttggggcatt gtttatgcct      720
ggaaaattcg attactcaaa gtgcctaaaa tcgtaacaac ttgtatgatc tataggcctg     780
gatccaaaca atacgtggct caaatacttg agaaatggca aatagttact ccaaatttgg    840
tcgatgattt tactctagga gtactgctga gacctgcaga tctacccgcg gatatgaaat    900
atggtaatac tactcctatt gaaatatttc cccaattcaa tgcactttat ttgggtccaa    960
aaactgaagt tctttccata tcgaatgaga catttccgga gctaggcgtt aagaatgatg   1020
agtgcaagga aatgacttgg gtagagtcag cacttttctt ctccgaatta gctgacgtta   1080
acggaactc gactggtgat atctcccgtc tgaaagaacg ttacatggac ggaaaaggtt    1140
ttttcaaagg caaaacggac tacgtgaaga agccagtttc aatggatggg atgctaacat    1200
ttcttgtgga actcgagaaa aacccgaagg gatatcttgt ctttgatcct tatgcggag    1260
ccatggacaa gattagtgat caagctattg ctttccctca tagaaaaggt aaccttttcg    1320
cgattcagta tctagcacag tggaatgaag aggacgatta catgagcgac gtttacatgg   1380
agtggataag aggattttac aatacaatga cgccctttgt ttcaagctcg ccaagggag    1440
cttatatcaa ctacttggat atggatcttg gagtgaatat ggtcgacgac tacttattgc   1500
gaaatgctag tagcagtagt ccttcttcct ctgttgatgc tgtggagaga gctagagcgt   1560
gggtgagat gtatttcttg cataactatg ataggttggt taaagctaag acacaaattg   1620
```

-continued

```
atccactaaa tgtttttcga catgaacaga gtattcctcc tatgcttggt tcaacgcaag    1680
agcacaagta tagcagtgaa tgagatttaa aatgtactac cttgagagag attccgttgt    1740
tagttttcc                                                            1749
```

<210> SEQ ID NO 12
<211> LENGTH: 559
<212> TYPE: PRT
<213> ORGANISM: Artificial Sequence
<220> FEATURE:
<223> OTHER INFORMATION: NBBI

<400> SEQUENCE: 12

```
Met Phe Pro Leu Ile Ile Leu Ile Ser Phe Ser Leu Ala Ser Leu Ser
1               5                   10                  15

Glu Thr Ala Thr Gly Ala Val Thr Asn Leu Ser Ala Cys Leu Ile Asn
            20                  25                  30

His Asn Val His Asn Phe Ser Ile Tyr Pro Thr Ser Arg Asn Tyr Phe
        35                  40                  45

Asn Leu Leu His Phe Ser Leu Gln Asn Leu Arg Phe Ala Ala Pro Phe
    50                  55                  60

Met Pro Lys Pro Thr Phe Ile Ile Leu Pro Ser Ser Lys Glu Glu Leu
65                  70                  75                  80

Val Ser Thr Ile Phe Cys Cys Arg Lys Ala Ser Tyr Glu Ile Arg Val
                85                  90                  95

Arg Cys Gly Gly His Ser Tyr Glu Gly Thr Ser Tyr Val Ser Phe Asp
            100                 105                 110

Ala Ser Pro Phe Val Ile Val Asp Leu Met Lys Leu Asp Asp Val Ser
        115                 120                 125

Val Asp Leu Asp Ser Glu Thr Ala Trp Ala Gln Gly Gly Ala Thr Ile
    130                 135                 140

Gly Gln Ile Tyr Tyr Ala Ile Ala Lys Val Ser Asp Val His Ala Phe
145                 150                 155                 160

Ser Ala Gly Ser Gly Pro Thr Val Gly Ser Gly His Ile Ser Gly
                165                 170                 175

Gly Gly Phe Gly Leu Leu Ser Arg Lys Phe Gly Leu Ala Ala Asp Asn
            180                 185                 190

Val Val Asp Ala Leu Leu Ile Asp Ala Asp Gly Arg Leu Leu Asp Arg
        195                 200                 205

Lys Ala Met Gly Glu Asp Val Phe Trp Ala Ile Arg Gly Gly Gly Gly
    210                 215                 220

Gly Asn Trp Gly Ile Val Tyr Ala Trp Lys Ile Arg Leu Leu Lys Val
225                 230                 235                 240

Pro Lys Ile Val Thr Thr Cys Met Ile Tyr Arg Pro Gly Ser Lys Gln
                245                 250                 255

Tyr Val Ala Gln Ile Leu Glu Lys Trp Gln Ile Val Thr Pro Asn Leu
            260                 265                 270

Val Asp Asp Phe Thr Leu Gly Val Leu Leu Arg Pro Ala Asp Leu Pro
        275                 280                 285

Ala Asp Met Lys Tyr Gly Asn Thr Thr Pro Ile Glu Ile Phe Pro Gln
    290                 295                 300

Phe Asn Ala Leu Tyr Leu Gly Pro Lys Thr Glu Val Leu Ser Ile Ser
305                 310                 315                 320

Asn Glu Thr Phe Pro Glu Leu Gly Val Lys Asn Asp Glu Cys Lys Glu
                325                 330                 335
```

```
Met Thr Trp Val Glu Ser Ala Leu Phe Phe Ser Glu Leu Ala Asp Val
            340                 345                 350
Asn Gly Asn Ser Thr Gly Asp Ile Ser Arg Leu Lys Glu Arg Tyr Met
        355                 360                 365
Asp Gly Lys Gly Phe Lys Gly Lys Thr Asp Tyr Val Lys Lys Pro
    370                 375                 380
Val Ser Met Asp Gly Met Leu Thr Phe Leu Val Glu Leu Glu Lys Asn
385                 390                 395                 400
Pro Lys Gly Tyr Leu Val Phe Asp Pro Tyr Gly Ala Met Asp Lys
                405                 410                 415
Ile Ser Asp Gln Ala Ile Ala Phe Pro His Arg Lys Gly Asn Leu Phe
            420                 425                 430
Ala Ile Gln Tyr Leu Ala Gln Trp Asn Glu Glu Asp Asp Tyr Met Ser
        435                 440                 445
Asp Val Tyr Met Glu Trp Ile Arg Gly Phe Tyr Asn Thr Met Thr Pro
    450                 455                 460
Phe Val Ser Ser Ser Pro Arg Gly Ala Tyr Ile Asn Tyr Leu Asp Met
465                 470                 475                 480
Asp Leu Gly Val Asn Met Val Asp Asp Tyr Leu Leu Arg Asn Ala Ser
                485                 490                 495
Ser Ser Ser Pro Ser Ser Val Asp Ala Val Glu Arg Ala Arg Ala
            500                 505                 510
Trp Gly Glu Met Tyr Phe Leu His Asn Tyr Asp Arg Leu Val Lys Ala
        515                 520                 525
Lys Thr Gln Ile Asp Pro Leu Asn Val Phe Arg His Glu Gln Ser Ile
    530                 535                 540
Pro Pro Met Leu Gly Ser Thr Gln Glu His Lys Tyr Ser Ser Glu
545                 550                 555
```

<210> SEQ ID NO 13
<211> LENGTH: 2533
<212> TYPE: DNA
<213> ORGANISM: Artificial Sequence
<220> FEATURE:
<223> OTHER INFORMATION: Acyl activating enzyme

<400> SEQUENCE: 13

```
ttagatcaaa taacccgtcc cgaaatccaa tatatatata tatataatat tcaaactctc    60
tctttctatc ttcgtacagt ttaatagaag taataatggg taagaattac aagtccctgg   120
actctgttgt ggcctctgac ttcatagccc taggtatcac ctctgaagtt gctgagacac   180
tccatggtag actggccgag atcgtgtgta attatggcgc tgccactccc caaacatgga   240
tcaatattgc caaccatatt ctgtcgcctg acctcccctt ctccctgcac cagatgctct   300
tctatggttg ctataaagac tttggacctg cccctcctgc ttggataccc gacccggaga   360
aagtaaagtc caccaatctg ggcgcacttt tggagaagcg aggaaaagag ttttgggag    420
tcaagtataa ggatcccatt tcaagctttt ctcatttcca agaatttct gtaagaaacc    480
ctgaggtgta ttggagaaca gtactaatgg atgagatgaa gataagtttt tcaaaggatc   540
cagaatgtat attgcgtaga gatgatatta ataatccagg gggtagtgaa tggcttccag   600
gaggttatct taactcagca aagaattgct tgaatgtaaa tagtaacaag aaattgaatg   660
atacaatgat tgtatggcgt gatgaaggaa atgatgattt gcctctaaac aaattgacac   720
ttgaccaatt gcgtaaacgt gtttggttag ttggttatgc acttgaagaa atgggttgg   780
agaagggttg tgcaattgca attgatatgc caatgcatgt ggatgctgtg ttatctatc    840
```

```
tagctattgt tcttgcggga tatgtagttg tttctattgc tgatagtttt tctgctcctg    900
aaatatcaac aagacttcga ctatcaaaag caaaagccat ttttacacag gatcatatta    960
ttcgtgggaa gaagcgtatt cccttataca gtagagttgt ggaagccaag tctcccatgg   1020
ccattgttat tccttgtagt ggctctaata ttggtgcaga attgcgtgat ggcgatattt   1080
cttgggatta ctttctagaa agagcaaaag agtttaaaaa ttgtgaattt actgctagag   1140
aacaaccagt tgatgcctat acaaacatcc tcttctcatc tggaacaaca ggggagccaa   1200
aggcaattcc atggactcaa gcaactcctt aaaagcagc tgcagatggg tggagccatt   1260
tggacattag gaaaggtgat gtcattgttt ggcccactaa tcttggttgg atgatgggtc   1320
cttggctggt ctatgcttca ctccttaatg gggcttctat tgccttgtat aatggatcac   1380
cacttgtttc tggctttgcc aaatttgtgc aggatgctaa agtaacaatg ctaggtgtgg   1440
tccctagtat tgttcgatca tggaaaagta ccaattgtgt tagtggctat gattggtcca   1500
ccatccgttg cttttcctct tctggtgaag catctaatgt agatgaatac ctatggttga   1560
tggggagagc aaactacaag cctgttatcg aaatgtgtgg tggcacagaa attggtggtg   1620
cattttctgc tggctctttc ttacaagctc aatcattatc ttcatttagt tcacaatgta   1680
tgggttgcac tttatacata cttgacaaga atggttatcc aatgcctaaa acaaaccag   1740 gaattggtga attagcgctt ggtccagtca tgtttggagc atcgaagact ctgttgaatg   1800
gtaatcacca tgatgtttat tttaagggaa tgcctacatt gaatggagag gttttaagga   1860
ggcatgggga cattttttgag cttacatcta atggttatta tcatgcacat ggtcgtgcag   1920
atgatacaat gaatattgga ggcatcaaga ttagttccat agagattgaa cgagtttgta   1980
atgaagttga tgacagagtt ttcgagacaa ctgctattgg agtgccaccct ttgggcggtg   2040 gacctgagca attagtaatt ttctttgtat taaaagattc aaatgataca actattgact   2100
taaatcaatt gaggttatct ttcaacttgg gtttacagaa gaaactaaat cctctgttca   2160
aggtcactcg tgttgtgcct ctttcatcac ttccgagaac agcaaccaac aagatcatga   2220 gaagggttttt gcgccagcaa ttttctcact ttgaatgaag tgttataata taatacatac   2280
atatatgctt tgaataaagt gtagttgatt acatagagca gtttgcatta tcaaatgcac   2340
taataataag ttaaatgctc taaaatatgt gttaaatctt atggcaggat tatagatttg   2400
attaagatag tcatattgaa ccataaattt tcattcaaca catttttagt gcatttgaca   2460
ttatttttat tgaatttaat aaatactgac tacattgtat agtccactac atcataaaaa   2520
aaaaaaaaaa aaa                                                      2533
```

<210> SEQ ID NO 14
<211> LENGTH: 720
<212> TYPE: PRT
<213> ORGANISM: Artificial Sequence
<220> FEATURE:
<223> OTHER INFORMATION: Acyl activating enzyme

<400> SEQUENCE: 14

Met Gly Lys Asn Tyr Lys Ser Leu Asp Ser Val Ala Ser Asp Phe
1               5                   10                  15

Ile Ala Leu Gly Ile Thr Ser Glu Val Ala Glu Thr Leu His Gly Arg
            20                  25                  30

Leu Ala Glu Ile Val Cys Asn Tyr Gly Ala Ala Thr Pro Gln Thr Trp
        35                  40                  45

Ile Asn Ile Ala Asn His Ile Leu Ser Pro Asp Leu Pro Phe Ser Leu

```
            50                  55                  60
His Gln Met Leu Phe Tyr Gly Cys Tyr Lys Asp Phe Gly Pro Ala Pro
 65                      70                  75                  80

Pro Ala Trp Ile Pro Asp Pro Glu Lys Val Lys Ser Thr Asn Leu Gly
                     85                  90                  95

Ala Leu Leu Glu Lys Arg Gly Lys Glu Phe Leu Gly Val Lys Tyr Lys
                100                 105                 110

Asp Pro Ile Ser Ser Phe Ser His Phe Gln Glu Phe Ser Val Arg Asn
                115                 120                 125

Pro Glu Val Tyr Trp Arg Thr Val Leu Met Asp Glu Met Lys Ile Ser
            130                 135                 140

Phe Ser Lys Asp Pro Glu Cys Ile Leu Arg Arg Asp Asp Ile Asn Asn
145                 150                 155                 160

Pro Gly Gly Ser Glu Trp Leu Pro Gly Gly Tyr Leu Asn Ser Ala Lys
                165                 170                 175

Asn Cys Leu Asn Val Asn Ser Asn Lys Lys Leu Asn Asp Thr Met Ile
                180                 185                 190

Val Trp Arg Asp Glu Gly Asn Asp Asp Leu Pro Leu Asn Lys Leu Thr
            195                 200                 205

Leu Asp Gln Leu Arg Lys Arg Val Trp Leu Val Gly Tyr Ala Leu Glu
            210                 215                 220

Glu Met Gly Leu Glu Lys Gly Cys Ala Ile Ala Ile Asp Met Pro Met
225                 230                 235                 240

His Val Asp Ala Val Val Ile Tyr Leu Ala Ile Val Leu Ala Gly Tyr
                    245                 250                 255

Val Val Val Ser Ile Ala Asp Ser Phe Ser Ala Pro Glu Ile Ser Thr
                260                 265                 270

Arg Leu Arg Leu Ser Lys Ala Lys Ala Ile Phe Thr Gln Asp His Ile
                275                 280                 285

Ile Arg Gly Lys Lys Arg Ile Pro Leu Tyr Ser Arg Val Val Glu Ala
            290                 295                 300

Lys Ser Pro Met Ala Ile Val Ile Pro Cys Ser Gly Ser Asn Ile Gly
305                 310                 315                 320

Ala Glu Leu Arg Asp Gly Asp Ile Ser Trp Asp Tyr Phe Leu Glu Arg
                325                 330                 335

Ala Lys Glu Phe Lys Asn Cys Glu Phe Thr Ala Arg Glu Gln Pro Val
                340                 345                 350

Asp Ala Tyr Thr Asn Ile Leu Phe Ser Ser Gly Thr Thr Gly Glu Pro
                355                 360                 365

Lys Ala Ile Pro Trp Thr Gln Ala Thr Pro Leu Lys Ala Ala Ala Asp
            370                 375                 380

Gly Trp Ser His Leu Asp Ile Arg Lys Gly Asp Val Ile Val Trp Pro
385                 390                 395                 400

Thr Asn Leu Gly Trp Met Met Gly Pro Trp Leu Val Tyr Ala Ser Leu
                    405                 410                 415

Leu Asn Gly Ala Ser Ile Ala Leu Tyr Asn Gly Ser Pro Leu Val Ser
                420                 425                 430

Gly Phe Ala Lys Phe Val Gln Asp Ala Lys Val Thr Met Leu Gly Val
                435                 440                 445

Val Pro Ser Ile Val Arg Ser Trp Lys Ser Thr Asn Cys Val Ser Gly
                450                 455                 460

Tyr Asp Trp Ser Thr Ile Arg Cys Phe Ser Ser Ser Gly Glu Ala Ser
465                 470                 475                 480
```

```
Asn Val Asp Glu Tyr Leu Trp Leu Met Gly Arg Ala Asn Tyr Lys Pro
                485                 490                 495

Val Ile Glu Met Cys Gly Gly Thr Glu Ile Gly Gly Ala Phe Ser Ala
            500                 505                 510

Gly Ser Phe Leu Gln Ala Gln Ser Leu Ser Ser Phe Ser Gln Cys
        515                 520                 525

Met Gly Cys Thr Leu Tyr Ile Leu Asp Lys Asn Gly Tyr Pro Met Pro
    530                 535                 540

Lys Asn Lys Pro Gly Ile Gly Glu Leu Ala Leu Gly Pro Val Met Phe
545                 550                 555                 560

Gly Ala Ser Lys Thr Leu Leu Asn Gly Asn His His Ala Val Tyr Phe
                565                 570                 575

Lys Gly Met Pro Thr Leu Asn Gly Glu Val Leu Arg Arg His Gly Asp
            580                 585                 590

Ile Phe Glu Leu Thr Ser Asn Gly Tyr Tyr His Ala His Gly Arg Ala
        595                 600                 605

Asp Asp Thr Met Asn Ile Gly Gly Ile Lys Ile Ser Ser Ile Glu Ile
    610                 615                 620

Glu Arg Val Cys Asn Glu Val Asp Asp Arg Val Phe Glu Thr Thr Ala
625                 630                 635                 640

Ile Gly Val Pro Pro Leu Gly Gly Gly Pro Glu Gln Leu Val Ile Phe
                645                 650                 655

Phe Val Leu Lys Asp Ser Asn Asp Thr Thr Ile Asp Leu Asn Gln Leu
            660                 665                 670

Arg Leu Ser Phe Asn Leu Gly Leu Gln Lys Lys Leu Asn Pro Leu Phe
        675                 680                 685

Lys Val Thr Arg Val Val Pro Leu Ser Ser Leu Pro Arg Thr Ala Thr
    690                 695                 700

Asn Lys Ile Met Arg Arg Val Leu Arg Gln Gln Phe Ser His Phe Glu
705                 710                 715                 720

<210> SEQ ID NO 15
<211> LENGTH: 1158
<212> TYPE: DNA
<213> ORGANISM: Artificial Sequence
<220> FEATURE:
<223> OTHER INFORMATION: Olivetol synthase (AB164375)

<400> SEQUENCE: 15
atgaatcatc ttcgtgctga gggtccggcc tccgttctcg ccattggcac cgccaatccg     60
gagaacattt tattacaaga tgagtttcct gactactatt ttcgcgtcac caaaagtgaa    120
cacatgactc aactcaaaga aaagtttcga aaaatatgtg acaaaagtat gataaggaaa    180
cgtaactgtt tcttaaatga agaacaccta agcaaaacc caagattggt ggagcacgag    240
atgcaaactc tggatgcacg tcaagacatg ttggtagttg aggttccaaa acttgggaag    300
gatgcttgtg caaaggccat caagaatggg ggtcaaccca gtctaaaat cactcattta    360 atcttcacta gcgcatcaac cactgacatg cccggtgcag actaccattg cgctaagctt    420
ctcggactga gtccctcagt gaagcgtgtg atgatgtatc aactaggctg ttatggtggt    480
ggaaccgttc tacgcattgc caaggacata gcagagaata caaaggcgc acgagttctc    540 gccgtgtgtt gtgacataat ggcttgcttg tttcgtgggc cttcagagtc tgacctcgaa    600
ttactagtgg acaagctat cttggtgat ggggctgctg cggtgattgt tggagctgaa    660
cccgatgagt cagttgggga aaggccgata tttgagttgg tgtcaactgg gcaaacaatc    720
```

-continued

```
ttaccaaact cggaaggaac tattggggga catataaggg aagcaggact gatatttgat      780
ttacataagg atgtgcctat gttgatctct aataatattg agaaatgttt gattgaggca      840
tttactccta ttgggattag tgattggaac tccatatttt ggattacaca cccaggtggg      900
aaagctattt tggacaaagt ggaggagaag ttgcatctaa agagtgataa gtttgtggat      960
tcacgtcatg tgctgagtga gcatgggaat atgtctagct caactgtctt gtttgttatg     1020
gatgagttga ggaagaggtc gttggaggaa gggaagtcta ccactggaga tggatttgag     1080
tggggtgttc ttttttgggtt tggaccaggt ttgactgtcg aaagagtggt cgtgcgtagt     1140
gttcccatca aatattaa                                                   1158
```

<210> SEQ ID NO 16
<211> LENGTH: 385
<212> TYPE: PRT
<213> ORGANISM: Artificial Sequence
<220> FEATURE:
<223> OTHER INFORMATION: Olivetol synthase (AB164375)

<400> SEQUENCE: 16

```
Met Asn His Leu Arg Ala Glu Gly Pro Ala Ser Val Leu Ala Ile Gly
1               5                   10                  15

Thr Ala Asn Pro Glu Asn Ile Leu Leu Gln Asp Glu Phe Pro Asp Tyr
            20                  25                  30

Tyr Phe Arg Val Thr Lys Ser Glu His Met Thr Gln Leu Lys Glu Lys
        35                  40                  45

Phe Arg Lys Ile Cys Asp Lys Ser Met Ile Arg Lys Arg Asn Cys Phe
    50                  55                  60

Leu Asn Glu Glu His Leu Lys Gln Asn Pro Arg Leu Val Glu His Glu
65                  70                  75                  80

Met Gln Thr Leu Asp Ala Arg Gln Asp Met Leu Val Val Glu Val Pro
                85                  90                  95

Lys Leu Gly Lys Asp Ala Cys Ala Lys Ala Ile Lys Glu Trp Gly Gln
            100                 105                 110

Pro Lys Ser Lys Ile Thr His Leu Ile Phe Thr Ser Ala Ser Thr Thr
        115                 120                 125

Asp Met Pro Gly Ala Asp Tyr His Cys Ala Lys Leu Leu Gly Leu Ser
    130                 135                 140

Pro Ser Val Lys Arg Val Met Met Tyr Gln Leu Gly Cys Tyr Gly Gly
145                 150                 155                 160

Gly Thr Val Leu Arg Ile Ala Lys Asp Ile Ala Glu Asn Asn Lys Gly
                165                 170                 175

Ala Arg Val Leu Ala Val Cys Cys Asp Ile Met Ala Cys Leu Phe Arg
            180                 185                 190

Gly Pro Ser Glu Ser Asp Leu Glu Leu Leu Val Gly Gln Ala Ile Phe
        195                 200                 205

Gly Asp Gly Ala Ala Ala Val Ile Val Gly Ala Glu Pro Asp Glu Ser
    210                 215                 220

Val Gly Glu Arg Pro Ile Phe Glu Leu Val Ser Thr Gly Gln Thr Ile
225                 230                 235                 240

Leu Pro Asn Ser Glu Gly Thr Ile Gly Gly His Ile Arg Glu Ala Gly
                245                 250                 255

Leu Ile Phe Asp Leu His Lys Asp Val Pro Met Leu Ile Ser Asn Asn
            260                 265                 270

Ile Glu Lys Cys Leu Ile Glu Ala Phe Thr Pro Ile Gly Ile Ser Asp
```

Trp Asn Ser Ile Phe Trp Ile Thr His Pro Gly Gly Lys Ala Ile Leu
            290                 295                 300

Asp Lys Val Glu Glu Lys Leu His Leu Lys Ser Asp Lys Phe Val Asp
305                 310                 315                 320

Ser Arg His Val Leu Ser Glu His Gly Asn Met Ser Ser Thr Val
            325                 330                 335

Leu Phe Val Met Asp Glu Leu Arg Lys Arg Ser Leu Glu Glu Gly Lys
            340                 345                 350

Ser Thr Thr Gly Asp Gly Phe Glu Trp Gly Val Leu Phe Gly Phe Gly
            355                 360                 365

Pro Gly Leu Thr Val Glu Arg Val Val Arg Ser Val Pro Ile Lys
            370                 375                 380

Tyr
385

<210> SEQ ID NO 17
<211> LENGTH: 485
<212> TYPE: DNA
<213> ORGANISM: Artificial Sequence
<220> FEATURE:
<223> OTHER INFORMATION: Olivetolic acid cyclase (AFN42527.1)

<400> SEQUENCE: 17
aaaaaagaag aagaagaaga aagttgagaa agagaatggc agtgaagcat ttgattgtat        60
tgaagttcaa agatgaaatc acagaagccc aaaaggaaga attttttcaag acgtatgtga      120 atcttgtgaa tatcatccca gccatgaaag atgtatactg gggtaaagat gtgactcaaa      180
agaataagga agaagggtac actcacatag ttgaggtaac atttgagagt gtggagacta      240
ttcaggacta cattattcat cctgcccatg ttggatttgg agatgtctat cgttctttct      300
gggaaaaact tctcattttt gactacacac cacgaaagta gactatatat agtagccgac      360
caagctgcct tcatcttcat cttctcaaat aatatatcta atatctaatt atataataat      420
aactacttaa taaagactg tgtttataac attaaataat aataataata aagtcttttg       480
tagct                                                                    485

<210> SEQ ID NO 18
<211> LENGTH: 101
<212> TYPE: PRT
<213> ORGANISM: Artificial Sequence
<220> FEATURE:
<223> OTHER INFORMATION: Olivetolic acid cyclase (AFN42527.1)

<400> SEQUENCE: 18

Met Ala Val Lys His Leu Ile Val Leu Lys Phe Lys Asp Glu Ile Thr
1               5                   10                  15

Glu Ala Gln Lys Glu Glu Phe Phe Lys Thr Tyr Val Asn Leu Val Asn
            20                  25                  30

Ile Ile Pro Ala Met Lys Asp Val Tyr Trp Gly Lys Asp Val Thr Gln
            35                  40                  45

Lys Asn Lys Glu Glu Gly Tyr Thr His Ile Val Glu Val Thr Phe Glu
        50                  55                  60

Ser Val Glu Thr Ile Gln Asp Tyr Ile Ile His Pro Ala His Val Gly
65                  70                  75                  80

Phe Gly Asp Val Tyr Arg Ser Phe Trp Glu Lys Leu Leu Ile Phe Asp
                85                  90                  95

Tyr Thr Pro Arg Lys
        100

<210> SEQ ID NO 19
<211> LENGTH: 1188
<212> TYPE: DNA
<213> ORGANISM: Artificial Sequence
<220> FEATURE:
<223> OTHER INFORMATION: Aromatic prenyltransferase

<400> SEQUENCE: 19

| | | |
|---|---|---|
| atgggactct catcagtttg taccttttca tttcaaacta attaccatac tttattaaat | 60 |
| cctcacaata ataatcccaa aacctcatta ttatgttatc gacacccccaa aacaccaatt | 120 |
| aaatactctt acaataattt tccctctaaa cattgctcca ccaagagttt tcatctacaa | 180 |
| aacaaatgct cagaatcatt atcaatcgca aaaaattcca ttagggcagc tactacaaat | 240 |
| caaactgagc ctccagaatc tgataatcat tcagtagcaa ctaaaatttt aaactttggg | 300 |
| aaggcatgtt ggaaacttca agaccatat acaatcatag catttacttc atgcgcttgt | 360 |
| ggattgtttg ggaaagagtt gttgcataac acaaatttaa taagttggtc tctgatgttc | 420 |
| aaggcattct ttttttttggt ggctatatta tgcattgctt cttttacaac taccatcaat | 480 |
| cagatttacg atcttcacat tgacagaata aacaagcctg atctaccact agcttcaggg | 540 |
| gaaatatcag taaacacagc ttggattatg agcataattg tggcactgtt tggattgata | 600 |
| ataactataa aaatgaaggg tggaccactc tatatatttg gctactgttt tggtattttt | 660 |
| ggtgggattg tctattctgt tccaccattt agatggaagc aaaatccttc cactgcattt | 720 |
| cttctcaatt tcctggccca tattattaca aatttcacat tttattatgc cagcagagca | 780 |
| gctcttggcc taccatttga gttgaggcct tcttttactt tcctgctagc atttatgaaa | 840 |
| tcaatgggtt cagctttggc tttaatcaaa gatgcttcag acgttgaagg cgacactaaa | 900 |
| tttggcatat caaccttggc aagtaaaatat ggttccagaa acttgacatt attttgttct | 960 |
| ggaattgttc tcctatccta tgtggctgct atacttgctg ggattatctg gccccaggct | 1020 |
| ttcaacagta acgtaatgtt actttctcat gcaatcttag cattttggtt aatcctccag | 1080 |
| actcgagatt ttgcgttaac aaaattacgac ccggaagcag gcagaagatt ttacgagttc | 1140 |
| atgtggaagc tttattatgc tgaatattta gtatatgttt tcatataa | 1188 |

<210> SEQ ID NO 20
<211> LENGTH: 395
<212> TYPE: PRT
<213> ORGANISM: Artificial Sequence
<220> FEATURE:
<223> OTHER INFORMATION: Aromatic prenyltransferase

<400> SEQUENCE: 20

Met Gly Leu Ser Ser Val Cys Thr Phe Ser Phe Gln Thr Asn Tyr His
1               5                   10                  15

Thr Leu Leu Asn Pro His Asn Asn Pro Lys Thr Ser Leu Leu Cys
            20                  25                  30

Tyr Arg His Pro Lys Thr Pro Ile Lys Tyr Ser Tyr Asn Asn Phe Pro
        35                  40                  45

Ser Lys His Cys Ser Thr Lys Ser Phe His Leu Gln Asn Lys Cys Ser
    50                  55                  60

Glu Ser Leu Ser Ile Ala Lys Asn Ser Ile Arg Ala Ala Thr Thr Asn
65                  70                  75                  80

Gln Thr Glu Pro Pro Glu Ser Asp Asn His Ser Val Ala Thr Lys Ile

```
                      85                  90                  95
Leu Asn Phe Gly Lys Ala Cys Trp Lys Leu Gln Arg Pro Tyr Thr Ile
                100                 105                 110

Ile Ala Phe Thr Ser Cys Ala Cys Gly Leu Phe Gly Lys Glu Leu Leu
                115                 120                 125

His Asn Thr Asn Leu Ile Ser Trp Ser Leu Met Phe Lys Ala Phe Phe
                130                 135                 140

Phe Leu Val Ala Ile Leu Cys Ile Ala Ser Phe Thr Thr Thr Ile Asn
145                 150                 155                 160

Gln Ile Tyr Asp Leu His Ile Asp Arg Ile Asn Lys Pro Asp Leu Pro
                165                 170                 175

Leu Ala Ser Gly Glu Ile Ser Val Asn Thr Ala Trp Ile Met Ser Ile
                180                 185                 190

Ile Val Ala Leu Phe Gly Leu Ile Ile Thr Ile Lys Met Lys Gly Gly
                195                 200                 205

Pro Leu Tyr Ile Phe Gly Tyr Cys Phe Gly Ile Phe Gly Gly Ile Val
                210                 215                 220

Tyr Ser Val Pro Pro Phe Arg Trp Lys Gln Asn Pro Ser Thr Ala Phe
225                 230                 235                 240

Leu Leu Asn Phe Leu Ala His Ile Ile Thr Asn Phe Thr Phe Tyr Tyr
                245                 250                 255

Ala Ser Arg Ala Ala Leu Gly Leu Pro Phe Glu Leu Arg Pro Ser Phe
                260                 265                 270

Thr Phe Leu Leu Ala Phe Met Lys Ser Met Gly Ser Ala Leu Ala Leu
                275                 280                 285

Ile Lys Asp Ala Ser Asp Val Glu Gly Asp Thr Lys Phe Gly Ile Ser
                290                 295                 300

Thr Leu Ala Ser Lys Tyr Gly Ser Arg Asn Leu Thr Leu Phe Cys Ser
305                 310                 315                 320

Gly Ile Val Leu Leu Ser Tyr Val Ala Ala Ile Leu Ala Gly Ile Ile
                325                 330                 335

Trp Pro Gln Ala Phe Asn Ser Asn Val Met Leu Leu Ser His Ala Ile
                340                 345                 350

Leu Ala Phe Trp Leu Ile Leu Gln Thr Arg Asp Phe Ala Leu Thr Asn
                355                 360                 365

Tyr Asp Pro Glu Ala Gly Arg Arg Phe Tyr Glu Phe Met Trp Lys Leu
                370                 375                 380

Tyr Tyr Ala Glu Tyr Leu Val Tyr Val Phe Ile
385                 390                 395

<210> SEQ ID NO 21
<211> LENGTH: 1885
<212> TYPE: DNA
<213> ORGANISM: Cannabis sativa
<220> FEATURE:
<223> OTHER INFORMATION: tetrahydrocannabinolic acid synthase precursor
      AB057805.1

<400> SEQUENCE: 21
aaaaaaatca ttaggactga agaaaaatga attgctcagc attttccttt tggtttgttt      60 gcaaataat  attttttcttt ctctcattcc atatccaaat ttcaatagct aatcctcgag     120
aaaacttcct taaatgcttc tcaaaacata ttcccaacaa tgtagcaaat ccaaaactcg     180
tatacactca acacgaccaa tgtatatgt ctatcctgaa ttcgacaata caaaatctta      240
gattcatctc tgatacaacc ccaaaaccac tcgttattgt cactccttca aataactccc     300
```

```
atatccaagc aactatttta tgctctaaga aagttggctt gcagattcga actcgaagcg    360
gtggccatga tgctgagggt atgtcctaca tatctcaagt cccatttgtt gtagtagact    420
tgagaaacat gcattcgatc aaaatagatg ttcatagcca aactgcgtgg gttgaagccg    480
gagctaccct tggagaagtt tattattgga tcaatgagaa gaatgagaat cttagttttc    540
ctggtgggta ttgccctact gttggcgtag gtggacactt tagtggagga ggctatggag    600
cattgatgcg aaattatggc cttgcggctg ataatattat tgatgcacac ttagtcaatg    660
ttgatggaaa agttctagat cgaaaatcca tgggagaaga tctgttttgg gctatacgtg    720
gtggtggagg agaaaacttt ggaatcattg cagcatggaa aatcaaactg ttgctgtcc     780
catcaaagtc tactatattc agtgttaaaa agaacatgga gatacatggg cttgtcaagt    840
tatttaacaa atggcaaaat attgcttaca gtatgacaa  agatttagta ctcatgactc    900
acttcataac aaagaatatt acagataatc atgggaagaa taagactaca gtacatggtt    960
acttctcttc aatttttcat ggtggagtgg atagtctagt cgacttgatg aacaagagct   1020
ttcctgagtt gggtattaaa aaaactgatt gcaaagaatt tagctggatt gatacaacca   1080
tcttctacag tggtgttgta aattttaaca ctgctaattt taaaaaggaa attttgcttg   1140
atagatcagc tgggaagaag acggctttct caattaagtt agactatgtt aagaaaccaa   1200
ttccagaaac tgcaatggtc aaaattttgg aaaaattata tgaagaagat gtaggagctg   1260
ggatgtatgt gttgtaccct acggtggta  aatggagga gatttcagaa tcagcaattc   1320
cattccctca tcgagctgga ataatgtatg aactttggta cactgcttcc tgggagaagc   1380
aagaagataa tgaaaagcat ataaactggg ttcgaagtgt ttataatttt acgactcctt   1440
atgtgtccca aaatccaaga ttggcgtatc tcaattatag ggaccttgat ttaggaaaaa   1500
ctaatcatgc gagtcctaat aattacacac aagcacgtat ttggggtgaa aagtattttg   1560
gtaaaaattt taacaggtta gttaaggtga aaactaaagt tgatcccaat aatttttta    1620
gaaacgaaca agtatccca cctcttccac cgcatcatca ttaattatct ttaaatagat   1680
atatttccct tatcaattag ttaatcatta taccatacat acatttattg tatatagttt   1740
atctactcat attatgtatg ctcccaagta tgaaaatcta cattagaact gtgtagacaa   1800
tcataagata tatttaataa aataaattgt ctttcttatt tcaatagcaa ataaaataat   1860
attatttaa aaaaaaaaaa aaaaa                                           1885
```

<210> SEQ ID NO 22
<211> LENGTH: 545
<212> TYPE: PRT
<213> ORGANISM: Cannabis sativa
<220> FEATURE:
<223> OTHER INFORMATION: tetrahydrocannabinolic acid synthase precursor
    AB057805.1

<400> SEQUENCE: 22

Met Asn Cys Ser Ala Phe Ser Phe Trp Phe Val Cys Lys Ile Ile Phe
1               5                   10                  15

Phe Phe Leu Ser Phe His Ile Gln Ile Ser Ile Ala Asn Pro Arg Glu
            20                  25                  30

Asn Phe Leu Lys Cys Phe Ser Lys His Ile Pro Asn Asn Val Ala Asn
        35                  40                  45

Pro Lys Leu Val Tyr Thr Gln His Asp Gln Leu Tyr Met Ser Ile Leu
    50                  55                  60

Asn Ser Thr Ile Gln Asn Leu Arg Phe Ile Ser Asp Thr Thr Pro Lys

-continued

```
                65                  70                  75                  80
Pro Leu Val Ile Val Thr Pro Ser Asn Asn Ser His Ile Gln Ala Thr
                        85                  90                  95
Ile Leu Cys Ser Lys Lys Val Gly Leu Gln Ile Arg Thr Arg Ser Gly
                       100                 105                 110
Gly His Asp Ala Glu Gly Met Ser Tyr Ile Ser Gln Val Pro Phe Val
                   115                 120                 125
Val Val Asp Leu Arg Asn Met His Ser Ile Lys Ile Asp Val His Ser
               130                 135                 140
Gln Thr Ala Trp Val Glu Ala Gly Ala Thr Leu Gly Glu Val Tyr Tyr
145                 150                 155                     160
Trp Ile Asn Glu Lys Asn Glu Asn Leu Ser Phe Pro Gly Gly Tyr Cys
                   165                 170                 175
Pro Thr Val Gly Val Gly His Phe Ser Gly Gly Tyr Gly Ala
                   180                 185                 190
Leu Met Arg Asn Tyr Gly Leu Ala Ala Asp Asn Ile Ile Asp Ala His
                   195                 200                 205
Leu Val Asn Val Asp Gly Lys Val Leu Asp Arg Lys Ser Met Gly Glu
                   210                 215                 220
Asp Leu Phe Trp Ala Ile Arg Gly Gly Gly Gly Glu Asn Phe Gly Ile
225                 230                 235                     240
Ile Ala Ala Trp Lys Ile Lys Leu Val Ala Val Pro Ser Lys Ser Thr
                       245                 250                 255
Ile Phe Ser Val Lys Lys Asn Met Glu Ile His Gly Leu Val Lys Leu
                   260                 265                 270
Phe Asn Lys Trp Gln Asn Ile Ala Tyr Lys Tyr Asp Lys Asp Leu Val
                   275                 280                 285
Leu Met Thr His Phe Ile Thr Lys Asn Ile Thr Asp Asn His Gly Lys
                   290                 295                 300
Asn Lys Thr Thr Val His Gly Tyr Phe Ser Ser Ile Phe His Gly Gly
305                 310                 315                     320
Val Asp Ser Leu Val Asp Leu Met Asn Lys Ser Phe Pro Glu Leu Gly
                   325                 330                 335
Ile Lys Lys Thr Asp Cys Lys Glu Phe Ser Trp Ile Asp Thr Thr Ile
                   340                 345                 350
Phe Tyr Ser Gly Val Val Asn Phe Asn Thr Ala Asn Phe Lys Lys Glu
                   355                 360                 365
Ile Leu Leu Asp Arg Ser Ala Gly Lys Lys Thr Ala Phe Ser Ile Lys
                   370                 375                 380
Leu Asp Tyr Val Lys Lys Pro Ile Pro Glu Thr Ala Met Val Lys Ile
385                 390                 395                     400
Leu Glu Lys Leu Tyr Glu Glu Asp Val Gly Ala Gly Met Tyr Val Leu
                   405                 410                 415
Tyr Pro Tyr Gly Gly Ile Met Glu Glu Ile Ser Glu Ser Ala Ile Pro
                   420                 425                 430
Phe Pro His Arg Ala Gly Ile Met Tyr Glu Leu Trp Tyr Thr Ala Ser
                   435                 440                 445
Trp Glu Lys Gln Glu Asp Asn Glu Lys His Ile Asn Trp Val Arg Ser
                   450                 455                 460
Val Tyr Asn Phe Thr Thr Pro Tyr Val Ser Gln Asn Pro Arg Leu Ala
465                 470                 475                     480
Tyr Leu Asn Tyr Arg Asp Leu Asp Leu Gly Lys Thr Asn His Ala Ser
                   485                 490                 495
```

```
Pro Asn Asn Tyr Thr Gln Ala Arg Ile Trp Gly Glu Lys Tyr Phe Gly
            500                 505                 510
Lys Asn Phe Asn Arg Leu Val Lys Val Lys Thr Lys Val Asp Pro Asn
        515                 520                 525
Asn Phe Phe Arg Asn Glu Gln Ser Ile Pro Pro Leu Pro Pro His His
    530                 535                 540
His
545

<210> SEQ ID NO 23
<211> LENGTH: 1635
<212> TYPE: DNA
<213> ORGANISM: Artificial Sequence
<220> FEATURE:
<223> OTHER INFORMATION: Cannabidiolic acid synthase (AB292682)

<400> SEQUENCE: 23
atgaagtgct caacattctc cttttggttt gtttgcaaga taatattttt cttttcctca      60
ttcaatatcc aaacttccat tgctaatcct cgagaaaact tccttaaatg cttctcgcaa     120
tatattccca ataatgcaac aaatctaaaa ctcgtataca ctcaaaacaa cccattgtat     180
atgtctgtcc taaattcgac aatacacaat cttagattca cctctgacac aaccccaaaa     240
ccacttgtta tcgtcactcc ttcacatgtc tctcatatcc aaggcactat tctatgctcc     300
aagaaagttg gcttgcagat tcgaactcga agtggtggtc atgattctga gggcatgtcc     360
tacatatctc aagtcccatt tgttatagta gacttgagaa acatgcgttc aatcaaaata     420
gatgttcata gccaaactgc atgggttgaa gccggagcta cccttggaga agtttattat     480
tgggttaatg agaaaaatga gaatcttagt ttggcggctg gtattgccc  tactgtttgc     540 gcaggtggac actttggtgg aggaggctat ggaccattga tgagaaacta tggcctcgcg     600
gctgataata tcattgatgc acacttagtc aacgttcatg gaaaagtgct agatcgaaaa     660
tctatggggg aagatctctt tggctttacg tggtggtg gagcagaaag cttcggaatc     720
attgtagcat ggaaaattag actggttgct gtcccaaagt ctactatgtt tagtgttaaa     780
aagatcatgg agatacatga gcttgtcaag ttagttaaca aatggcaaaa tattgcttac     840
aagtatgaca agatttatt actcatgact cacttcataa ctaggaacat tacagataat     900
caagggaaga ataagacagc aatacacact tacttctctt cagttttcct tggtggagtg     960
gatagtctag tcgacttgat gaacaagagt tttcctgagt tgggtattaa aaaaacggat    1020
tgcagacaat tgagctggat tgatactatc atcttctata gtggtgttgt aaattacgac    1080
actgataatt ttaacaagga aattttgctt gatagatccg ctgggcagaa cggtgctttc    1140
aagattaagt tagactacgt taagaaacca attccagaat ctgtatttgt ccaaattttg    1200
gaaaaattat atgaagaaga tataggagct gggatgtatg cgttgtaccc ttacggtggt    1260
ataatggatg agatttcaga atcagcaatt ccattccctc atcgagctgg aatcttgtat    1320
gagttatggt acatatgtag ttgggagaag caagaagata acgaaaagca tctaaactgg    1380
attagaaata tttataactt catgactcct tatgtgtcca aaaatccaag attggcatat    1440
ctcaattata gagccttgga tataggaata atgatccca agaatccaaa taattacaca    1500
caagcacgta tttgggggtga aagtattttt ggtaaaaatt ttgacaggct agtaaaagtg    1560
aaaaccctgg ttgatcccaa taactttttt agaaacgaac aaagcatccc acctcttcca    1620
cggcatcgtc attaa                                                     1635
```

<210> SEQ ID NO 24
<211> LENGTH: 544
<212> TYPE: PRT
<213> ORGANISM: Artificial Sequence
<220> FEATURE:
<223> OTHER INFORMATION: Cannabidiolic acid synthase (AB292682)

<400> SEQUENCE: 24

```
Met Lys Cys Ser Thr Phe Ser Phe Trp Phe Val Cys Lys Ile Ile Phe
1               5                   10                  15

Phe Phe Phe Ser Phe Asn Ile Gln Thr Ser Ile Ala Asn Pro Arg Glu
                20                  25                  30

Asn Phe Leu Lys Cys Phe Ser Gln Tyr Ile Pro Asn Asn Ala Thr Asn
            35                  40                  45

Leu Lys Leu Val Tyr Thr Gln Asn Asn Pro Leu Tyr Met Ser Val Leu
50                  55                  60

Asn Ser Thr Ile His Asn Leu Arg Phe Thr Ser Asp Thr Thr Pro Lys
65                  70                  75                  80

Pro Leu Val Ile Val Thr Pro Ser His Val Ser His Ile Gln Gly Thr
                85                  90                  95

Ile Leu Cys Ser Lys Lys Val Gly Leu Gln Ile Arg Thr Arg Ser Gly
            100                 105                 110

Gly His Asp Ser Glu Gly Met Ser Tyr Ile Ser Gln Val Pro Phe Val
        115                 120                 125

Ile Val Asp Leu Arg Asn Met Arg Ser Ile Lys Ile Asp Val His Ser
130                 135                 140

Gln Thr Ala Trp Val Glu Ala Gly Ala Thr Leu Gly Glu Val Tyr Tyr
145                 150                 155                 160

Trp Val Asn Glu Lys Asn Glu Asn Leu Ser Leu Ala Ala Gly Tyr Cys
                165                 170                 175

Pro Thr Val Cys Ala Gly Gly His Phe Gly Gly Gly Gly Tyr Gly Pro
            180                 185                 190

Leu Met Arg Asn Tyr Gly Leu Ala Ala Asp Asn Ile Ile Asp Ala His
        195                 200                 205

Leu Val Asn Val His Gly Lys Val Leu Asp Arg Lys Ser Met Gly Glu
210                 215                 220

Asp Leu Phe Trp Ala Leu Arg Gly Gly Gly Ala Glu Ser Phe Gly Ile
225                 230                 235                 240

Ile Val Ala Trp Lys Ile Arg Leu Val Ala Val Pro Lys Ser Thr Met
                245                 250                 255

Phe Ser Val Lys Lys Ile Met Glu Ile His Glu Leu Val Lys Leu Val
            260                 265                 270

Asn Lys Trp Gln Asn Ile Ala Tyr Lys Tyr Asp Lys Asp Leu Leu Leu
        275                 280                 285

Met Thr His Phe Ile Thr Arg Asn Ile Thr Asp Asn Gln Gly Lys Asn
290                 295                 300

Lys Thr Ala Ile His Thr Tyr Phe Ser Ser Val Phe Leu Gly Gly Val
305                 310                 315                 320

Asp Ser Leu Val Asp Leu Met Asn Lys Ser Phe Pro Glu Leu Gly Ile
                325                 330                 335

Lys Lys Thr Asp Cys Arg Gln Leu Ser Trp Ile Asp Thr Ile Ile Phe
            340                 345                 350

Tyr Ser Gly Val Val Asn Tyr Asp Thr Asp Asn Phe Asn Lys Glu Ile
        355                 360                 365
```

| | | | | | | | | | | | |
|---|---|---|---|---|---|---|---|---|---|---|---|
| Leu | Leu | Asp | Arg | Ser | Ala | Gly | Gln | Asn | Gly | Ala | Phe | Lys | Ile | Lys | Leu |
| 370 | | | | | 375 | | | | | 380 | | | | | |

Leu Leu Asp Arg Ser Ala Gly Gln Asn Gly Ala Phe Lys Ile Lys Leu
370                 375                 380

Asp Tyr Val Lys Lys Pro Ile Pro Glu Ser Val Phe Val Gln Ile Leu
385                 390                 395                 400

Glu Lys Leu Tyr Glu Glu Asp Ile Gly Ala Gly Met Tyr Ala Leu Tyr
            405                 410                 415

Pro Tyr Gly Gly Ile Met Asp Glu Ile Ser Glu Ser Ala Ile Pro Phe
        420                 425                 430

Pro His Arg Ala Gly Ile Leu Tyr Glu Leu Trp Tyr Ile Cys Ser Trp
            435                 440                 445

Glu Lys Gln Glu Asp Asn Glu Lys His Leu Asn Trp Ile Arg Asn Ile
450                 455                 460

Tyr Asn Phe Met Thr Pro Tyr Val Ser Lys Asn Pro Arg Leu Ala Tyr
465                 470                 475                 480

Leu Asn Tyr Arg Asp Leu Asp Ile Gly Ile Asn Asp Pro Lys Asn Pro
                485                 490                 495

Asn Asn Tyr Thr Gln Ala Arg Ile Trp Gly Lys Tyr Phe Gly Lys
            500                 505                 510

Asn Phe Asp Arg Leu Val Lys Val Lys Thr Leu Val Asp Pro Asn Asn
            515                 520                 525

Phe Phe Arg Asn Glu Gln Ser Ile Pro Pro Leu Pro Arg His Arg His
530                 535                 540

```
<210> SEQ ID NO 25
<211> LENGTH: 1635
<212> TYPE: DNA
<213> ORGANISM: Artificial Sequence
<220> FEATURE:
<223> OTHER INFORMATION: Cannabichromenic acid synthase

<400> SEQUENCE: 25
atgaattgct caacattctc cttttggttt gtttgcaaaa taatattttt ctttctctca      60
ttcaatatcc aaatttcaat agctaatcct caagaaaact tccttaaatg cttctcggaa     120
tatattccta caatccagc aaatccaaaa ttcatataca ctcaacacga ccaattgtat      180
atgtctgtcc tgaattcgac aatacaaaat cttagattca cctctgatac aaccccaaaa    240
ccactcgtta ttgtcactcc ttcaaatgtc tcccatatcc aggccagtat tctctgctcc    300
aagaaagttg gtttgcagat tcgaactcga agcggtggcc atgatgctga gggtttgtcc    360
tacatatctc aagtcccatt tgctatagta gacttgagaa acatgcatac ggtcaaagta    420
gatattcata gccaaactgc gtgggttgaa gccggagcta cccttggaga agtttattat    480
tggatcaatg agatgaatga gaattttagt tttcctggtg ggtattgccc tactgttggc    540
gtaggtggac actttagtgg aggaggctat ggagcattga tgcgaaatta tggccttgcg    600
gctgataata tcattgatgc acacttagtc aatgttgatg aaaagttct agatcgaaaa     660 tccatgggag aagatctatt tgggctata cgtggtggag gaggagaaaa ctttggaatc     720
attgcagcat gtaaaatcaa acttgttgtt gtcccatcaa aggctactat attcagtgtt    780
aaaaagaaca tggagataca tgggcttgtc aagttattta caaatggca aaatattgct     840 tacaagtatg caaagatttt aatgctcacg actcacttca gaactaggaa tattacagat    900
aatcatggga agaataagac tacagtacat ggttacttct cttccatttt tcttggtgga    960
gtggatagtc tagttgactt gatgaacaag agctttcctg agttgggtat taaaaaaact    1020
gattgcaaag aattgagctg gattgataca accatcttct acagtggtgt tgtaaattac    1080
```

-continued

```
aacactgcta atttttaaaaa ggaaattttg cttgatagat cagctgggaa gaagacggct    1140
ttctcaatta agttagacta tgttaagaaa ctaatacctg aaactgcaat ggtcaaaatt    1200
ttggaaaaat tatatgaaga agaggtagga gttgggatgt atgtgttgta cccttacggt    1260
ggtataatgg atgagattc agaatcagca attccattcc ctcatcgagc tggaataatg     1320
tatgaacttt ggtacactgc tacctgggag aagcaagaag ataacgaaaa gcatataaac    1380
tgggttcgaa gtgtttataa tttcacaact ccttatgtgt cccaaaatcc aagattggcg    1440
tatctcaatt atagggacct tgatttagga aaaactaatc ctgagagtcc taataattac    1500
acacaagcac gtatttgggg tgaaaagtat tttggtaaaa attttaacag gttagttaag    1560
gtgaaaacca aagctgatcc caataatttt tttagaaacg aacaaagtat cccacctctt    1620
ccaccgcgtc atcat                                                     1635
```

<210> SEQ ID NO 26
<211> LENGTH: 545
<212> TYPE: PRT
<213> ORGANISM: Artificial Sequence
<220> FEATURE:
<223> OTHER INFORMATION: Cannabichromenic acid synthase

<400> SEQUENCE: 26

```
Met Asn Cys Ser Thr Phe Ser Phe Trp Phe Val Cys Lys Ile Ile Phe
1               5                   10                  15

Phe Phe Leu Ser Phe Asn Ile Gln Ile Ser Ile Ala Asn Pro Gln Glu
            20                  25                  30

Asn Phe Leu Lys Cys Phe Ser Glu Tyr Ile Pro Asn Asn Pro Ala Asn
        35                  40                  45

Pro Lys Phe Ile Tyr Thr Gln His Asp Gln Leu Tyr Met Ser Val Leu
    50                  55                  60

Asn Ser Thr Ile Gln Asn Leu Arg Phe Thr Ser Asp Thr Thr Pro Lys
65                  70                  75                  80

Pro Leu Val Ile Val Thr Pro Ser Asn Val Ser His Ile Gln Ala Ser
                85                  90                  95

Ile Leu Cys Ser Lys Lys Val Gly Leu Gln Ile Arg Thr Arg Ser Gly
            100                 105                 110

Gly His Asp Ala Glu Gly Leu Ser Tyr Ile Ser Gln Val Pro Phe Ala
        115                 120                 125

Ile Val Asp Leu Arg Asn Met His Thr Val Lys Val Asp Ile His Ser
    130                 135                 140

Gln Thr Ala Trp Val Glu Ala Gly Ala Thr Leu Gly Glu Val Tyr Tyr
145                 150                 155                 160

Trp Ile Asn Glu Met Asn Glu Asn Phe Ser Phe Pro Gly Gly Tyr Cys
                165                 170                 175

Pro Thr Val Gly Val Gly Gly His Phe Ser Gly Gly Gly Tyr Gly Ala
            180                 185                 190

Leu Met Arg Asn Tyr Gly Leu Ala Ala Asp Asn Ile Ile Asp Ala His
        195                 200                 205

Leu Val Asn Val Asp Gly Lys Val Leu Asp Arg Lys Ser Met Gly Glu
    210                 215                 220

Asp Leu Phe Trp Ala Ile Arg Gly Gly Gly Gly Glu Asn Phe Gly Ile
225                 230                 235                 240

Ile Ala Ala Cys Lys Ile Lys Leu Val Val Val Pro Ser Lys Ala Thr
                245                 250                 255

Ile Phe Ser Val Lys Lys Asn Met Glu Ile His Gly Leu Val Lys Leu
```

-continued

```
                    260                 265                 270
Phe Asn Lys Trp Gln Asn Ile Ala Tyr Lys Tyr Asp Lys Asp Leu Met
            275                 280                 285
Leu Thr Thr His Phe Arg Thr Arg Asn Ile Thr Asp Asn His Gly Lys
            290                 295                 300
Asn Lys Thr Thr Val His Gly Tyr Phe Ser Ser Ile Phe Leu Gly Gly
305                 310                 315                 320
Val Asp Ser Leu Val Asp Leu Met Asn Lys Ser Phe Pro Glu Leu Gly
                325                 330                 335
Ile Lys Lys Thr Asp Cys Lys Glu Leu Ser Trp Ile Asp Thr Thr Ile
            340                 345                 350
Phe Tyr Ser Gly Val Val Asn Tyr Asn Thr Ala Asn Phe Lys Lys Glu
            355                 360                 365
Ile Leu Leu Asp Arg Ser Ala Gly Lys Lys Thr Ala Phe Ser Ile Lys
        370                 375                 380
Leu Asp Tyr Val Lys Lys Leu Ile Pro Glu Thr Ala Met Val Lys Ile
385                 390                 395                 400
Leu Glu Lys Leu Tyr Glu Glu Val Gly Val Gly Met Tyr Val Leu
                405                 410                 415
Tyr Pro Tyr Gly Gly Ile Met Asp Glu Ile Ser Glu Ser Ala Ile Pro
                420                 425                 430
Phe Pro His Arg Ala Gly Ile Met Tyr Glu Leu Trp Tyr Thr Ala Thr
            435                 440                 445
Trp Glu Lys Gln Glu Asp Asn Glu Lys His Ile Asn Trp Val Arg Ser
    450                 455                 460
Val Tyr Asn Phe Thr Thr Pro Tyr Val Ser Gln Asn Pro Arg Leu Ala
465                 470                 475                 480
Tyr Leu Asn Tyr Arg Asp Leu Asp Leu Gly Lys Thr Asn Pro Glu Ser
            485                 490                 495
Pro Asn Asn Tyr Thr Gln Ala Arg Ile Trp Gly Glu Lys Tyr Phe Gly
                500                 505                 510
Lys Asn Phe Asn Arg Leu Val Lys Val Lys Thr Lys Ala Asp Pro Asn
            515                 520                 525
Asn Phe Phe Arg Asn Glu Gln Ser Ile Pro Pro Leu Pro Pro Arg His
            530                 535                 540
His
545
```